(12) United States Patent
Lu et al.

(10) Patent No.: US 8,649,883 B2
(45) Date of Patent: *Feb. 11, 2014

(54) POWER DISTRIBUTION SYSTEM AND METHOD

(71) Applicant: Advanergy, Inc., Winnetka, CA (US)

(72) Inventors: Jin Lu, Oak Park, CA (US); Todd Scott Kelly, Winnetka, CA (US); Lee Cheung, Thousand Oaks, CA (US)

(73) Assignee: Advanergy, Inc., Winnetka, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/907,599

(22) Filed: May 31, 2013

(65) Prior Publication Data

US 2013/0261821 A1 Oct. 3, 2013

Related U.S. Application Data

(63) Continuation-in-part of application No. 13/644,795, filed on Oct. 4, 2012, now Pat. No. 8,478,450, and a (Continued)

(51) Int. Cl.
*G05B 11/01* (2006.01)
*G05D 3/12* (2006.01)
*G05D 5/00* (2006.01)
*G05D 9/00* (2006.01)
*G05D 11/00* (2006.01)
*G05D 17/00* (2006.01)

(52) U.S. Cl.
USPC .............. 700/22; 700/286; 700/295; 700/297

(58) Field of Classification Search
USPC ................... 700/22, 286, 295, 297
See application file for complete search history.

(56) References Cited

U.S. PATENT DOCUMENTS 3,955,463 A 5/1976 Hoehn
4,105,862 A 8/1978 Hoehn (Continued)

FOREIGN PATENT DOCUMENTS

KR 1020080095645 A 10/2008
WO WO 2011087164 A1 7/2011

OTHER PUBLICATIONS (Author Unknown); "Battery Life (and Death)"; Electropaedia; At least as early as Oct. 4, 2011; http://www.mpoweruk.com/life.htm; 8 pp.

(Continued)

*Primary Examiner* — Ramesh Patel
(74) *Attorney, Agent, or Firm* — David W. Carstens; Kevin M. Klughart; Carstens & Cahoon, LLP

(57) ABSTRACT

A power distribution system/method implementing Internet based access to hybrid home automation networks is disclosed. The system utilizes a smart gateway power controller (SGPC) configured for single/multi-gang wallplate installation to selectively switch an AC power source to a load device under switched control and/or local/remote network commands that may be routed through a variety of network interfaces and protocols present within a home or other structure-local communications network. SGPC configurations may be nested within a home automation network to permit separation of control for load devices within a common home automation environment. Present invention methods may include routing protocols between disparate home automation networks as well as remote access protocols that permit control of disparate home automation networks via the Internet using a wide variety of remote access interfaces including mobile devices, tablet computers, laptops, desktop computers, and the like.

30 Claims, 80 Drawing Sheets

Related U.S. Application Data

(63) continuation-in-part of application No. PCT/US2012/058761, filed on Oct. 4, 2012.

(60) Provisional application No. 61/542,811, filed on Oct. 4, 2011, provisional application No. 61/655,099, filed on Jun. 4, 2012, provisional application No. 61/661,100, filed on Jun. 18, 2012, provisional application No. 61/667,477, filed on Jul. 3, 2012, provisional application No. 61/698,288, filed on Sep. 7, 2012.

(56) References Cited

U.S. PATENT DOCUMENTS

| | | | |
|---|---|---|---|
| 4,188,854 A | | 2/1980 | Hoehn |
| 4,297,525 A | | 10/1981 | Bowden, Jr. |
| 4,304,957 A | | 12/1981 | Slater et al. |
| 4,366,343 A | | 12/1982 | Slater et al. |
| 4,389,535 A | | 6/1983 | Slater et al. |
| 4,414,427 A | | 11/1983 | Slater et al. |
| 4,424,406 A | | 1/1984 | Slater et al. |
| 5,272,585 A | * | 12/1993 | Gibbs ............................. 361/64 |
| 6,737,761 B2 | * | 5/2004 | Ishida et al. .................... 307/41 |
| 7,245,008 B2 | * | 7/2007 | Lee ................................ 257/686 |
| 7,636,615 B2 | * | 12/2009 | Pfingsten et al. ............. 700/286 |
| 7,652,395 B2 | * | 1/2010 | Von Arx et al. ............... 307/112 |
| 8,269,622 B2 | * | 9/2012 | Chan et al. .................... 340/538 |
| 8,443,071 B2 | * | 5/2013 | Lu et al. ........................ 709/223 |
| 2002/0130652 A1 | | 9/2002 | Bessler |
| 2003/0175566 A1 | * | 9/2003 | Fisher et al. .................... 429/22 |
| 2004/0088083 A1 | * | 5/2004 | Davis et al. ................... 700/295 |
| 2005/0057223 A1 | | 3/2005 | Harada |
| 2006/0050464 A1 | * | 3/2006 | Von Arx et al. ............... 361/104 |
| 2006/0052905 A1 | * | 3/2006 | Pfingsten et al. ............. 700/286 |
| 2006/0086873 A1 | * | 4/2006 | Chen ........................... 248/206.5 |
| 2006/0230298 A1 | | 10/2006 | Bohlinger et al. |
| 2007/0112939 A1 | * | 5/2007 | Wilson et al. ................. 709/219 |
| 2008/0255692 A1 | | 10/2008 | Hofrichter et al. |
| 2008/0288618 A1 | * | 11/2008 | Vardi et al. .................... 709/223 |
| 2009/0147696 A1 | | 6/2009 | Park et al. |
| 2009/0224603 A1 | | 9/2009 | Perper et al. |
| 2010/0070217 A1 | | 3/2010 | Shimada et al. |
| 2010/0138092 A1 | | 6/2010 | Kohn |
| 2010/0188046 A1 | | 7/2010 | Liu et al. |
| 2010/0238003 A1 | * | 9/2010 | Chan et al. ............... 340/310.11 |
| 2010/0305773 A1 | | 12/2010 | Cohen |
| 2010/0332164 A1 | | 12/2010 | Aisa et al. |
| 2011/0106279 A1 | * | 5/2011 | Cho et al. ........................ 700/90 |
| 2011/0202293 A1 | * | 8/2011 | Kobraei et al. ................. 702/62 |
| 2013/0083805 A1 | * | 4/2013 | Lu et al. ........................ 370/401 |
| 2013/0086245 A1 | * | 4/2013 | Lu et al. ........................ 709/223 |

OTHER PUBLICATIONS (Author Unknown); "Charging Lithium-ion"; Battery University; At least as early as Nov. 10, 2010; http://batteryuniversity.com/index.php/learn/article/charging_lithium_ion_batteries; 32 pp.

(Author Unknown); "Battery Management System (BMS)"; Electropaedia; At least as early as Oct. 4, 2011; http://www.mpoweruk.com/bms.htm#smartbats (smart battery); 8 pp.

(Author Unknown); "How to Prolong Lithium-based Batteries"; Battery University; At least as early as Oct. 21, 2010; http://batteryuniversity.com/learn/article/how_to_prolong_lithium_based_batteries; 34 pp.

Tarandeep Singh; "Secrets for Prolonging Lithium-based Battery Life"; Geeknizer; May 12, 2009; http://geeknizer.com/secrets-for-prolonging-lithium-based-batteries/#ixzz1Zju0wY6H; 4 pp.

(Author Unknown); "How to Enable/Disable Battery Care Function on Sony Vaio to Improve Battery Life"; Digital Pbk (Forum); At least as early as Aug. 12, 2011; http://digitalpbk.com/hardware/sony-vaio-enable-battery-care-function-improve-battery-life; 4 pp.

(Author Unknown); "Wi-Fi Light Control"; Wi-Fi Planet (Forum); Jan. 31, 2009; http://forums.wi-fiplanet.com/showthread.php?t=9954; 5 pp.

(Author Unknown); "Why Hasn't Anyone Made Any WiFi Light Switches or Power Sockets?"; Wi-Fi Planet (Forum); Dec. 29, 2005; http://forums.wi-fiplanet.com/showthread.php?t=5584; 4 pp.

(Author Unknown); "Simplest Possible WiFi Remote Power Switch"; AVS (Forum); Sep. 15, 2011; http://www.avsforum.com/avs-vb/showthread.php?p=20977417; 5 pp.

(Author Unknown); "A Wi-Fi Controlled Power Outlet From iPhone?"; Yahoo Answers; Apr. 1, 2011; http://answers.yahoo.com/question/index?qid=20110401143408AAPQerm; 2 pp.

(Author Unknown); "Control Home Lights Via Internet With Your Computer or Wi-Fi Handheld Devices"; Squidoo; At least as early as Apr. 5, 2012; http://www.squidoo.com/control-home-lights-via-internet; 7 pp.

Harmony Gateway—Multi-Protocol HAN Gateway/Controller—Model #5010M; SimpleHomeNet; At least as early as Oct. 3, 2012; http://www.simplehomenet.com/proddetail.asp?prod=HarmonyGateway; 1 p.

"NEMA Standards Publicaiotn ANSI/NEMA WD Jun. 2002 (R2008)—Wiring Devices-Dimensional Specifications" ANSI Approval Date: Aug. 20, 2008; Published by National Electrical Manufactures Association; 9 pages.

* cited by examiner

BJT may be replaced by equivalent MOSFET or other switching element

FIG. 63
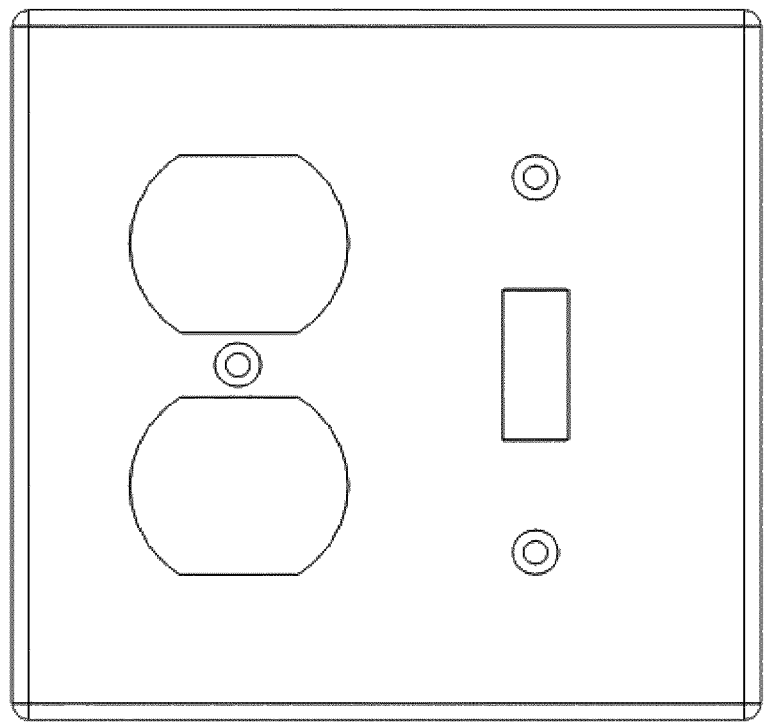
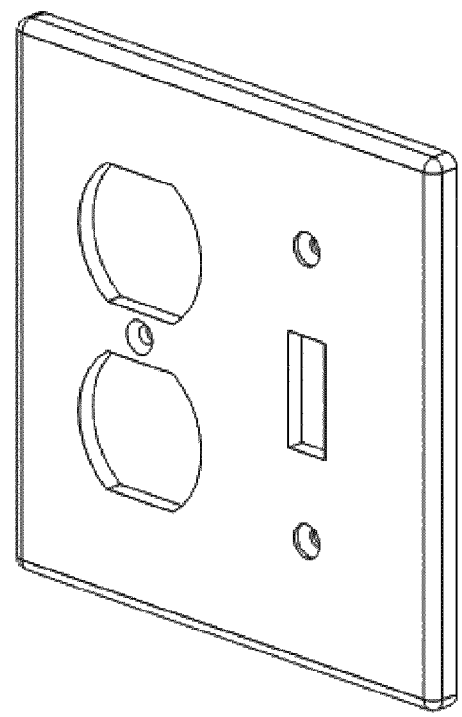

FIG. 64
6400
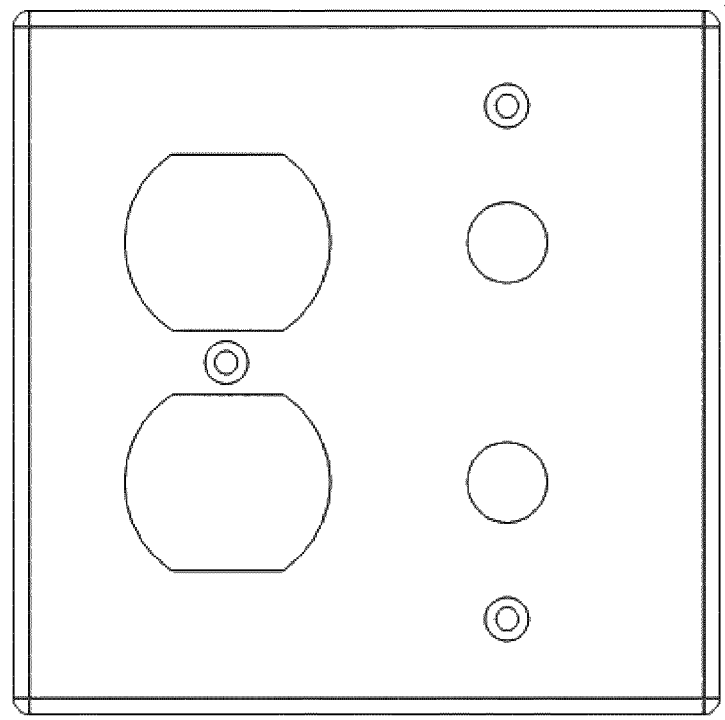
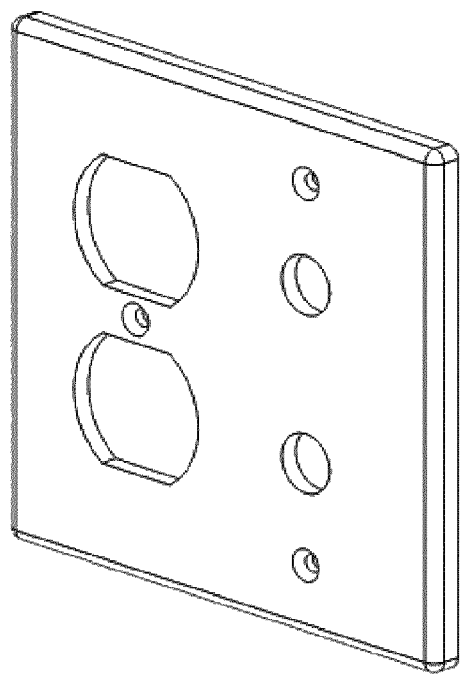

FIG. 69
6900
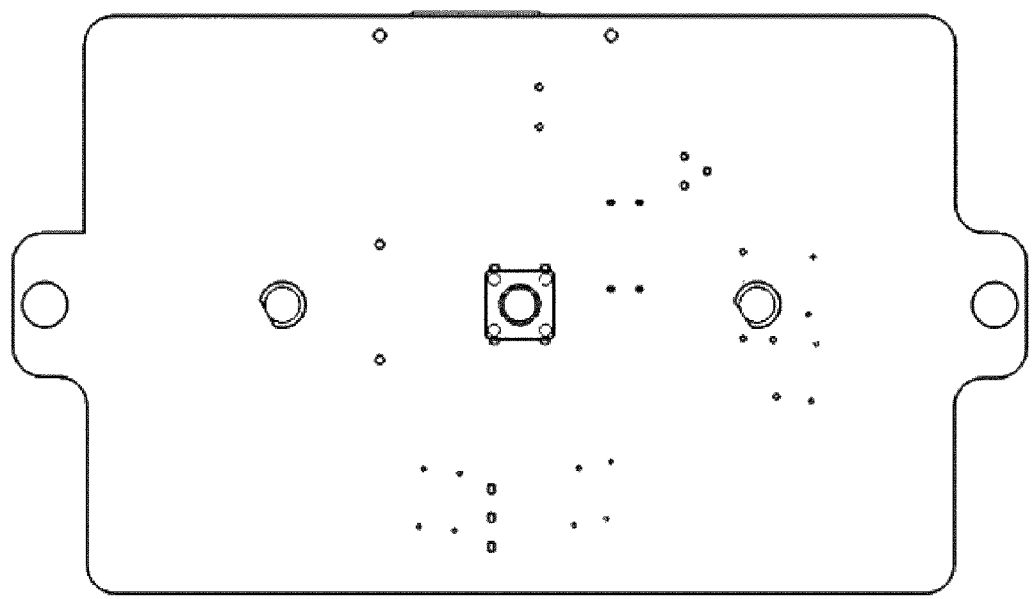
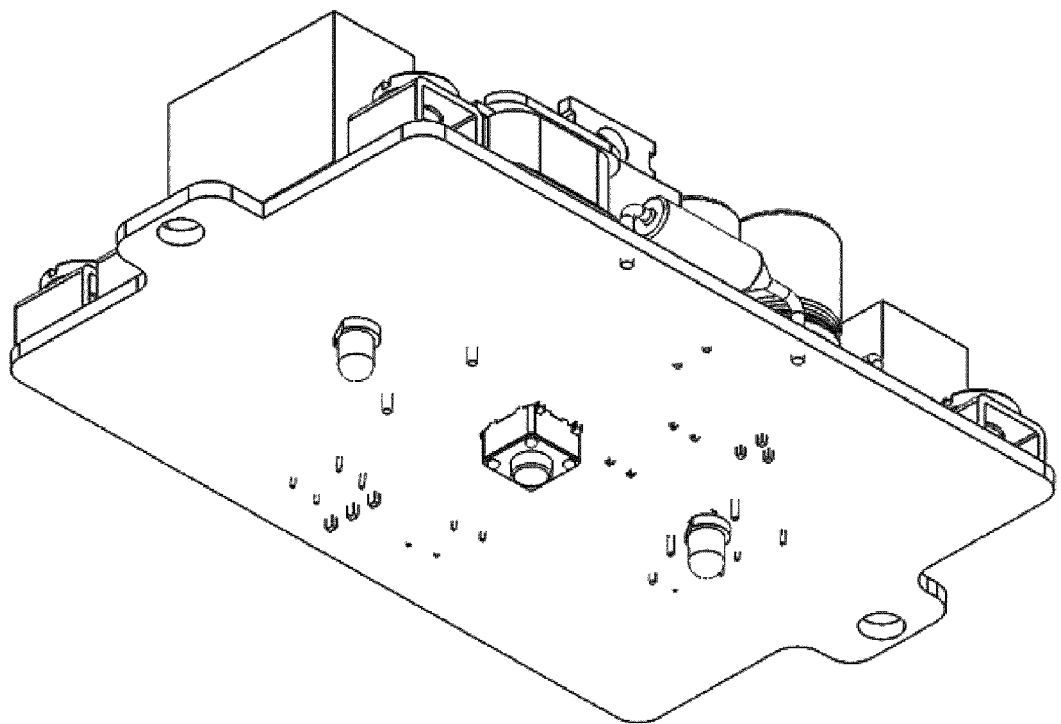

7900

POWER DISTRIBUTION SYSTEM AND METHOD

CROSS REFERENCE TO RELATED APPLICATIONS

U.S. Utility Patent Application

This application is a Continuation-In-Part and incorporates by reference U.S. Utility patent application for POWER CONTROL SYSTEM AND METHOD by inventors Jin (nmn) Lu, Todd Scott Kelly, and Lee (nmn) Cheung, filed electronically with the USPTO on Oct. 4, 2012, with Ser. No. 13/644,795, EFS ID 13909359, confirmation number 6416. This parent application will be referred to as "Document PCSM."

PCT Patent Applications

This application claims benefit under 35 U.S.C. §120 and incorporates by reference PCT patent application for POWER CONTROL SYSTEM AND METHOD by inventors Jin (nmn) Lu, Todd Scott Kelly, and Lee (nmn) Cheung, filed electronically with the USPTO on Oct. 4, 2012, with serial number PCT/US2012/058761, EFS ID 13913022, confirmation number 4896.

U.S. Provisional Patent Applications

U.S. patent application Ser. No. 13/644,795 filed Oct. 4, 2012 claims benefit under 35 U.S.C. §119 and incorporates by reference U.S. Provisional Patent Application for DATA SERVER SYSTEM AND METHOD by inventors Jin (nmn) Lu and Todd Scott Kelly, filed electronically with the USPTO on Sep. 7, 2012, with Ser. No. 61/698,288, EFS ID 13690005, confirmation number 5053.

U.S. patent application Ser. No. 13/644,795 filed Oct. 4, 2012 claims benefit under 35 U.S.C. §119 and incorporates by reference U.S. Provisional Patent Application for NETWORK INTEGRATION SYSTEM AND METHOD by inventors Jin (nmn) Lu and Todd Scott Kelly, filed electronically with the USPTO on Jul. 3, 2012, with Ser. No. 61/667,477, EFS ID 13167002, confirmation number 7946.

U.S. patent application Ser. No. 13/644,795 filed Oct. 4, 2012 claims benefit under 35 U.S.C. §119 and incorporates by reference U.S. Provisional Patent Application for POWER CONTROL SYSTEM AND METHOD by inventors Jin (nmn) Lu, Todd Scott Kelly, and Lee (nmn) Cheung, filed electronically with the USPTO on Jun. 18, 2012, with Ser. No. 61/661,100, EFS ID 13041617, confirmation number 2491.

U.S. patent application Ser. No. 13/644,795 filed Oct. 4, 2012 claims benefit under 35 U.S.C. §119 and incorporates by reference United States Provisional Patent Application for BATTERY MANAGEMENT SYSTEM AND METHOD by Jin (nmn) Lu, Todd Scott Kelly, and Lee (nmn) Cheung, filed electronically with the USPTO on Jun. 4, 2012, with Ser. No. 61/655,099, EFS ID 12925066, confirmation number 3071.

U.S. patent application Ser. No. 13/644,795 filed Oct. 4, 2012 claims benefit under 35 U.S.C. §119 and incorporates by reference U.S. Provisional Patent Application for SMART BATTERY CONTROLLER by inventor Jin (nmn) Lu, filed electronically with the USPTO on Oct. 4, 2011, with Ser. No. 61/542,811, EFS ID 111041133, confirmation number 3411.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention generally relates to systems and methods that control or switch power to a variety of electrical devices. Specifically, the present invention in many preferred embodiments has application to home/commercial power control automation systems in which electrical power to appliances and other electrical loads is controlled via commands received from a local or remote computer network.

In many preferred embodiments the present invention allows electrical loads to be controlled locally or remotely via an Internet-capable device (e.g., a smartphone, a tablet, or laptop) and provides a non-intrusive, secure, and blended load control interface that is compatible with home and commercial computer networks.

In many preferred embodiments the present invention allows the electrical infrastructure within new or old building construction to be upgraded to include local/remote control of electrical loads without the need for additional infrastructure-specific support of these switching and monitoring functions.

PRIOR ART AND BACKGROUND OF THE INVENTION

Background

There is a high demand in home automation/home energy control market for an easy to use home automation device—a wirelessly and remotely controlled AC power switch that can turn on and off AC power supply to consumer electronic devices and measure the energy consumption of the consumer electric loads. This demand is obvious in numerous consumer forums and is widely discussed in the prior art.

Such a home automation device can be configured to automatically turn on and off a consumer device at a chosen time and on certain conditions. In addition, the device measures the energy consumption and uses that information for energy usage planning and "smart" switching of the electronic device. This improves the quality of life as well as reducing energy consumption.

A home automation device that can remotely switch on and off AC power switch is not new. The prior art teaches power line based AC switches by which the control command is send over the power line and wireless AC switches where the control command is sent over a wireless link. These home automation devices can be categorized into two groups:

Non-Internet based home automation devices. A remote controller is required to send the control command to the devices over a communication protocol not compatible with Internet. Consumers cannot control them from anywhere. Examples are ZIGBEE® and Z-wave based devices.

Internet based home automation devices. These devices can be accessed with Internet capable equipment, such as a smartphone or a laptop. Existing Internet based home automation devices, however, suffer the following drawbacks:

Consumers cannot easily access the devices both at home and away from home.

Consumers have to log on to a service provider's website while away from home, and from there read the data and control the automation device. Consumers cannot communicate with the device directly. This presents some security issues as well as performance issues.

This type of device is usually intrusive to existing home network as consumers either need to get a new home gateway to work with the automation device or add a new router or hub to the home network to "relay" the signals.

Home Automation Networking

Most homes today have the last mile communication connection (e.g., a cable link, a fiber optic or a telephone line). Inside a home there is a gateway device that terminates the last mile network and routes the signal between the consumer devices at home and the network outside home. The communication of the gateway with the home devices can be wireline or wireless. Wireline communication includes power line, cable, and Ethernet. But predominantly, the communication trend is wireless based on WiFi. The communication of the home gateway with home devices forms home network. In this document, it will be assumed that the home gateway is a WiFi AP and that the home network is a WiFi home network.

Existing home energy management system or a home automation system is a system that has a two-way communication with a service provider (e.g., a utility company or a security company) which monitors the home power consumption and exerts control such as switching on and off a device.

The challenges these systems encounter in their home deployment are:

Service Provider Centric vs. Consumer Centric—The service providers have the control, with consumers permission, over when and what data to collect and when and what device to control. This is a service provider centric approach. There are privacy issues and the issues of consumer's ability to access the data. For example, when a consumer is at home, must he/she login to a service provider's site to look at data and exercise control or can he/she easily access the information and exercise control directly from/to the automation devices at the home, from a laptop or a smartphone. Deployed automation and energy management systems of today require the consumer to remotely login to a service provider site for information and provides no method for easy and direct access to or control over the device.

Network Issues—When an automation device is deployed at home, it either has to work with existing home residential gateway (the AP) or replace the existing home gateway with a new home gateway that knows how to communicate with the automation device. With ZIGBEE®as part of the many automation/energy management system, it is frequently the case that a new home gateway must be used in place of the existing one. This "intrusive" setup that often requires professional setup forces consumers to make changes in their home network setup. In addition, once the energy management network is deployed at a home, it is not easy to deploy additional energy management devices from other vendors.

Performance—As mentioned above, many existing home energy systems do not allow consumers to access or control them DIRECTLY via a smartphone or a tablet, even if the user is proximal to the energy system. Instead the consumer must either have to use a dedicated device like a remote control or have to go to a service provider's website to exercise control. It involves sending signals to the home gateway, to an Internet server, and back to the home gateway and back to the consumer's automation device. As a result, it introduces delays, sometimes significant delays, depending on the overall network traffic.

Deficiencies in the Prior Art

The prior art as detailed above suffers from the following deficiencies:

Prior art power distribution systems generally do not permit integration of disparate types of home automation networks.

Prior art power distribution systems generally do not interface well with the Internet and rely on proprietary interface protocols operating within a locally defined network interface to affect power distribution functions.

Prior art power distribution systems generally do not permit "nesting" or "subnetting" of control networks to define hierarchical control domains that can be accessed remotely via the Internet or some other network interface.

While some of the prior art may teach some solutions to several of these problems, the core issue of integrating disparate home automation networks with Internet based communication control systems has not been solved by the prior art.

Objectives of the Invention

Accordingly, the objectives of the present invention are (among others) to circumvent the deficiencies in the prior art and affect the following objectives in the context of a Smart Gateway Power Controller (SGPC):

(1) Provide for a power distribution system and method that permits consumers to directly communicate with the SGPC locally or remotely.

(2) Provide for a power distribution system and method that permits seamless integration with existing home network with no change or addition to the home network being necessary.

(3) Provide for a power distribution system and method that permits the SGPC to be configured to have its own subnet that is separate from existing home network, with the subnet communicating with the existing home network through the SGPC. The advantage of this "separation" is that the SGPC subnet can be insulated from the dynamic nature of home network. The SGPC can have its own static IP address so that a laptop can easily access it.

(4) Provide for a power distribution system and method that permits hosting an AC power switch that consumers can access from anywhere to see its status and turn it on and off.

(5) Provide for a power distribution system and method that permits a SGPC to contain an energy consumption measurement unit that consumers can access from anywhere.
(6) Provide for a power distribution system and method that permits a consumer to access a SGPC to configure the time and condition based on whether the switch is turned on or off.
(7) Provide for a power distribution system and method that permits a SGPC to send (push) messages to their devices (e.g., a smartphone, tablet computer, etc.). These messages contain any information from switch status to power consumption data.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

BRIEF SUMMARY OF THE INVENTION

System Overview (0100)

The present invention in various embodiments addresses one or more of the above objectives in the following manner. The present invention as generally depicted in FIG. 1 (0100) implements a Smart Gateway Power Controller (SGPC) (0110) that acts as a bridge between a power source (0101) and associated power source cabling (0102) and power load cabling (0103) to supply power to one or more electrical loads (0104). The SGPC (0110) incorporates a power switch (0111) and power/energy meter (0112) that are interfaced to a microcontroller unit (MCU) (0113) or other computing device operating under control of software read from a computer readable medium (0114). The MCU (0113) interfaces with one or more WiFi wireless network interface modules (0115, 0116) which communicate to one or more computer networks that may include the Internet, local computer networks, and/or other networks such as ZIGBEE®, etc.

System Application Context (0200)

A typical application context for the present invention is generally illustrated in FIG. 2 (0200), wherein a user (0201) interfaces with a graphical user interface (GUI) (0210) that may be embodied on any number of devices including but not limited to a mobile phone (0211), laptop/desktop computer (0212), and/or tablet computer (0213). This GUI typically operates under control of software read from a computer readable medium (0202) that incorporates network protocols that communicate over a computer network (0203) (such as the Internet) to a local wireless router (0204). This wireless router (0204) then communicates with one or more SGPC devices (0221, 0222, 0223) to control power switching to any number of load devices (0231, 0232, 0233, 0234) using any number of SGPC associated power receptacles.

Method Overview

The present invention system may be utilized in the context of an overall power distribution method, wherein the power distribution system described previously is controlled by a method having the following steps:

(1) sending a periodic message from the SGPC to a proxy server containing the SGPC ID, password, router IP ADR, port, and subnet vector/path;
(2) storing the SGPC periodic message with a proxy server in an SGPC ID translation database;
(3) requesting a SGPC ID translation by the proxy server from a user interface;
(4) validating the SGPC ID and password provided by the user interface using the proxy server;
(5) determining if the SGPC ID and password are valid, and if not, proceeding to step (7);
(6) returning the router IP ADR, port, and subnet vector/path for the SGPC to the requesting user interface and proceeding to step (8);
(7) returning an error code and ignoring the SGPC translation request; and
(8) terminating the method.

Integration of this and other preferred exemplary embodiment methods in conjunction with a variety of preferred exemplary embodiment systems described herein is anticipated by the overall scope of the present invention.

Alternate Method Overview

The present invention system may be utilized in the context of an overall alternate power distribution method, wherein the power distribution system described previously is controlled by a method having the following steps:

(1) registering a communication device with the SGPC using an e-mail address, phone number, or other device identifier;
(2) notifying the communication device via the SGPC of any change in the SGPC IP address, port number, subnet vector by periodically sending update messages to the communication device;
(3) retrieve the latest IP address/port for the SGPC from the received SGPC update messages and retain the latest IP address/port for use in communicating with the SGPC; and
(4) terminating the method.

Integration of this and other preferred exemplary embodiment methods in conjunction with a variety of preferred exemplary embodiment systems described herein is anticipated by the overall scope of the present invention.

BRIEF DESCRIPTION OF THE DRAWINGS

For a fuller understanding of the advantages provided by the invention, reference should be made to the following detailed description together with the accompanying drawings wherein:

FIG. 63 illustrates front/perspective views of a preferred exemplary quad wall switch faceplate with rectangular cutout for toggle/pushbutton switch activation of the SGPC module;

FIG. 64 illustrates front/perspective views of a preferred exemplary quad wall switch faceplate with circular cutouts for toggle/pushbutton switch activation of the SGPC module and/or LED indicators and/or sensors;

FIG. 69 illustrates bottom and perspective views of a preferred exemplary SGPC PCB module implementation that may be suitable for use in a duplex wall electrical box application;

DESCRIPTION OF THE PRESENTLY PREFERRED EXEMPLARY EMBODIMENTS

Figure 1:
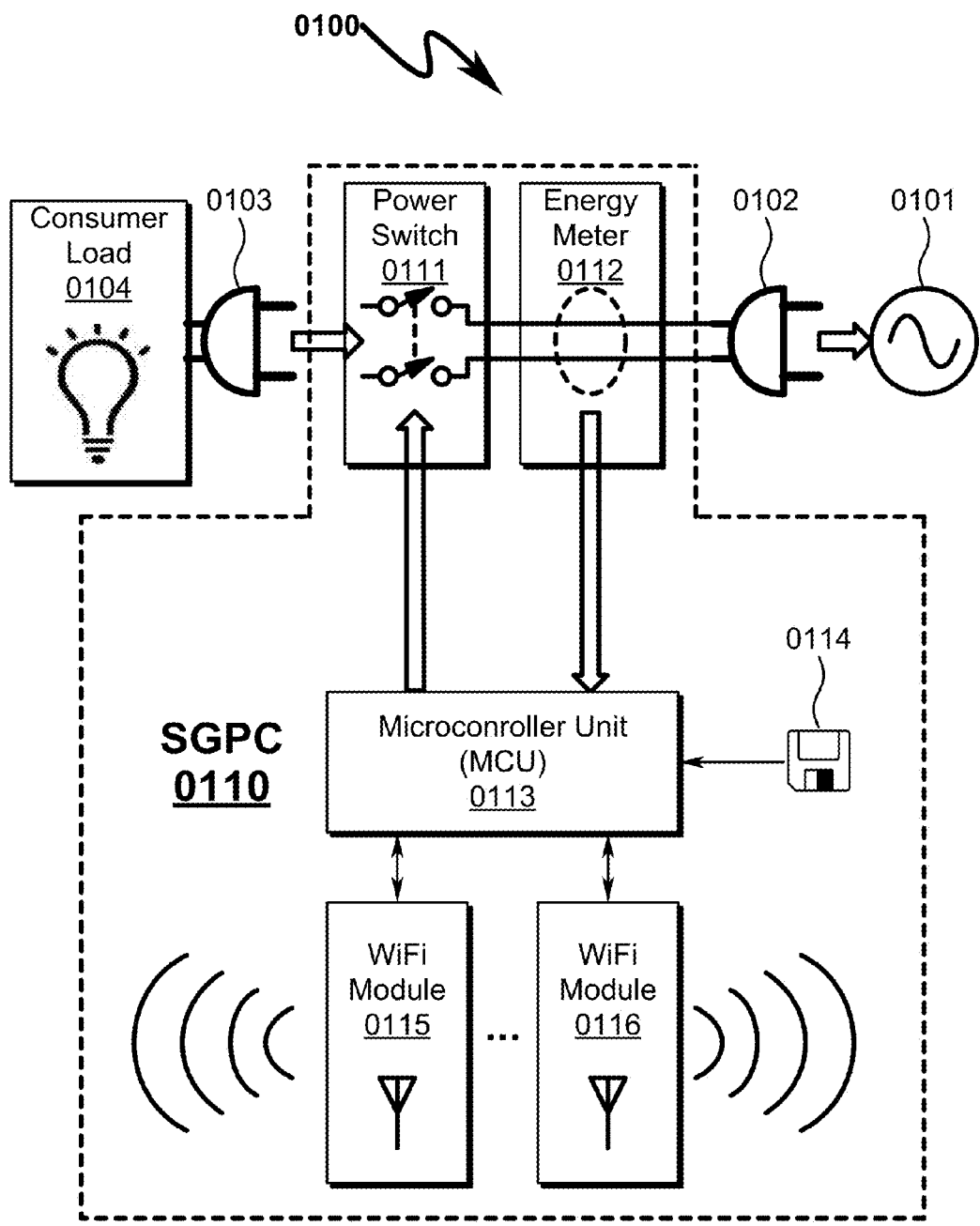
FIG. 1 illustrates a system block overview diagram describing a presently preferred embodiment of the present invention.

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a POWER DISTRIBUTION SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Integration Level Exemplary

The present invention as depicted herein is exemplary of one or more preferred embodiments, but the level of integration illustrated is only exemplary and in no way limits the packaging or deployment of the disclosed invention teachings.

Enclosure/Faceplate not Limitive

The present invention anticipates a wide variety of enclosures and/or faceplates may be utilized in various invention embodiments. Many of these will comply with general guidelines from industry specifications such as ANSI/NEMA WD 6-2002 or the like which specify electrical enclosures associated with wall switches, electrical outlets, and the like. The present invention will describe these associated enclosures as having a generally "rectangular cuboid" shape. Note, however, this definition is generally less restrictive than that of the mathematical definition because it assumes that in many circumstances the faces of the rectangle may not meet at exactly right angles (to permit a "draft" when creating the box using an injected molding process). Furthermore, "rectangular cuboid" in this context will normally mean a 5-sided structure having one open face to accommodate a faceplate supporting a switch, sensor, electrical outlet, or blank face. These structures will also typically incorporate rear and/or sidewall knockouts or other structures designed to accommodate cable management/restraint/strain-relief for incoming/exiting wiring harnesses.

In geometry, a cuboid is a convex polyhedron bounded by six quadrilateral faces, whose polyhedral graph is the same as that of a cube. While some mathematical literature refers to any such polyhedron as a cuboid, other sources use "cuboid" to refer to a shape of this type in which each of the faces is a rectangle (and so each pair of adjacent faces meets in a right angle); this more restrictive type of cuboid is also known as a rectangular cuboid, right cuboid, rectangular box, rectangular hexahedron, right rectangular prism, or rectangular parallelepiped.

New Work/Old Work Electrical Boxes not Limitive

The present invention specifically anticipates that some SGPC embodiments are configured to be installed within standard electrical boxes used in building construction. These electrical boxes may take many forms, including but not limited to "new work" and "old work" styles. Within the construction trades, it is common to refer to electrical boxes configured for original/new construction as "new work" boxes as they are configured to be installed BEFORE wall/gypsum board is installed over the structural lumber and 2×4s. In contrast, "old work" electrical boxes are configured to be installed AFTER wall/gypsum board is installed over the structural lumber and 2×4s.

Electrical Box Construction not Limitive

The present invention in some embodiments may illustrate typical electrical boxes in some applications as provided by manufacturers such as CARLON®, RACO®, SLATER®, PASS & SEYMOUR®, etc. the present invention is not limited in scope to application with these particular manufacturers or construction configurations.

Motion Sensor not Limitive

In some preferred invention embodiments a motion sensor may be incorporated within the context of the present invention application. The present invention anticipates that infrared motion sensors may be optimal in this context, but is not necessarily limited to this particular selection. In some contexts, "motion" may be detected using video cameras, audio detection, temperature detection, or other methodologies. In addition, the motion detection function in this context may be passive (using only a receiving sensor) or may be implemented in combination with an active transmitter (as in the case of an infrared detector used in combination with an infrared illumination source or an ultrasonic detector used in conjunction with an ultrasonic emitter). Thus, the present invention makes no limitation on the scope of motion detection within this application context. Note that the use of infrared sensors in this context may permit the motion detection system to detect ambient room temperature (static background readings) as well as motion (dynamic activity readings).

The use of audio and/or video sensors in this application context may in some preferred embodiments permit live streaming audio and/or video to be sent to a remote host using the mesh network of SGPCs as a communication transportation conduit. This capability in conjunction with the ability for temperature sensing by the motion detector may in some applications be advantageously applied to whole-building surveillance/security/fire monitoring systems.

Power Receptacle not Limitive

Some application contexts of the present invention may incorporate a power receptacle suitable for use with a standard National Electrical Manufacturers Association (NEMA) (typically two or three-prong) line power cord. The present invention makes no limitation on the type of power receptacle used within the invention scope and anticipates that any NEMA compliant power receptacle may be used in this application context. Note that some application contexts may be directly wired into a building or equipment infrastructure and may dispense with any power receptacle.

Power Switch not Limitive

Some application contexts of the present invention may incorporate a power switch compliant with standard National Electrical Manufacturers Association (NEMA) (typically SPST or DPDT) specifications. The present invention makes no limitation on the type of power switch used within the invention scope and anticipates that any NEMA compliant power switch may be used in this application context. In some contexts the traditional NEMA-style ON/OFF toggle switch may be replaced by a pushbutton. Note that some application contexts may be directly wired into a building or equipment infrastructure and may dispense with any power switch and/or may be configured to operate in a different context with respect to the switch presented at the wall switch faceplate.

Computing Device not Limitive

The present invention may make use of a wide variety of computing devices in its general theme of construction. While microcontroller unit (MCU) construction may be optimal in many circumstances, the present invention is not limited to this particular form of construction and the term "computing device" and "MCU" should be given their broadest possible definitions in this context.

Within many preferred invention embodiments a preferred MCU may be selected from System-On-Chip Integrated Circuits (SOC ICs) such as those sourced by Gainspan Corporation, 3590N. First Street, Suite 300, San Jose, Calif. 95134, (408) 627-6500, such as exemplary models GS2000/GS1011SoC. Additionally, wireless modules integrating WiFi and/or ZIGBEE® communications capabilities are also anticipates as being suitable for many preferred invention embodiments, including but not limited to modules GS2011M, GS2100M, GS1011M, GS1011MIC, GS1011MIPS, GS1011MEPS/MEEES, GS1500M, and GS1550M.

Within many preferred invention embodiments a preferred MCU may be selected from System-On-Chip Integrated Circuits (SOC ICs) such as those sourced by Texas Instruments Incorporated, Post Office Box 655303, Dallas, Tex. 75265, such as exemplary models CC2530/CC2531.

Portable Computing Device not Limitive

The present invention anticipates a wide variety of applications for the power distribution system/method taught herein. Within the application context, the term "portable computing device" and its variants should be given its broadest possible interpretation, to include but not bet limited to laptop computers, cellphones, tablet computers, and other like and typical applications where computing devices are configured in a portable or semi-portable manner. While the present invention anticipates that the computational capability of the "computing device" described herein may vary widely, it is anticipated that some aspects of the present invention may be implemented using software embodied in computer readable program code means embodied on a tangible medium that is computer readable.

Invention Nomenclature

The following nomenclature is generally utilized to describe the invention herein:
Home Area Network (HAN) or Home Network—A residential or commercial local area network (LAN) for communication between digital devices typically deployed in the home, usually desktop computers and accessories, such as printers and mobile computing devices.
Home Gateway—A home networking device, used as a gateway (router) to connect devices in the home to the Internet.
Subnetwork or Subnet—A logically visible subdivision of an IP network. The practice of dividing a single network into two or more networks is called subnetting and the networks created are called subnetworks or subnets.
Sub-Gateway—A gateway which itself is a device in the main HAN, but is a gateway to a subnet separate from the main HAN.
WiFi—A popular technology that allows an electronic device to exchange data wirelessly (using radio waves) over a computer network, including high-speed Internet connections.
WiFi Access Point or AP—A device that allows WiFi stations (clients) to connect to each other, the AP and a wired network. An AP usually connects to a router (via a wired network), and can relay data between the wireless devices (such as computers or printers) and wired devices on the network.
WiFi Station or STA—A device that has the capability to use the 802.11 protocol. For example, a station may be a laptop, a desktop PC, PDA, Wi-Fi phone. A STA may be fixed, mobile or portable. The terms station, wireless client, and node are often used interchangeably, and no strict distinction exists between these terms.
ZIGBEE®—A specification for a suite of high level communication protocols using small, low-power digital radios based on an IEEE 802 standard for personal area networks.
Home Automation—Automation of the home, housework or household activity. Home automation may include centralized control of lighting, HVAC (heating, ventilation and air conditioning), appliances, and other systems, to provide improved convenience, comfort, energy efficiency, and security.
Home Energy Management System—An extension of EMS into home, where a smart thermostat, a smart meter and a few load control switches are installed and can be remotely accessed (read) and controlled.
IP Address—A numerical label (e.g., 10.10.100.254) assigned to each device (e.g., computer, printer) participating in a computer network that uses the Internet Protocol for communication.
Port—Associated with an IP address of the host, identifying an application or a server on the host.
Port Number—A 16-bit number identifying a port. A networking application is uniquely identified by the pair of IP address and port number.
Public IP address—An IP address that can be globally pinged or routed from Internet.
Private IP Address—An IP address of a device associated with a private network (e.g., a home network).
Firewall—A technological barrier, usually residing at a home gateway, designed to prevent unauthorized or unwanted communications between computer networks or hosts.
Network Address Translation (NAT)—The process of modifying IP address information in IP packet headers while in transit across a traffic routing device. A home gateway usually employs this mechanism to route data between public Internet and private home network.

Smart Gateway Power Controller (SGPC) System Overview

The Smart Gateway Power Controller (SGPC) forms the basis of much of the functionality in the present invention and addresses the deficiencies associated with the prior art home automation systems. FIG. 1 (0100) generally illustrates the functional blocks of a typical SGPC, with one or more functional blocks being physically implemented as one component. It generally comprises a small form-factor device directly plugged into a power outlet. It contains one or more power sockets, into which consumers plug in power suppliers to their home appliances. One or more independent relay switches controlled by the MCU are connected to the socket(s). The switch(s) can be turned on and off by the MCU. A typical SGPC can measure the energy consumption of the plugged in appliances in terms of instant power consumption (watt), energy consumption (watt-hour), voltage and current. A typical SGPC is a cost-effective 3-in-1 home automation device: network gateway+load control switch+energy measurement. The small form factor of this device has the size of a regular power adaptor. On the networking side, it comprises two-way communication with the Internet and 2-way DIRECT communication with a WiFi devices (PC, laptop, smartphone) at home.

A SGPC may optionally contain an alternative wireless module to communicate with an existing home automation device, to provide the latter the capability to be accessed from Internet. An existing automation device can be a ZIGBEE® or Z-wave based device.

Figure 2:
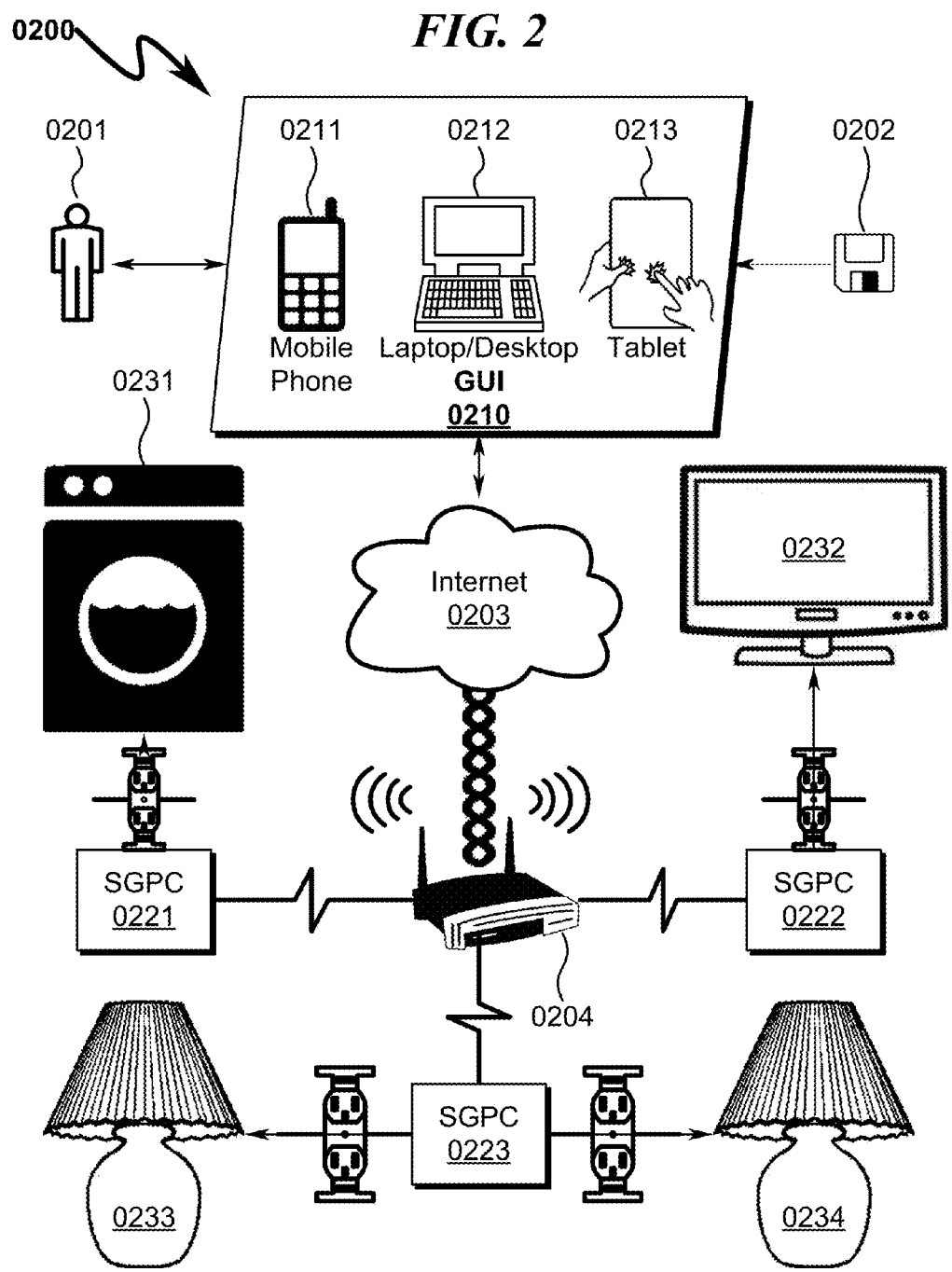
FIG. 2 illustrates an exemplary communications network diagram describing a presently preferred system embodiment of the present invention.

FIG. 2 (0200) generally illustrates the usage of the SGPC device. The following describes a typical use case scenario:
User opens a web page of a SGPC from anywhere at home or outside with her smartphone by typing a URL address along with some security information (e.g., password, etc.).

The web page shows switch status, energy consumption of the connected consumer device(s) at home.

User clicks a button to turn on or off a switch instantly or choose a schedule—time based or event based—to turn on or off the switch at a later point.

User then registers his email address in the web page for the SGPC to forward any events or message to their email account (e.g., switch status change, energy consumption above a threshold, etc.).

User also downloads a (platform independent) software program or data to their smartphone that would provide additional functionality, for example, to view a histogram of her energy consumption in a more detailed fashion on their smartphone.

This system can be better described in terms of the networking architecture, functionality provided by the SGPC, and interaction between users and a typical SGPC configuration. This information is provided in more detail below.

Networking Architecture

Network Structure: Subnet and Sub-Gateway (0300, 0400, 0500, 0600, 0700)

Figure 3:
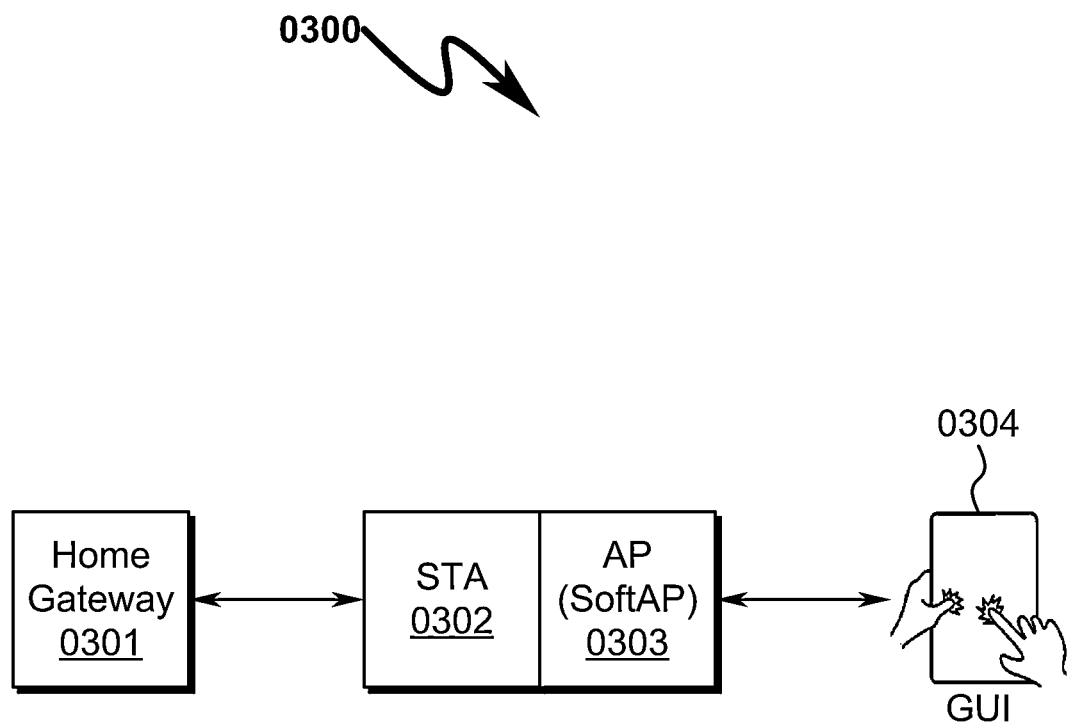
FIG. 3 illustrates a system block diagram describing how a SGPC plays two roles (AP and STA) in some present invention embodiments.

A SGPC works with home residential gateway as a client (station), and use the residential gateway to communicate with the Internet cloud. On the other side, it serves as a secondary or sub-gateway to a subnet that consists of a set of WiFi based client devices it has control over, as well as any consumer devices that can communicate with it. If the SGPC has the wireless interface to communicate with ZIGBEE®devices, it can also control and read data from the latter. FIG. 3 (0300) illustrates the two roles a SGPC plays.

Figure 4:
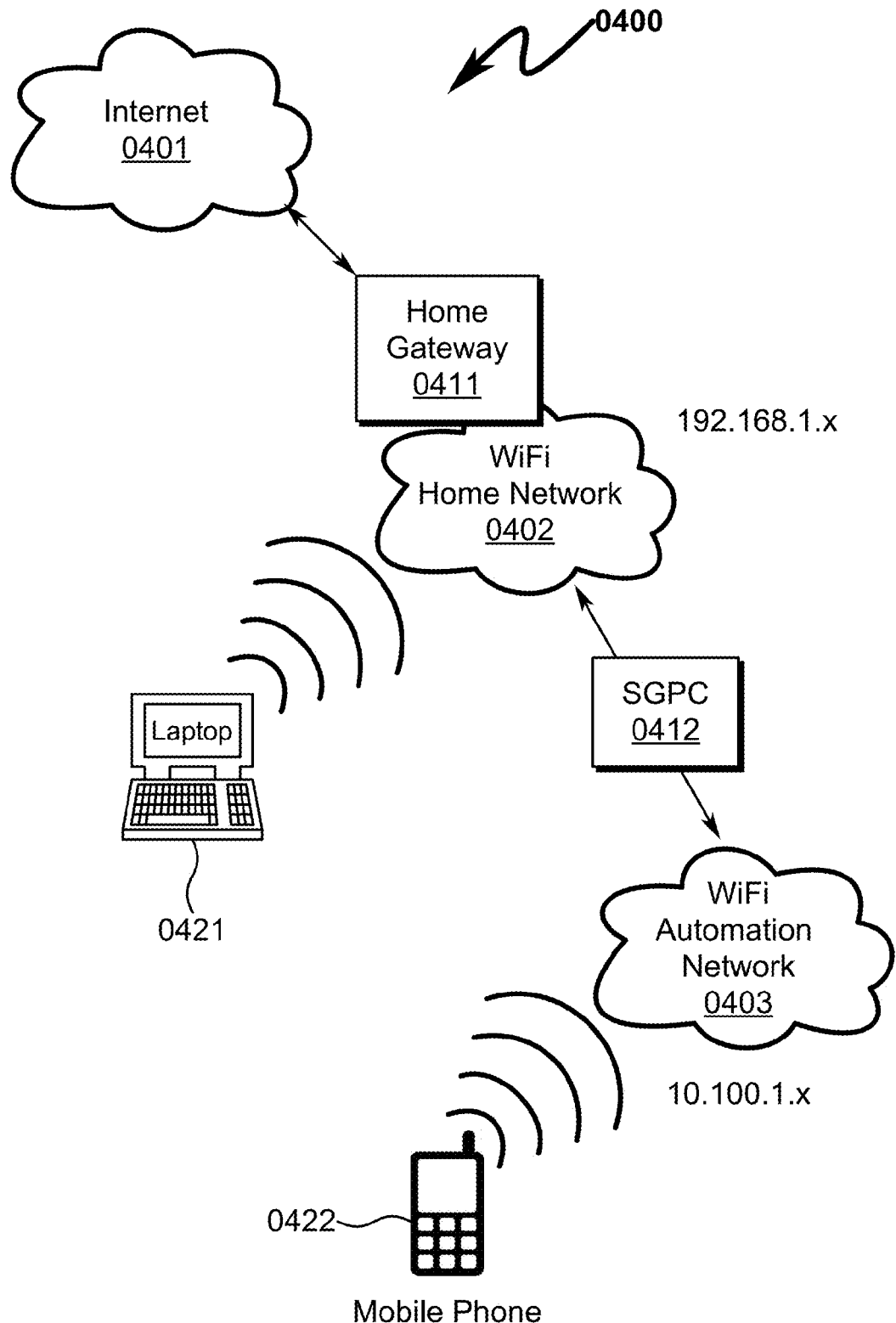
FIG. 4 illustrates a network diagram describing a typical WiFi home automation Subnet.

In other words, SGPC is a sub-gateway that "separates"the home automation network from the existing home network, while having the two networks communicating with each other. The home automation network has different subnet address than that of the home network. FIG. 4 (0400) illustrates a typical configuration setup.

A SGPC can communicate with WiFi and ZIGBEE® based sensors, and the sensor data can be used to schedule turning on and off the switch, as well as reported to consumers. It can communicate with any devices (WiFi based, ZIGBEE® based, another SGPC) devices to coordinate the control actions.

Figure 5:
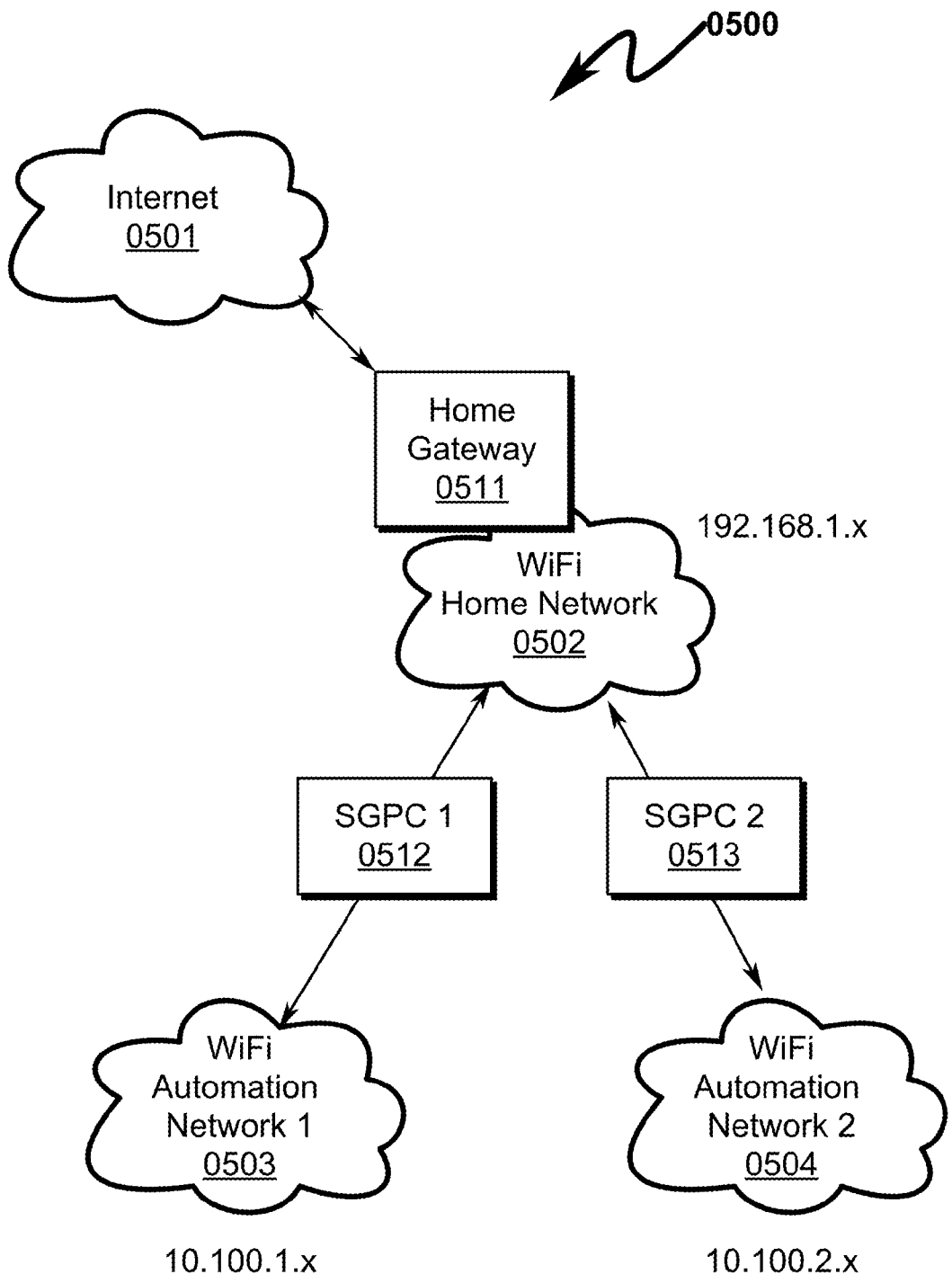
FIG. 5 illustrates an exemplary network diagram describing two SGPCs and their subnets that are both connected to a home gateway.
Figure 6:
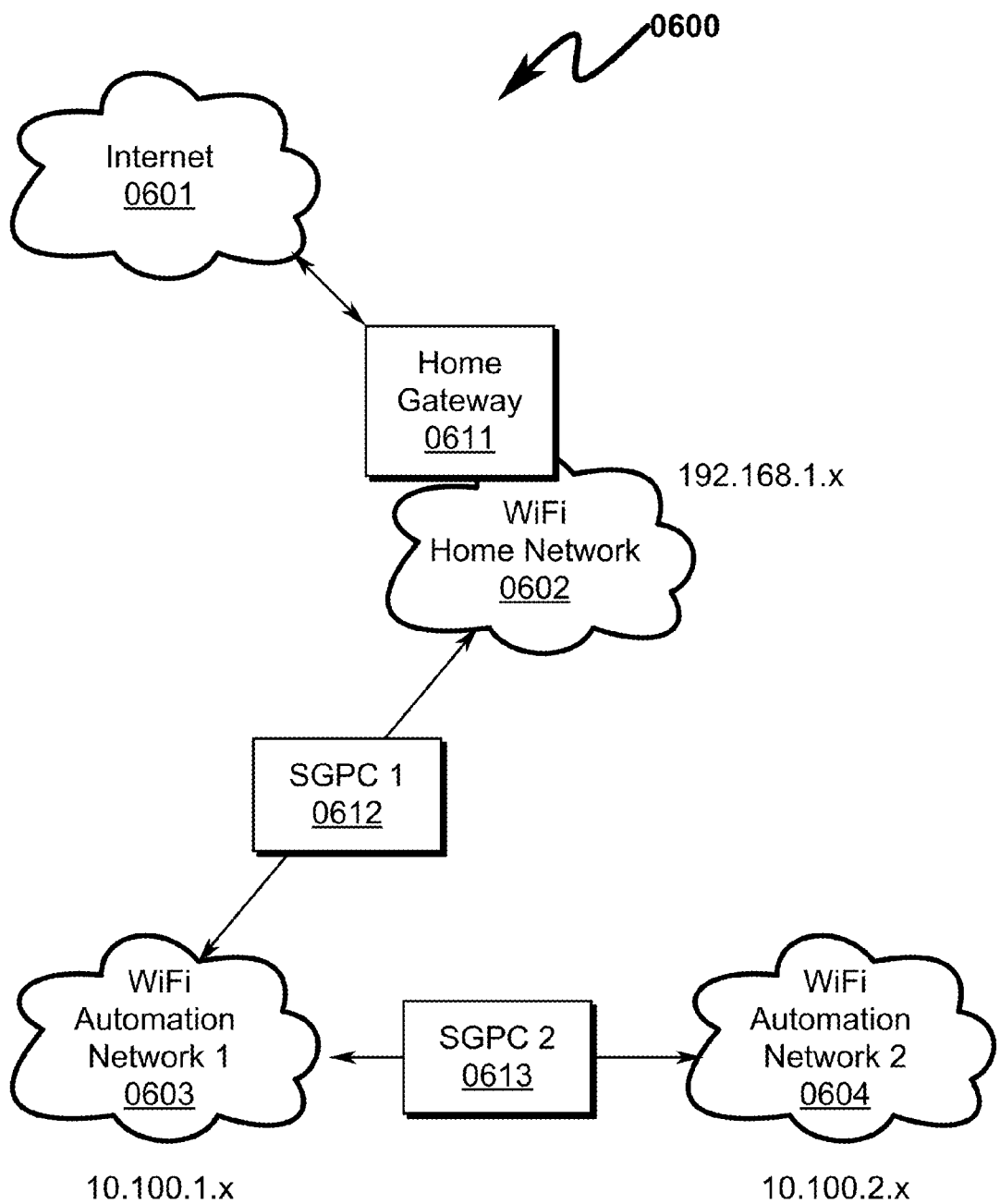
FIG. 6 illustrates an exemplary network diagram describing two SGPCs and their subnets that are both connected to each other (subnet "gatewayed" by an earlier deployed SGPC)

FIG. 5 (0500) and FIG. 6 (0600) illustrate examples of multiple SGPC devices with different network topologies. These SGPC have their own subnet and can talk to each other as in an IP mesh network.

Figure 7:
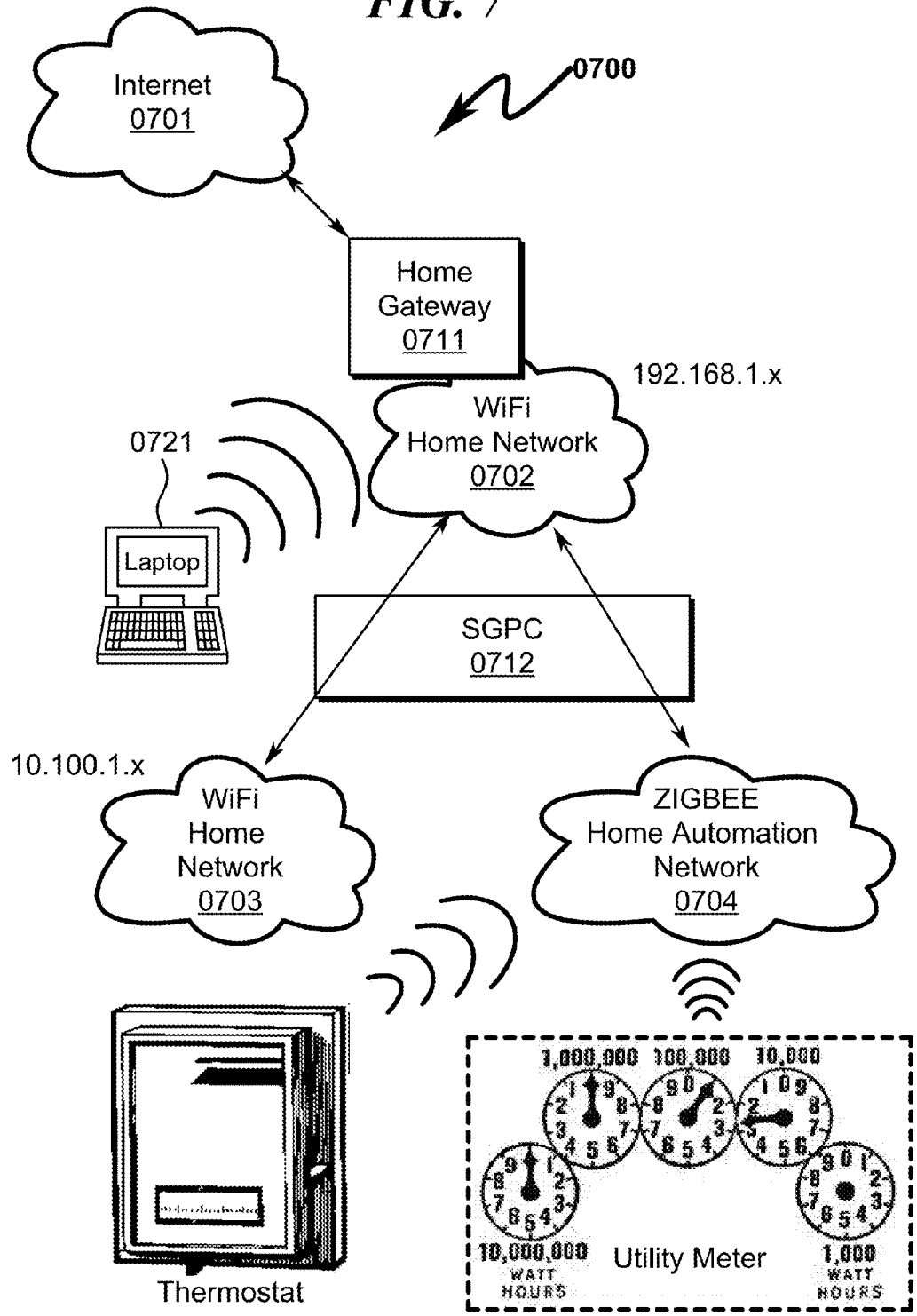
FIG. 7 illustrates an exemplary network diagram wherein a SGPC communicates with a ZIGBEE® network.

FIG. 7 (0700) shows a case where SGPC can communicate with ZIGBEE® network. As an example of multiple SGPC communicating with each other, when a TV is turned on with one SGPC, the light controlled by another SGPC may be turned off.

Another example is that when a ZIGBEE® based temperature sensor reads a data above a threshold (set by consumer on the SGPC), the SGPC connected to an air conditioner turns on. The advantage of separating the switch and sensors, as opposed to the thermostat where the switch and sensor are in the same location, is that users can put the sensor anywhere in which they want the air conditioner responsive.

It should be noted that the network architecture described here is different from the WiFi ad-hoc and WiFi-direct mode in that:

WiFi ad-hoc is a point-to-point communication while the present invention architecture is point-to-multiple points; and WiFi-direct cannot have its own subnet, and does not have the relay/routing capability mentioned above.

WiFi-direct is good for point to point communication, but not for a server-client situation.

Access of SGPC

When a consumer is at home, he/she communicates as a station directly with a SGPC as an AP. Any WiFi devices can directly communicate with a SGPC within a coverage distance (e.g., 100-300 ft.). If a WiFi (client) device, while communicating with a SGPC (checking the switch status, etc.), needs to communicates with Internet, the SGPC will "relay" the messages to the home gateway which in turn sends the messages to Internet.

When a consumer is outside home communicating with a device at home, she/he may have the problem of not knowing the private IP address assigned to a SGPC and being blocked by the home gateway's firewall. The present invention in some preferred embodiments allows consumers to communicate with a SGPC at home in one of the two ways described below:

Proxy Server Mode (Pull Mode)

A server on the Internet that keeps track of the IP address and port number of a SGPC at home. The IP address is usually the IP address of the home gateway assigned by the ISP, and the port number tells the home gateway the target device at home to which the message is forwarded. This is called NAT (network address translation).

The SGPC sends a message periodically or when its IP address and port number are changed, and the server will get the IP address from the message. ISP tend to rotate IP addresses assigned to home gateways periodically, and this message will notify any change mentioned here to the server.

The server keeps a database where each record is a map between a device and its latest IP address and port number among other things.

When a user wants to communicate with a SGPC, he/she gets on the web page of the server with the name of the SGPC and login with security information (e.g., password, etc.).

The server will provide the IP address and port number, and from that point on, the user directly communicates with the SGPC.

Exemplary Proxy Server (Pull) Mode System Embodiment (1700)

Figure 17:
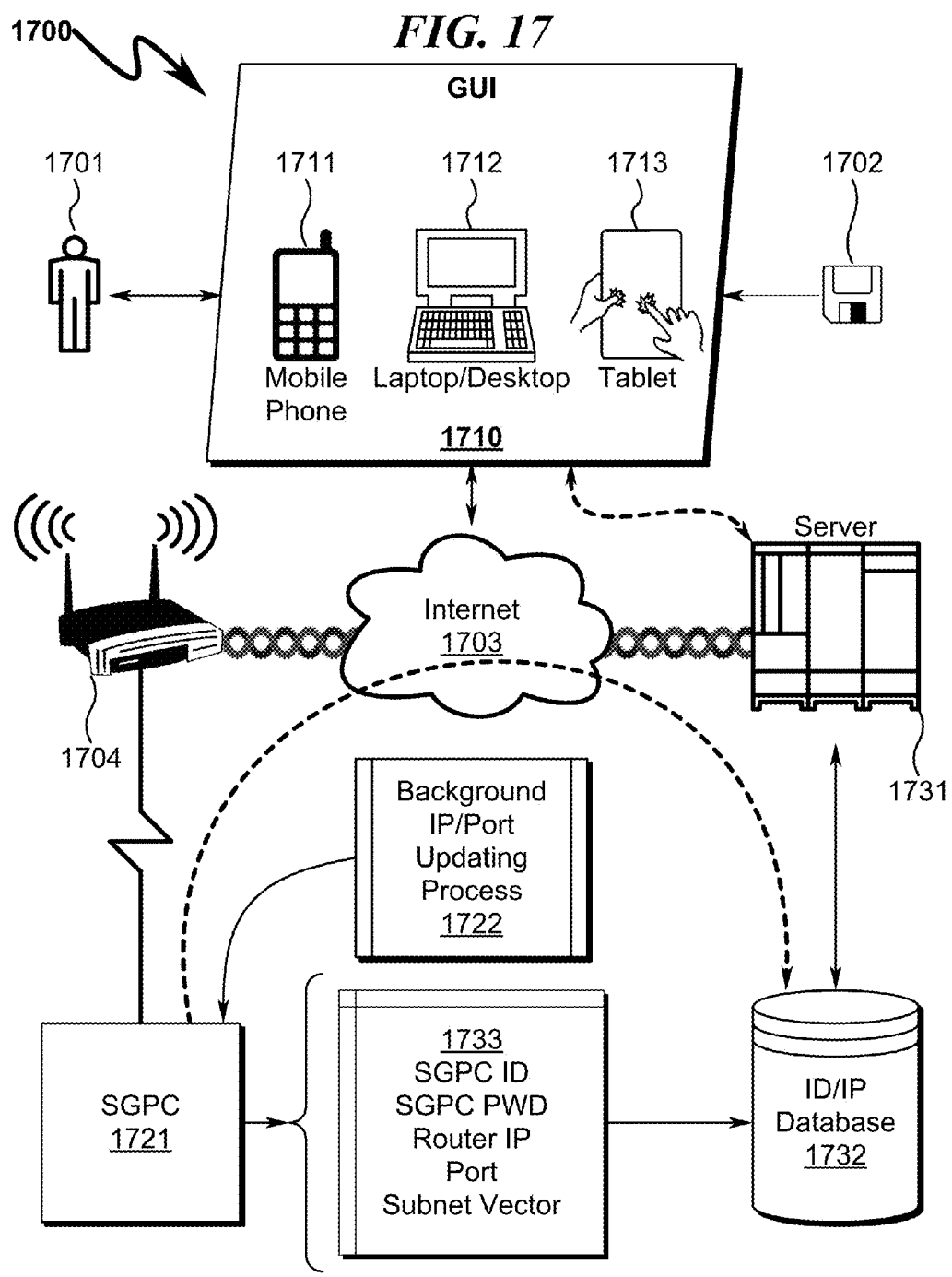
FIG. 17 illustrates a system block overview diagram describing a presently preferred embodiment of the present invention implementing an exemplary proxy server (pull) mode system embodiment.

An exemplary system embodiment depicting the proxy server mode is generally illustrated in FIG. 17 (1700). Here the user (1701) interacts with a GUI (1710) running software read from a computer readable medium (1702) and communicates over a computer network (1703) to a proxy server (1731). The proxy server (1731) maintains an ID/IP translation database (1732) that translates a SGPC ID to an IP address/port value/subnet vector (1733). This database (1732) is populated by the SGPC (1721) operating a background IP/Port updating process (1722) that continuously checks for changes in the SGPC IP address and reports these changes via the computer network (1703) to the server (1731) for placement in the ID/IP database (1732). In this fashion any changes in the IP address or subnet routing that occur in the SGPC (1721) are reflected in the ID/IP database (1732) for use by the user GUI (1710) in communicating with the SGPC (1721).

Exemplary Proxy Server (Pull) Mode Method Embodiment (1800)

Figure 18:
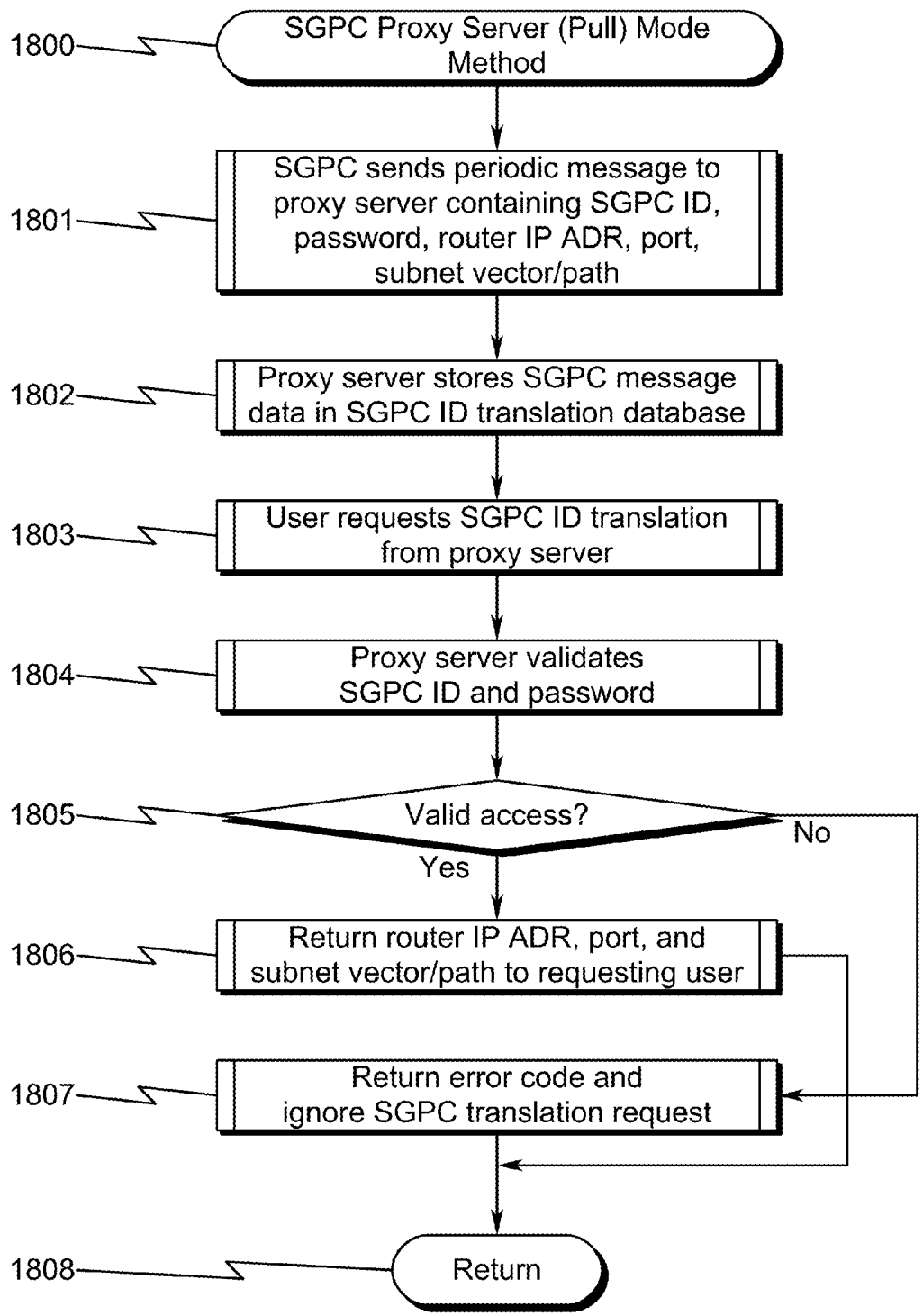
FIG. 18 illustrates an exemplary method flowchart diagram describing a presently preferred embodiment of the present invention implementing an exemplary proxy server (pull) mode method embodiment.

An exemplary method embodiment depicting the proxy server mode is generally illustrated in FIG. 18 (1800) and comprises the following steps:

(1) Sending a periodic message from a SGPC to a proxy server containing the SGPC ID, password, router IP ADR, port, and subnet vector/path (1801);
(2) Storing said SGPC periodic message with a proxy server in an SGPC ID translation database (1802);
(3) Requesting a SGPC ID translation by the proxy server from a user interface (1803);
(4) Validating the SGPC ID and password provided by the user interface using the proxy server (1804);
(5) Determining if the SGPC ID and password are valid, and if not, proceeding to step (7) (1805);
(6) Returning the router IP ADR, port, and subnet vector/path for the SGPC to the requesting user interface and proceeding to step (8) (1806);
(7) Returning an error code and ignoring the SGPC translation request (1807); and
(8) Terminating the method (1808).

One skilled in the art will recognize that these method steps may be augmented or rearranged without limiting the teachings of the present invention. This general method summary may be augmented by the various elements described herein to produce a wide variety of invention embodiments consistent with this overall design description.

Peer-to-Peer Mode (Push Mode)

Consumers register their communication devices (laptop, smartphone) with a SGPC in the form of email address, phone number, etc.

SGPC will notify its current IP address and port number when they are changed, or periodically by sending messages to consumer devices, using email or text message (for phone number).

Software on consumer Internet devices retrieves the latest IP addresses and port numbers from the messages and keeps them in the device memory for communicating with the SGPC.

Exemplary Peer-to-Peer (Push) Mode System Embodiment (1900)

Figure 19:
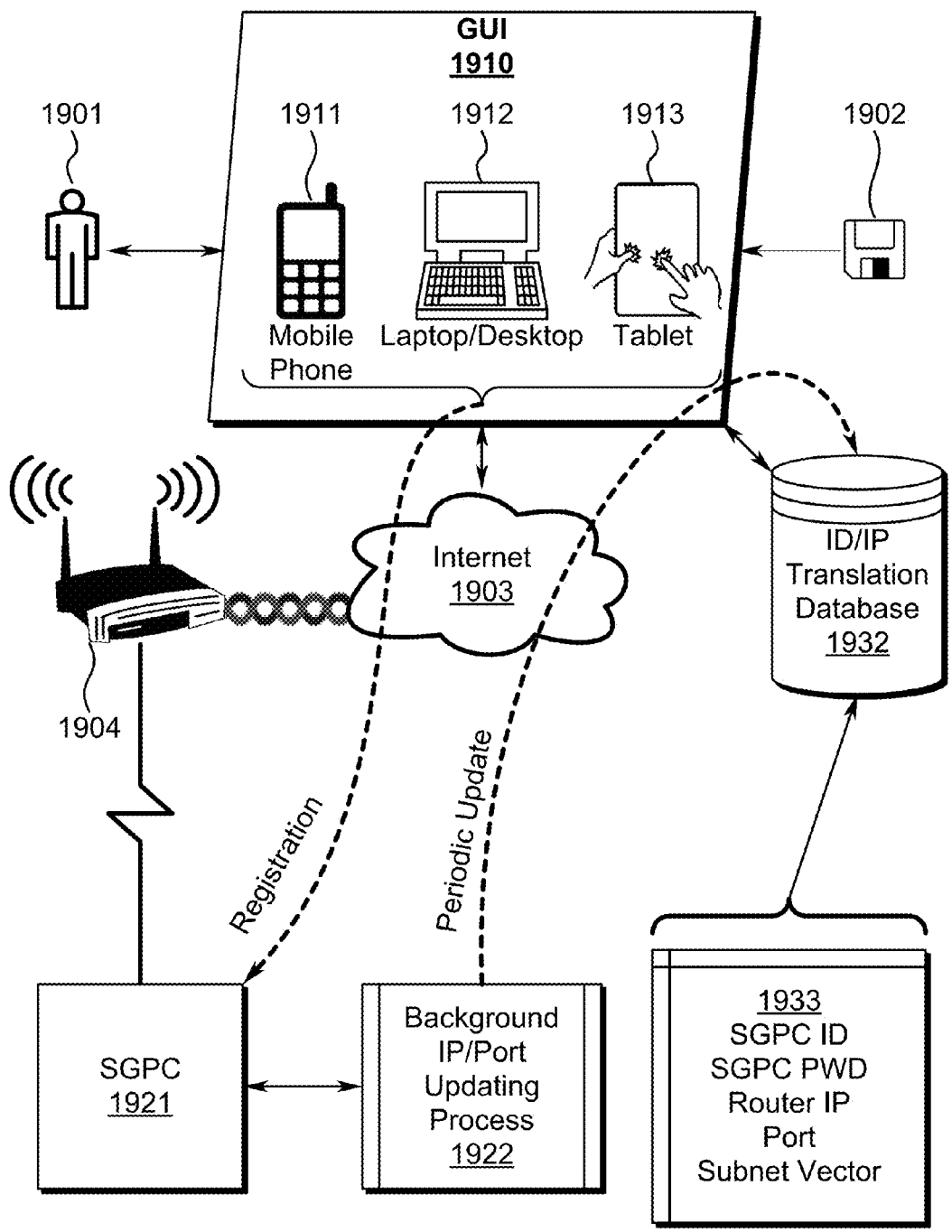
FIG. 19 illustrates a system block overview diagram describing a presently preferred embodiment of the present invention implementing an exemplary peer-to-peer (push) mode system embodiment.

An exemplary system embodiment depicting the proxy server mode is generally illustrated in FIG. 19 (1900). Here the user (1901) interacts with a GUI (1910) running software read from a computer readable medium (1902) and communicates over a computer network (1903) to a SGPC (1921) to register the communications device (1911, 1912, 1913). This registration function typically involves providing a unique communications device (1911, 1912, 1913) identifier such as an e-mail address or telephone number (for text messaging). The SGPC (1921) notifies the communications device (1911, 1912, 1913) in the event of any change of its gateway IP address, port number, subnet vector, or other access information using the messaging techniques described above. Software resident on the communications device (1911, 1912, 1913) uses this message information to determine the current IP address/port/subnet vector path for the next communication with the SGPC (1921). Within this context an ID/IP translation database (1932) that translates a SGPC ID to an IP address/port value/subnet vector (1933) may be maintained. This database (1932) is populated by the SGPC (1921) operating a background IP/Port updating process (1922) that continuously checks for changes in the SGPC IP address and reports these changes via the computer network (1903) to the server (1931) for placement in the ID/IP database (1932). In this fashion any changes in the IP address or subnet path routing that occur in the SGPC (1921) are reflected in the ID/IP database (1932) for use by the user GUI (1910) in communicating with the SGPC (1921).

Exemplary Peer-to-Peer (Push) Mode Method Embodiment (2000)

Figure 20:
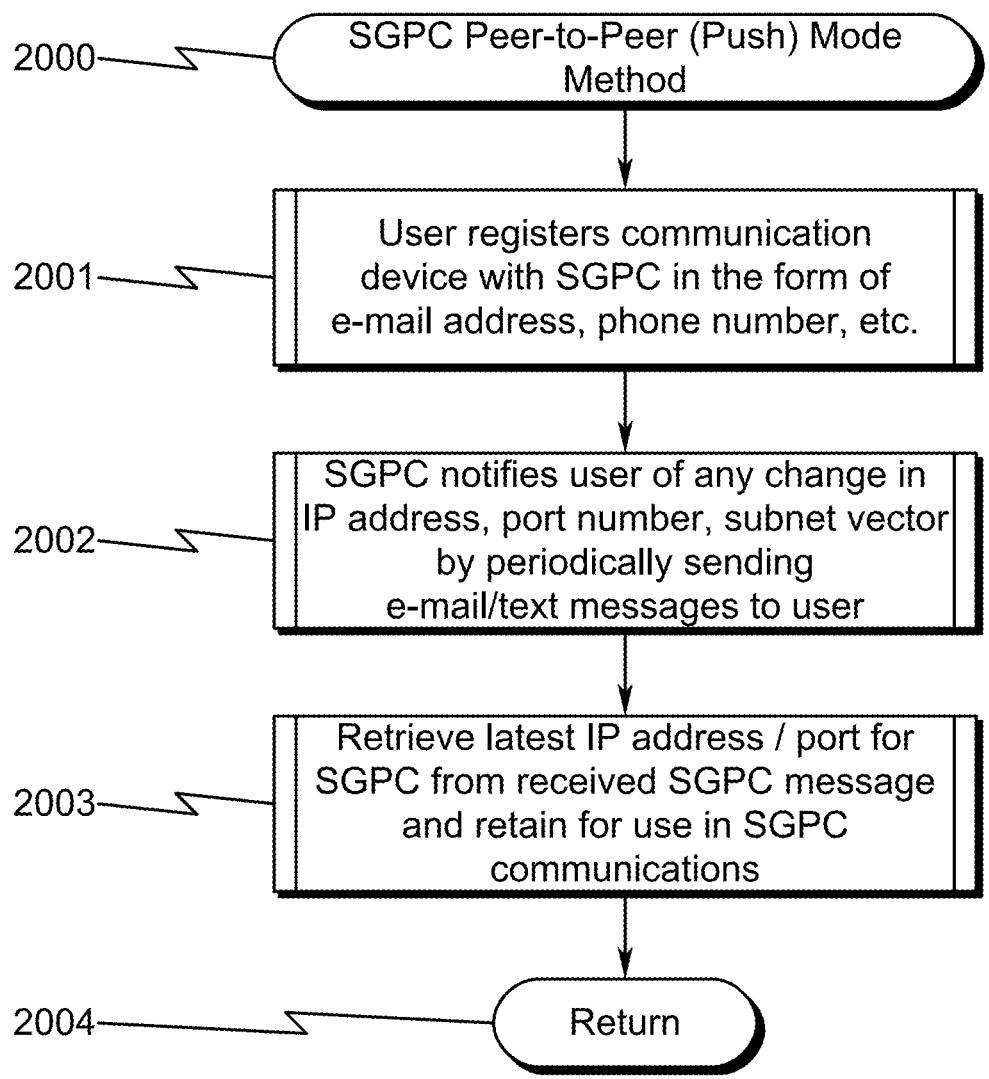
FIG. 20 illustrates an exemplary method flowchart diagram describing a presently preferred embodiment of the present invention implementing an exemplary peer-to-peer (push) mode method embodiment.

An exemplary method embodiment depicting the peer-to-peer mode is generally illustrated in FIG. 20 (2000) and comprises the following steps:
(1) Registering a communication device with a SGPC using an e-mail address, phone number, or other device identifier (2001);
(2) Notifying the communication device via the SGPC of any change in the SGPC IP address, port number, subnet vector by periodically sending update messages to the communication device (2002);
(3) Retrieve the latest IP address/port for the SGPC from received SGPC update messages and retain the IP address/port for use in communicating with the SGPC (2003); and
(4) Terminating the method (2004).

One skilled in the art will recognize that these method steps may be augmented or rearranged without limiting the teachings of the present invention. This general method summary may be augmented by the various elements described herein to produce a wide variety of invention embodiments consistent with this overall design description.

SGPC Networking Advantages

A SGPC's networking has the following advantages:

Stability—A SGPC buffers/isolates its subnet from the change of the home gateway by monitoring and adapting to the latter. Home gateway tends to change its IP address or its communication channel from time to time. For example, the IP address assigned by the ISP (Internet service provider) may change, and the communication channel may change to a new one due to the existing channel having too much interference. The SGPC constantly monitors the change and switches to the new communication channel if necessary to keep the communication with the network always enabled.

Flexibility and Speed—Because the subnet is isolated from the change of the main home network, a static IP address can be used for a SGPC to simplify the implementation of the communication of the subnet. For example, a consumer with a laptop or smartphone can easily access a SGPC or any device in the subnet. By contrast, it is difficult to access a device in the main home network due to its dynamic nature. Additionally, it is faster to directly access a subnet from a PC without "competing" with other traffic over the gateway or Internet.

Scalability—With SGPC, consumers can configure the home automation network into layered subnets, and add and remove devices as they see fit. For example, users install the first SGPC that communicates with the devices in its subnet. They decide later to add one more SGPC, and have the new SGPC either become another sub-gateway of the home network (see FIG. 5 (0500)) or become a sub-gateway of the first subnet (FIG. 6 (0600)).

Privacy and Security—As a result of the subnets, a SGPC introduces additional security at the sub-gateway level, to firewall or filter the traffic.

With these advantages, a SGPC provides a home automation system or energy management system that is cost effective and configurable to be both service provider and consumer friendly. Consumers can access or control it at home or away with a smartphone over Internet DIRECTLY. They do this without the "sniffing" of a utility company and they have a full control of what they do. This direct path also increases the speed of the communication. If they choose, they can also have the utility company or a service provider manage the SGPC for them.

One skilled in the art will recognize that the above features may or may not be implemented in each invention embodiment and serve only to describe characteristics of some preferred embodiments.

SGPC Functionality

Besides the networking aspects described above, a SGPC supports these functions:
  Controls the relay switch;
  Obtains the measurement from the energy measurement unit;
  Hosts a web server to present information to the consumers and allows device configuration;
  Performs energy consumption analysis and decision making; and
  Uploads software and data from the SGPC to user devices.
These functions will now be described in more detail.

Switch Control

A web server hosted in a SGPC allows consumers to access in a secure way from anywhere. Consumers can read the status of the switch(s) and configure the switching strategy on the web server in a number of modes:
  Instant switch on/off;
  One-time switch based on crossing a preset threshold of: current level, voltage level, energy level, and time of day;
  Periodic switch based on the same conditions as above with any period (e.g., hours, days);
  Vampire energy;
  Auto mode based on energy consumption analysis; and
  Events regarding sensor data from other devices (e.g., temperature, humidity, etc.).

Several of these modes will now be discussed in further detail.

Vampire Energy

Many consumer devices, when turned off, still consume the standby energy, usually 5%-8% of the normal power consumption. This energy is called vampire energy, and can add up to significant amount. Consumers can specify that when vampire energy is detected, turn off the switch. Vampire energy can be detected by the current dropping below certain threshold, which is configurable by consumers. For example, when the current drops 80% for an extended period as detected by the energy measurement unit, vampire energy is detected.

Analysis of Energy Consumption

Utility companies have the energy cost profiles for enterprises and residential homes based on their smart meter feedbacks. These profiles are available to consumers in some format, for example, in a form of "time of day vs. energy cost" or "the amount of energy consumed vs. energy cost". This information can be found in utility bills for example. Consumers can input the energy cost profile into a SGPC, and set the switch to automatic mode. The SGPC will make decision to turn on and off the switch(s) based on
  Cost profile on the energy consumption;
  The current time;
  The total energy consumed so far by the household if available (this information may be available from the smart meter);
  Energy consumption data from other devices (ZIGBEE®sensors and other SGPCs).

Sensory Data

A SGPC may turn on and off based on the sensory data read from external devices—WiFi sensors or ZIGBEE® sensor if ZIGBEE® module is integrated in SGPC. For example, when temperature sensor shows a temperature above certain level, turn on the SGPC connected to an air conditioner.

Presentation of Energy Consumption

Consumers can read on the web server the energy consumption in terms of instant energy data (i.e., watts, current, voltage, and accumulated energy consumption) over a specified period. A SGPC can present the energy consumption in a histogram.

Presentation of Data from Companion Devices

We call those external automation devices that communicate with a SGPC companion devices. They include WiFi based and ZIGBEE® based sensors. SGPC web servers may also display the data of companion devices.

Notification of Events

Consumers can schedule the notification of any events from the switch status change to the energy consumption crossing a threshold. Consumers typically put in their email address for notification using emails, or telephone number for text messages. A SGPC sends messages containing these events to their email or phones.

Uploading Software and Data

Consumers can download software (platform independent, such as Java) and dada from a SGPC to their devices, so that additional functionality can be achieved. The software may be fetched from an Internet server through the SGPC, or from its local storage.

Help Desk

A SGPC provides helpful tips and guidelines for the usage of the devices and offers suggestions on saving energy based on the energy usage profile of the user.

Exemplary System Implementation

Typical Hardware Complement

An exemplary implementation of a typical SGPC system involves:
  energy measurements;
  relay switching;
  power rectifier to SGPC;
  MCU programming; and
  WiFi module (and ZIGBEE® module).

This hardware implementation may typically use off-the shelf hardware components for the energy measurement unit, relay, power rectifier, MCU, and WiFi module. One of ordinary skill in the electrical arts should be able to design a circuit board, assemble, and package these components into a functional SGPC system as described herein.

Software

The software on the MCU can be LINUX based or simply embedded software without OS. The software does the following multi-task job:
  (gets the energy consumption data by regularly reading the pins connected to the energy measurement unit;
  turns on or off the switch by exerting low or high voltage levels on the pin that connected to the relay;
  gets the input from the web page and modify its local parameters and data stored in its memory/flash, and update web page information accordingly;
  communicates over the Internet via home gateway;
  communicates with other devices (ZIGBEE® or WiFi based) to update local parameters and data, and web page if necessary;
  checks periodically the schedule table for actions (time based or event based) and act accordingly;
  executes other tasks as described below.

Sub-Gateway

There are two ways for a SGPC system to act as both an AP and a client (STA):
- have two WiFi modules, one as AP and one as STA, and connect them with a router; or
- implement both on one WiFi module.

If the second approach is adopted a softAP implementation may be used as an off-the-shelf software solution. softAP makes a WiFi station also act as an AP and it is sometimes called APClient. In this case, the following enhancement is typically required.

Auto Scan and Adaptation

In order for the system to work with softAP, a SGPC's own communication channel (for both of its AP and client roles) must be the same as the home gateway communication channel. Software is added to scan in the background the home gateway communication channel to make sure whenever the home gateway communication channel changes, the SGPC's own communication channel is changed accordingly.

Exemplary Embodiments

While the present invention may be embodied in many forms, the following general discussion details the feature characteristics of several preferred exemplary embodiments.

Access from Anywhere at Home or Away—Proxy Server Mode

[1] A server on the Internet keeps track of the IP addresses and port number by which to communicate with a SGPC.

[2] The SGPC periodically sends a message to the above mentioned server, whereby the IP address and the port number of the message is retrieved and stored by the server in its database.

[3] Additionally, SGPC sends the same message for the same purpose as in Feature [2] based on events. These events include IP address change, or port number change, among other things.

[4] Alternatively, the server periodically sends a "keep alive" message to a SGPC, and updates its data base with the information (i.e., IP address and port number) retrieved from the return acknowledgement messages.

[5] When a device away from home intends to communicate with the SGPC via Internet, it requests the IP address and port number from the server, and communicates with the SGPC directly. For information purposes, the messages will be sent over the Internet to the home gateway, which will forward them to the SGPC over WiFi communication inside the home. In the reverse path, messages will start at SGPC, travels over the WiFi home network to the home gateway, which will send it to Internet back to the user.

Access from Anywhere at Home or Away—Peer-to-Peer Mode

[6] Alternatively, an Internet device can be registered with a SGPC in terms of an address (e.g., an email address for a tablet, a phone number for a smartphone).

[7] The SGPC is then configured to send email or text messages to the devices mentioned in Feature [6]. The messages contains necessary information, including IP address and port number, but is not limited to this information.

[8] Based on the message in Feature [7] (the IP address and port number), a user can directly communicate with the SGPC. In this case, the device needs not go to a server to fetch the IP address and port number for communicating with the SGPC.

Access from Home—Direct Mode

[9] When at home, a user's Internet device can communicate DIRECTLY with SGPC using the WiFi protocol. This is in contrast to the communication mentioned in Feature [5], where the user is away from home, and has to use Internet to communicate.

[10] A software program may be downloaded (see Feature [23]) to the user's device for detecting whether a direct WiFi communication with SGPC is possible or it has to use Internet.

One Module and Two Roles

[11] From the networking point of view, a SGPC, as one system, plays two roles inside a home network. It joins the existing home network as a station, so it can communicate with the Internet. At the same time, it is an AP to any WiFi stations that want to communicate with it. For information purpose, this solves a problem many WiFi based home automation devices suffer: they can either be a station or an AP, but not both.

Subnet and Sub-Gateway

[12] A SGPC has its own subnet with static IP address. This is in contrast to the main home network, where a device's IP address is assigned dynamically by the gateway, and consumers usually have no control over the IP address (which can be changed without any notice) and have difficulty to directly communicate with it.

[13] The subnet mentioned in Feature [12] communicates with main home network through SGPC. This is one reason this automation device is termed a gateway power controller.

[14] A SGPC can join a subnet "gatewayed" by an earlier deployed SGPC, and has its own subnet, as generally illustrated in FIG. 6 (0600).

Adaptability to the Dynamic Nature of Home Networks

[15] A SGPC constantly scans the existing home network communication channel. If it sees a change in the home network communication channel, it will adapt/switch its own communication channel accordingly. If a station communicates with the SGPC and through it to communicate with Internet, the data during the channel transition will be saved, and sent after the transition is completed. This ensures no data loss during channel transition.

Security

[16] In addition to all the standard security mechanism associated with Internet protocol and WiFi protocol—password, authentication, encryption, etc., the present invention adds a firewall and access list at each SGPC, so accessing the subnet associated with a SGPC will be subject to further security. This means only select parties are allows to get connected with the SGPC at the IP or MAC level.

Switch Scheduling

[17] Consumers can schedule the switch both at home and away (1) Instantly; (2) One-time based on the following conditions: electric current level, voltage level, energy level, and time of day; (3) Periodically based on the same condition as in (2) with any period (e.g., hours, days); (4) triggered by vampire energy; (5) automatic mode based on energy consumption analysis; (6) sensor data from other devices.

Energy Consumption Analysis

[18] Consumers can input the energy cost profile into SGPC, and set the switch mode to automatic mode (see Feature [17]). In this mode, a SGPC will make decision to turn on and off the switch(s) based on The energy cost profile (energy cost vs. time of day, or energy cost vs. amount of energy consumed);

The current time;

The total energy consumed so far by the house if available (this information may be available from a smart meter);

Energy consumption data from other devices (ZIGBEE® sensors and other SGPCs) (see Feature [20][21]).

Energy Measurement of Consumer Appliances

[19] The energy measurement unit can measure any electricity related variables (e.g., current (A), voltage (V), power (W), energy (W–h)).

Communication with Other Automation Devices

[20] A SGPC can be configured to communicate with other SGPCs to coordinate activities.

[21] A SGPC can be configured to communicate with other sensors capable of WiFi communication, and use the sensor data as a base for scheduling a switch (see Feature [17]). For information purpose, because a SGPC is an AP, most WiFi sensors configured as WiFi STA can communicate with it. When SGPC contains a ZIGBEE® module, ZIGBEE® based sensors can communicate with it.

Push Information/Notification to Consumers

[22] Consumers can register their email address or smartphone number in a SGPC, and subscribe messages send by the SGPC.

[23] Consumers can subscribe from a list of available message types. For example, a message type defines an event to report (e.g., a switch status change or a variable above or below a threshold). See Feature [27] for more message types.

Upload Software and Data

[24] A SGPC can upload software and data to consumer devices. The software is usually platform independent such as Java, and provides added functionality to the user experience. For example, the data include energy consumption histogram that user can archive on their computers.

Historical Data Archival and Energy Usage Suggestions

[25] A SGPC keeps track of the energy usage profile of the connected devices in terms of the duration and time of switch-on, and the energy consumed over a preset interval of time (e.g., a month), and provides the historical data in some format (table or histogram)

[26] A SGPC can provide suggestions/guidelines/warnings based the historical data mentioned in Feature [25] and some rules. For example, a rule can be "avoid use this device between 6:00 PM and 8:00 PM for n days when the energy consumed so far is above m". A warning can be "You are charged at $xxx/KW-h due to xxx".

[27] These suggestions/guidelines/warnings can be subscribed by consumers as described in Feature [22].

User Interface

[28] A web server is hosted in a SGPC. It allows users to login to it and schedule the switch;

read energy consumption and the switch status;

read data from companion devices including sensors and other SGPCs;

input data—energy cost profile—for energy consumption analysis and decision making;

register email address or phone numbers for a SGPC to send information to them;

request software and data upload; and get helpful tips and guidelines for the usage of the devices and suggestions on saving energy based on user's energy usage profile.

Summary

The present invention provides a control system that automates the energy measurement and control of consumer devices in a way non-intrusive to existing home and commercial networks. Consumers may review the power consumption of their electronic appliances and are able to enable/disable these appliances from anywhere using standard Internet-connected devices.

Preferred Exemplary SGPC Block Diagram (0800)-(1600)

Figure 8:
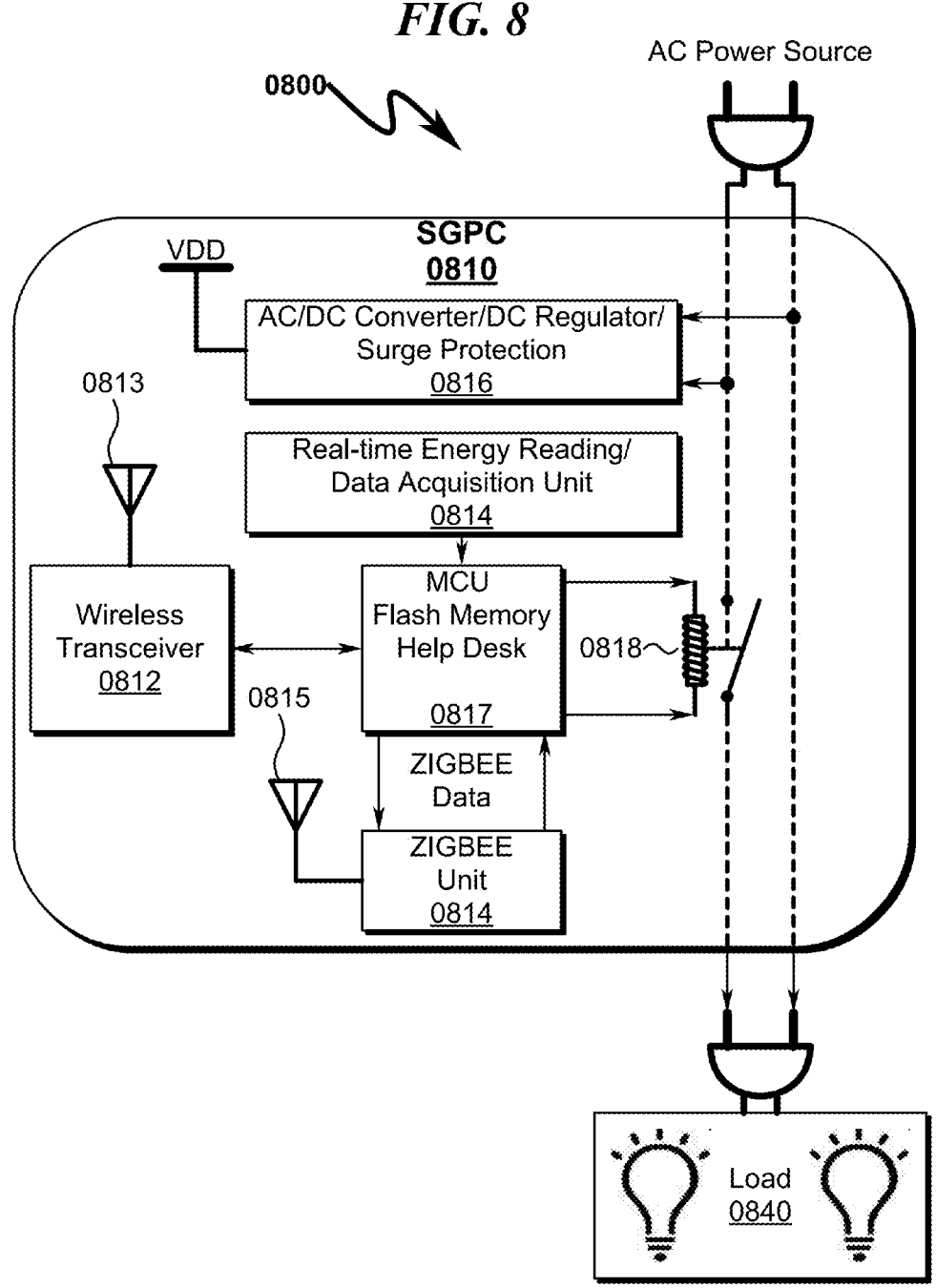
FIG. 8 illustrates an exemplary system block diagram of a typical SGPC embodiment of the present invention.
Figure 9:
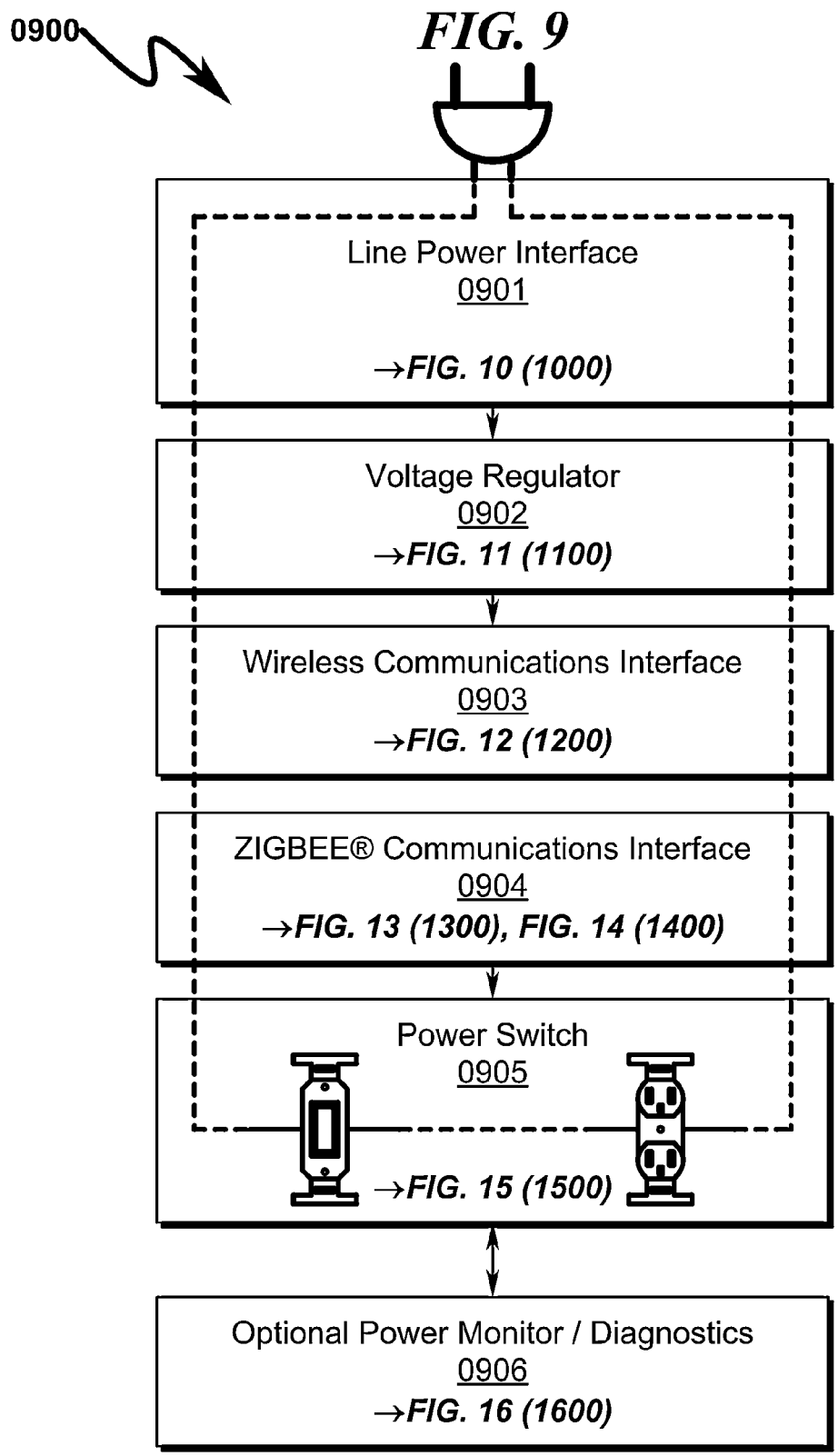
FIG. 9 illustrates an exemplary schematic block diagram of a preferred exemplary SGPC embodiment.
Figure 10:
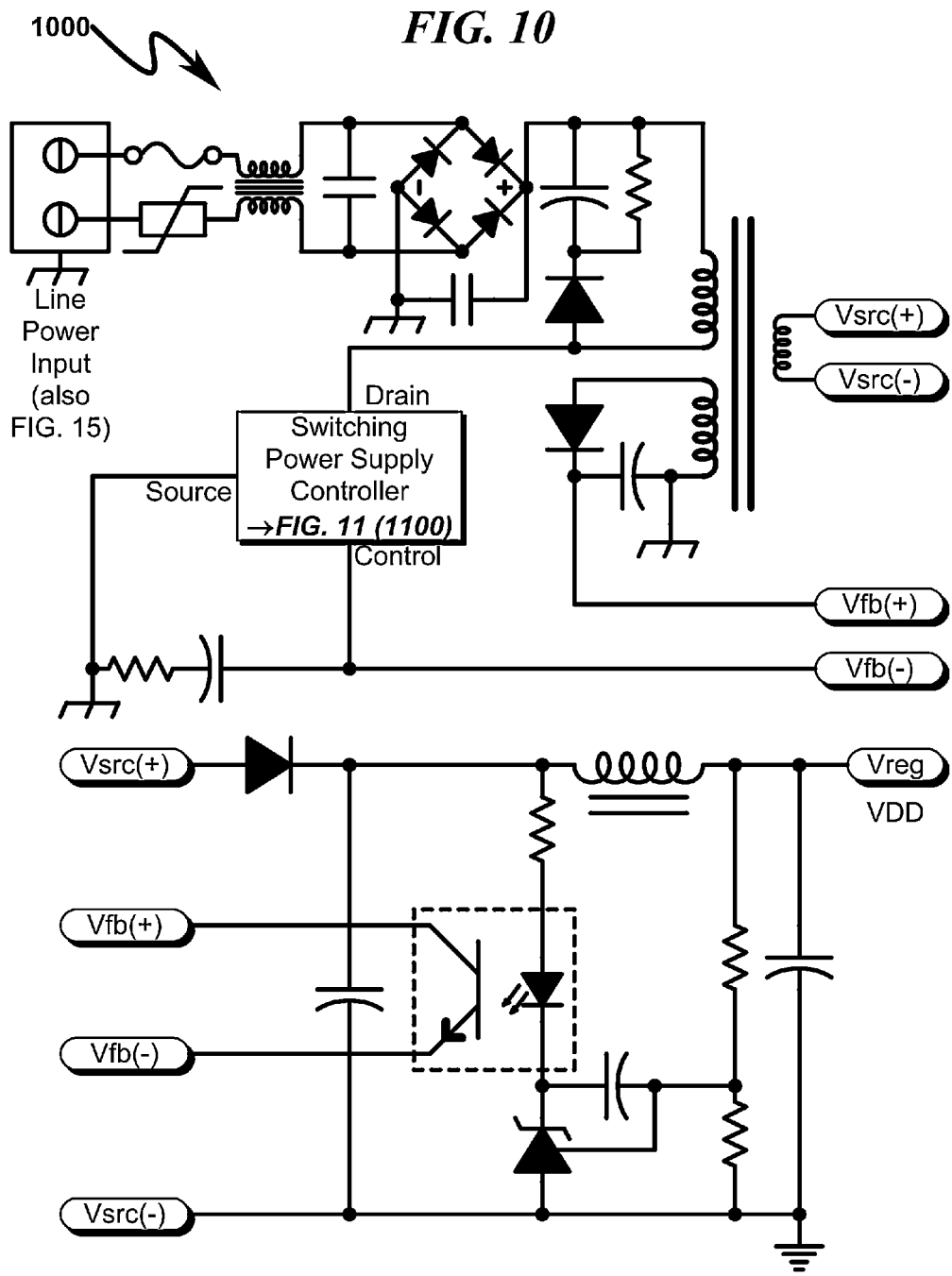
FIG. 10 illustrates an exemplary schematic of a preferred exemplary SGPC Line Power Interface embodiment.
Figure 16:
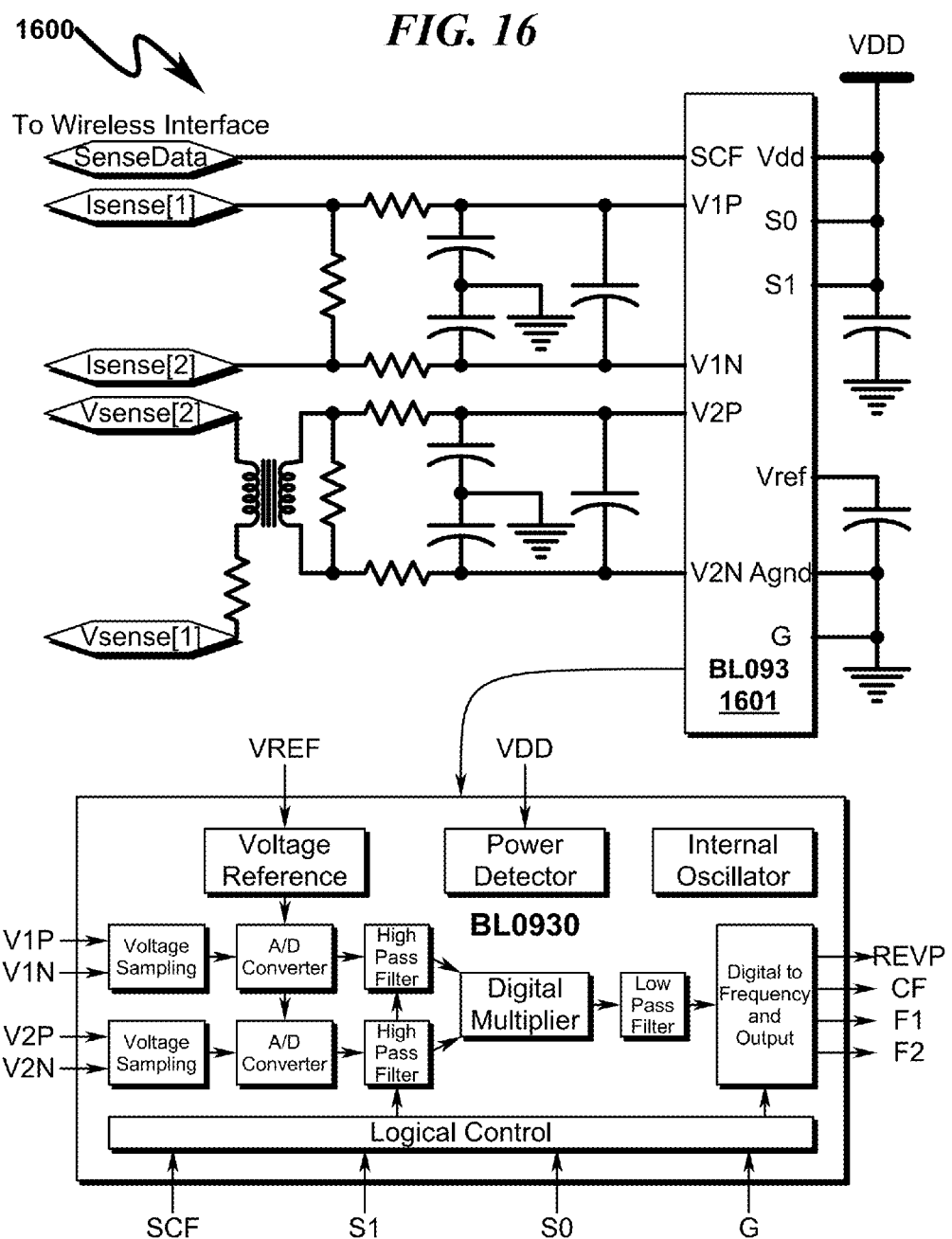
FIG. 16 illustrates an exemplary schematic of a preferred exemplary SGPC Optional Power Monitor/Diagnostics embodiment.

A preferred exemplary system electrical block diagram of a typical SGPC system is generally illustrated in FIG. 8 (0800)-FIG. 9 (0900), with exemplary detail of these system blocks depicted in FIG. 10 (1000)-FIG. 16 (1600). This preferred embodiment comprises the following circuits:

Line Power Interface (0901)—As detailed in FIG. 10 (1000), 110V AC input power is brought through the fuse and split into two paths. The first path converts the AC voltage to a DC voltage by 4-diode bridge rectifier. A transformer steps down the voltage to the level for further regulation. The second path provides 110V AC voltage forward to the consumer load via a power relay (or optional load modulation switch) in the power switch (0904) and is controlled as detailed in FIG. 15 (1500).

Figure 11:
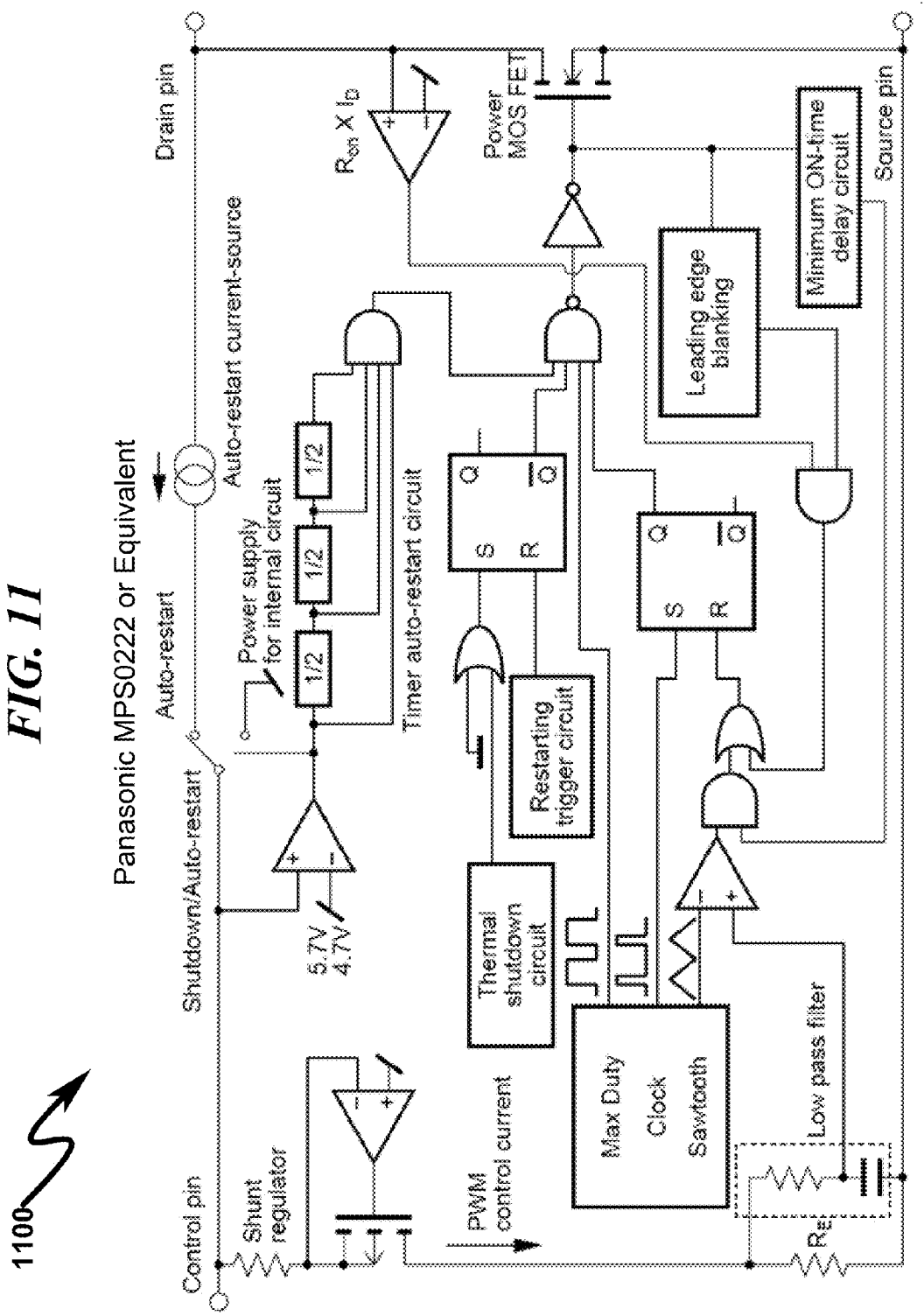
FIG. 11 illustrates an exemplary schematic of a preferred exemplary SGPC Voltage Regulator embodiment.

Voltage Regulator (0902)—As detailed in FIG. 11 (1100), a voltage regulator circuit (optimally a Panasonic MIP0222 switching regulator or equivalent) is utilized to regulate the output production of the line power interface (0901).

Figure 12:
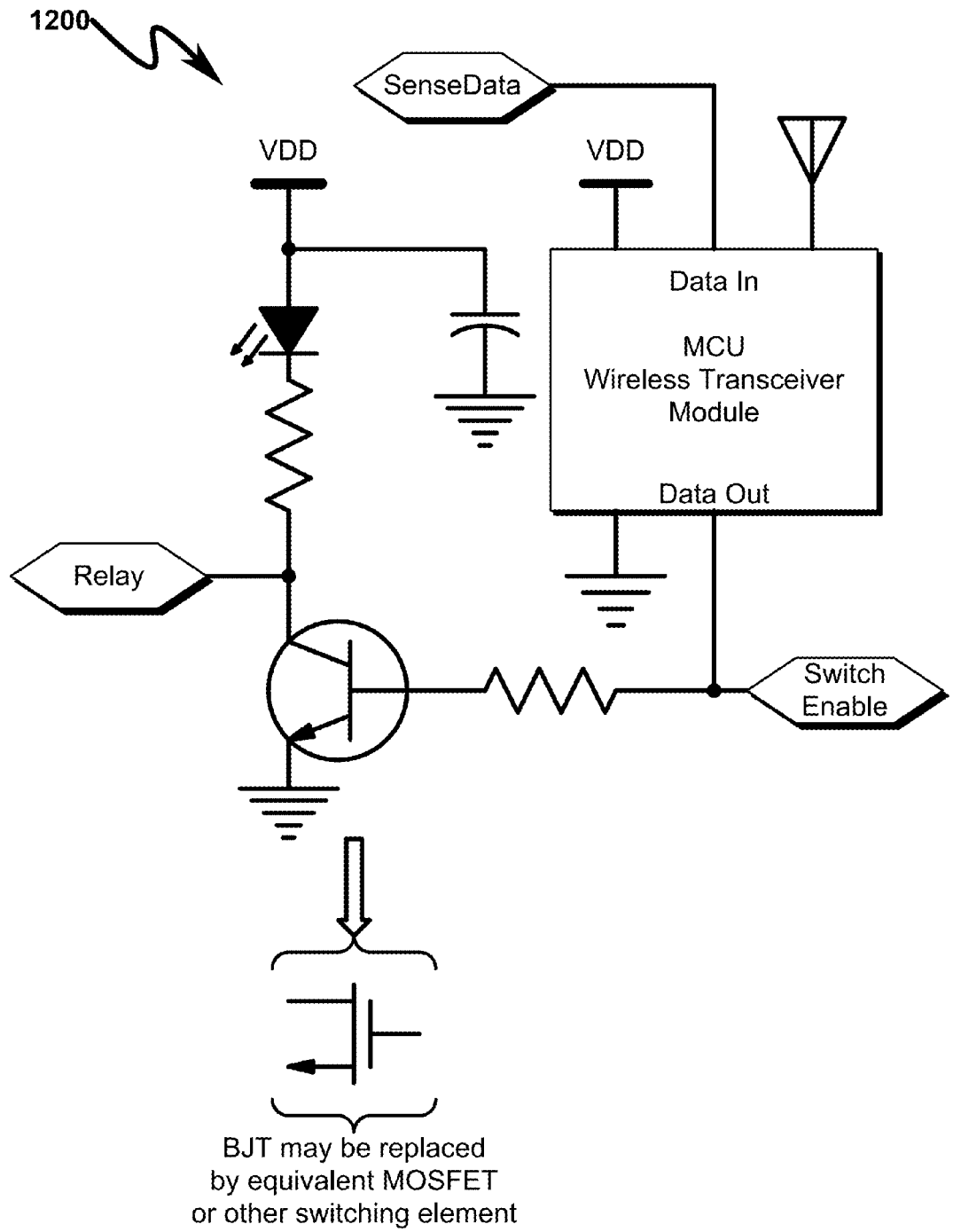
FIG. 12 illustrates an exemplary schematic of a preferred exemplary SGPC MCU/Wireless Communication Interface embodiment.

Wireless Communications Interface (0903). As detailed in FIG. 12 (1200), a wireless transceiver receives the commands from the computer or/and other WiFi or wireless device. The received command via the wireless receiver interface (not shown) will provide a logic signal (SWITCH) to turn on/off the transistor switch (Q1). Q1 controls the on/off position of the power relay in the power switch circuitry (0904) based on commands from the PMCU and may optimally be implemented using bipolar or MOS fabrication technologies.

Figure 13:
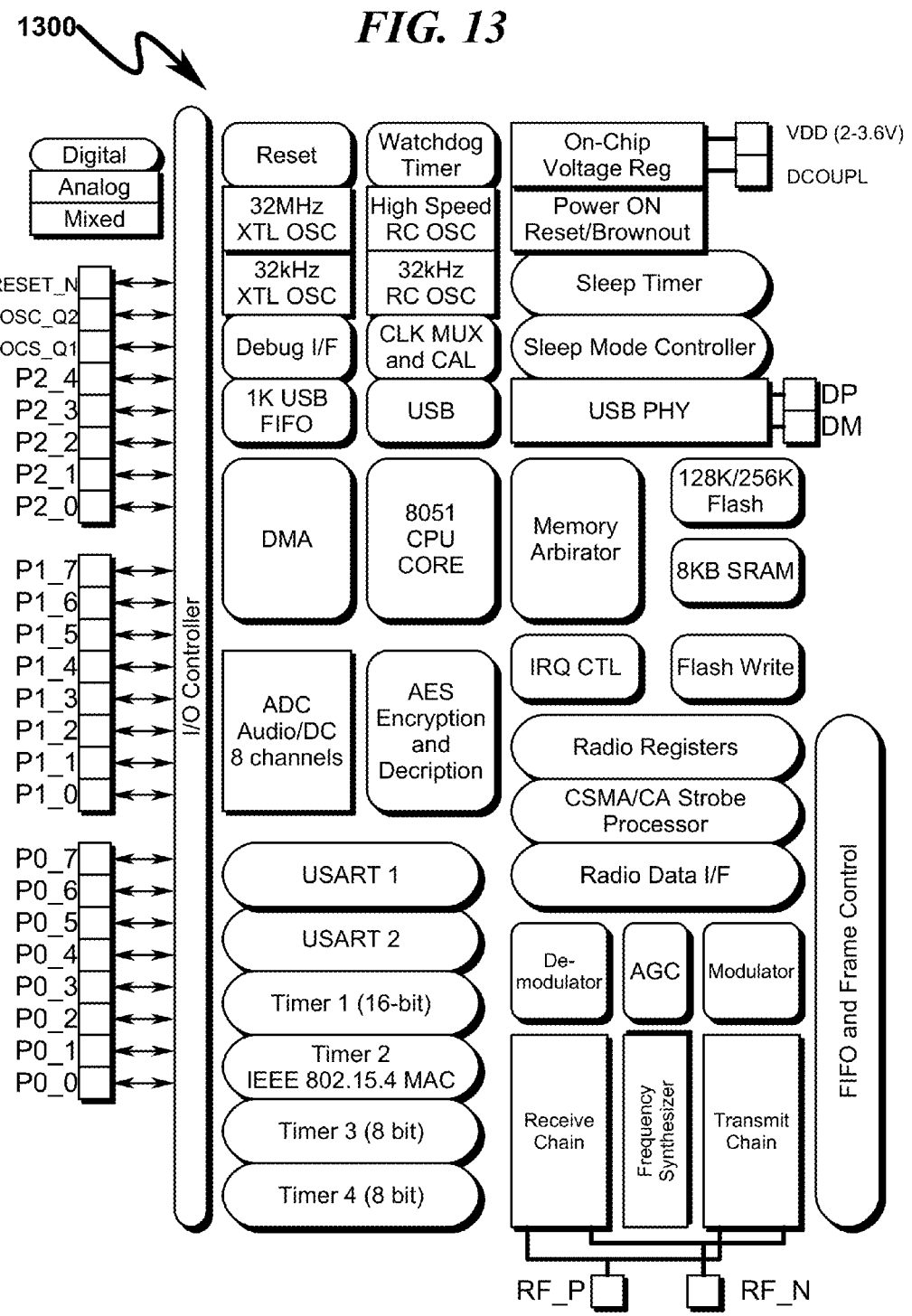
FIG. 13 illustrates a system block diagram of an exemplary SGPC ZIGBEE® transceiver interface integrated circuit useful in some preferred embodiments of the present invention.
Figure 14:
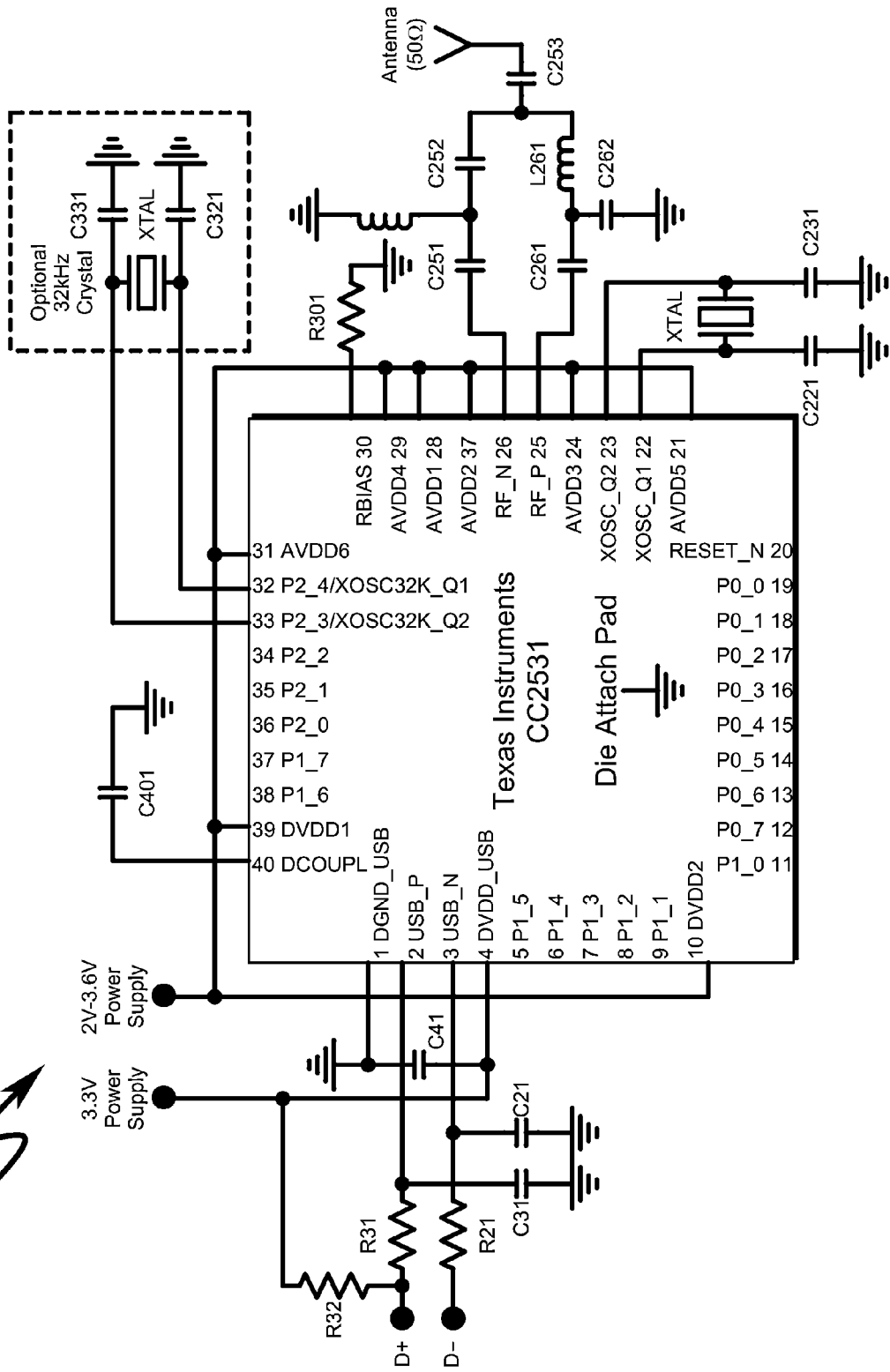
FIG. 14 illustrates an exemplary schematic block diagram of an exemplary SGPC ZIGBEE® transceiver interface integrated circuit useful in some preferred embodiments of the present invention.

ZIGBEE® Wireless Interface (0905). As generalized in FIG. 8 (0800) and detailed in FIG. 13 (1300) and FIG. (1400), the SGPC (0810) may incorporate a ZIGBEE® interface (0814) the overall SGPC design to permit heterogeneous wireless networks using SGPCs to communicate with a wide variety of existing home automation wireless networks. While a wide variety of embodiments of this wireless interface are anticipated, a preferred embodiment incorporates the use of a Texas Instruments model CC2531 ZIGBEE® communications controller as generally illustrated by the block diagram of FIG. 13 (1300) and exemplary implementation schematic of FIG. 14 (1400).

Figure 15:
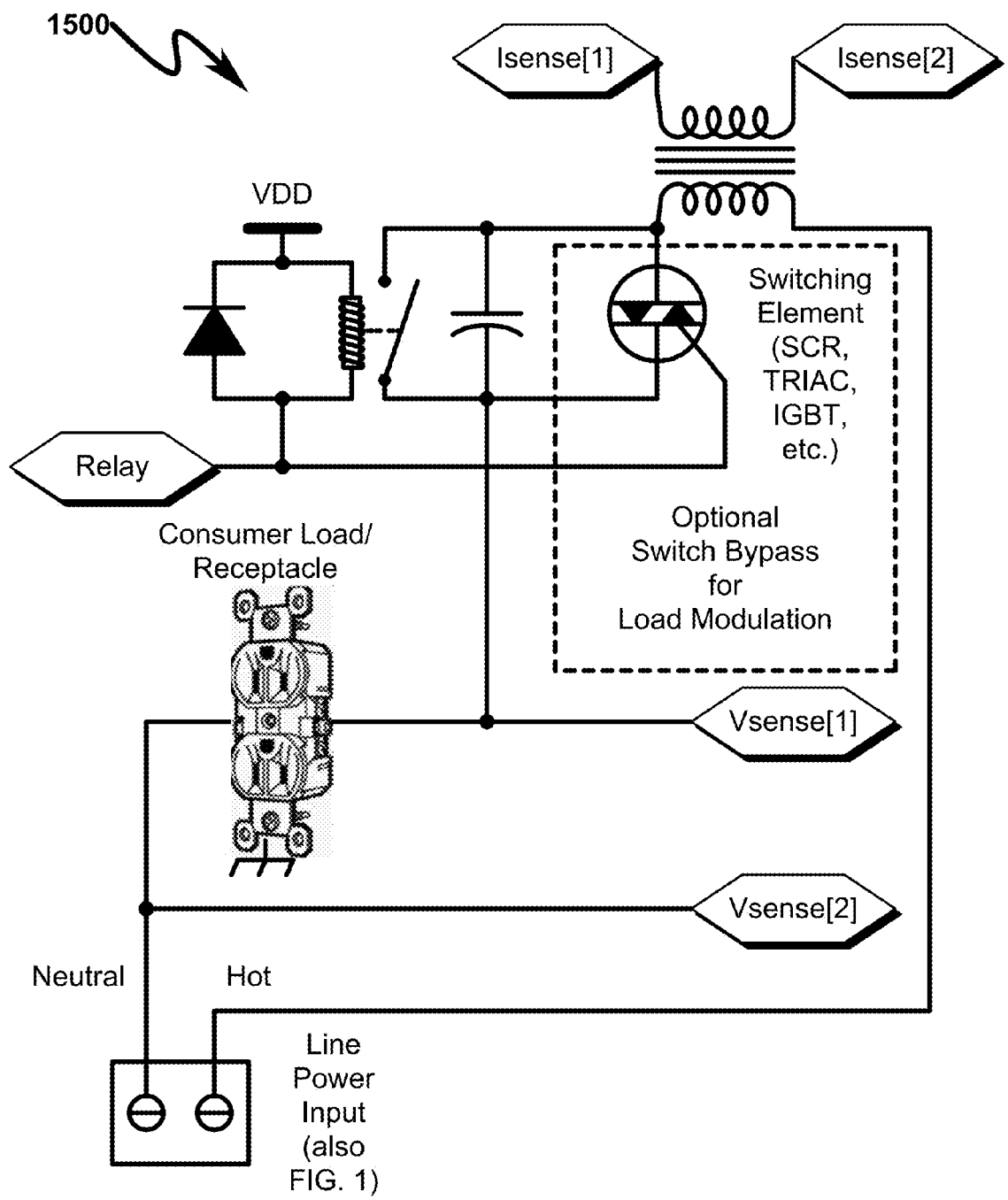
FIG. 15 illustrates an exemplary schematic of a preferred exemplary SGPC Power Switch embodiment.

Power Switch (0905)—As detailed in FIG. 15 (1500), a power relay (and/or optional power modulation switch) is a gate between the line power interface power input and the output power outlet and is controlled by the transistor (or MOSFET) switch in the wireless communications interface (0903). The power relay is typically protected from over current surges by a Zener diode.

Optional Power Monitor/Diagnostics (0906)—As detailed in FIG. 16 (1600), an optional integrated circuit (1601) may be incorporated for measuring energy and self-diagnostic purposes.

One skilled in the art will recognize that these functional blocks may be implemented in a wide variety of ways well known to those skilled in the art of circuit design and as such are only exemplary of the techniques taught by the present invention.

Main SGPC User Application Loading Method (2100)

Figure 21:
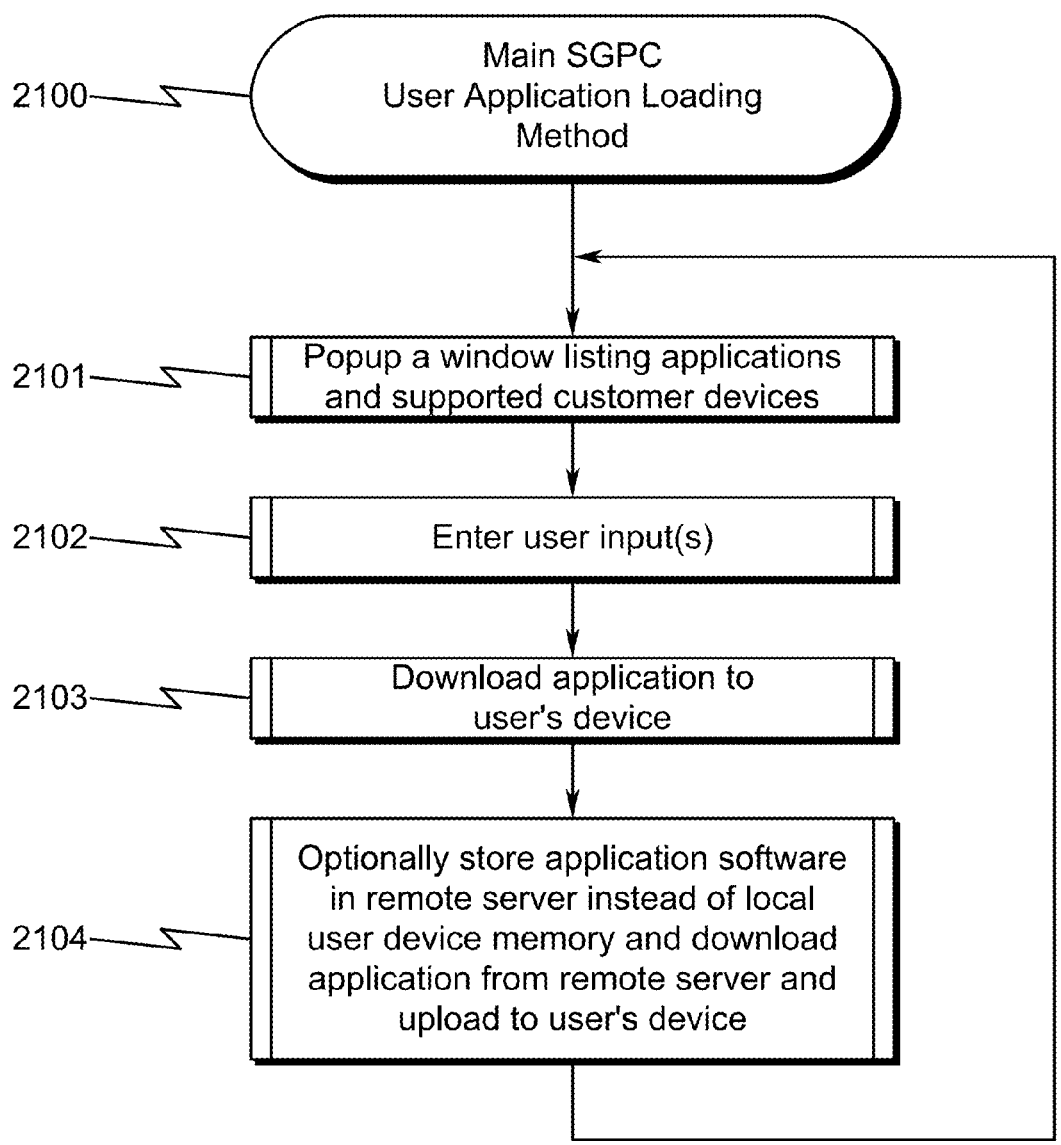
FIG. 21 illustrates an exemplary method flowchart diagram depicting a main SGPC user application loading method useful in some preferred embodiments of the present invention.

As generally illustrated by the exemplary flowchart depicted in FIG. 21 (2100), the present invention anticipates that the SGPC either alone or in conjunction with other systems may present a website interface permitting application software to be loaded onto remote user devices, thus permitting the device access to SGPC switch control and monitoring functionality over the Internet.

Main SGPC Processing Loop Method (2200)

Figure 22:
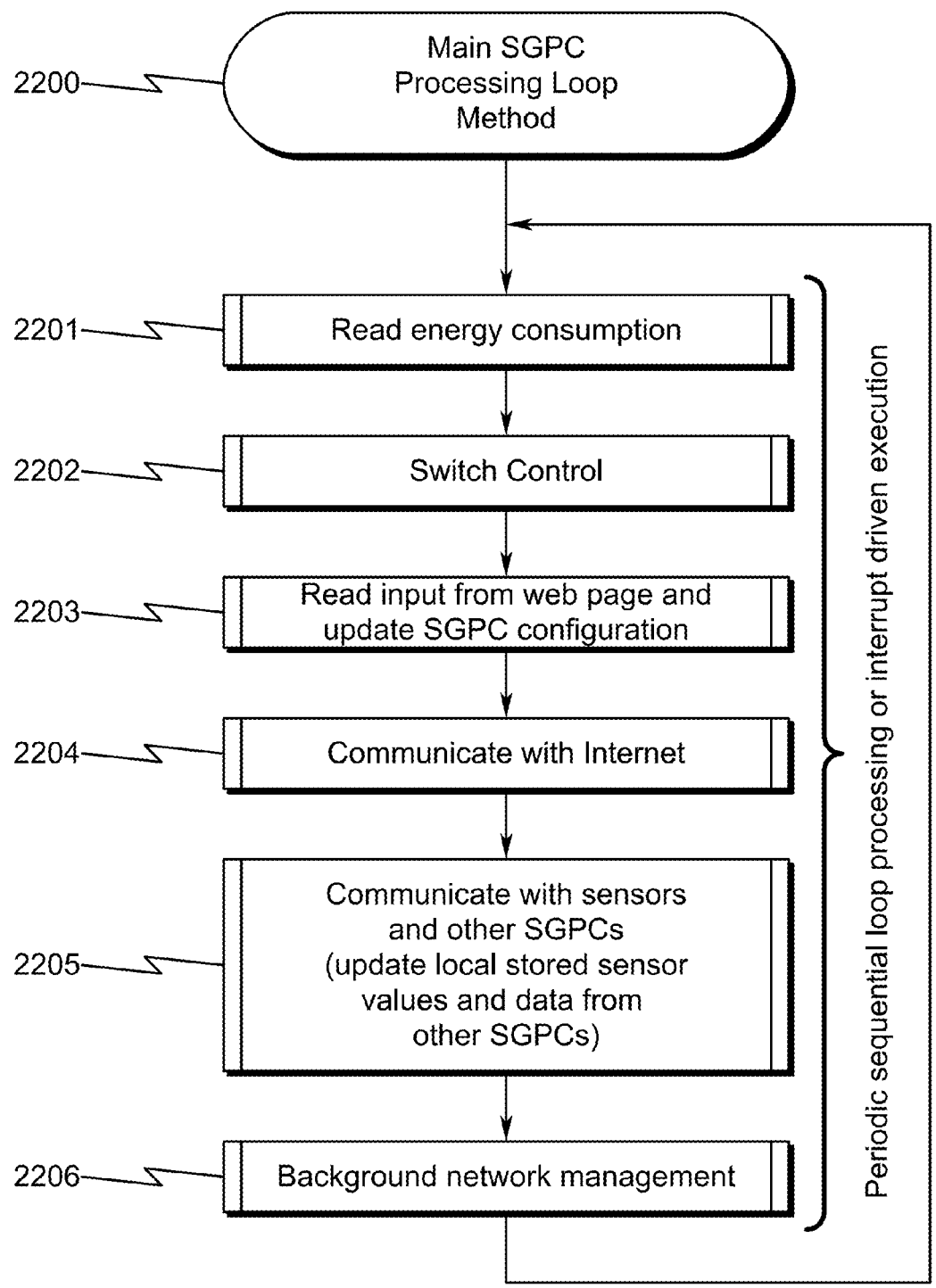
FIG. 22 illustrates an exemplary method flowchart diagram depicting a main SGPC processing loop method useful in some preferred embodiments of the present invention.

As generally illustrated by the exemplary flowchart depicted in FIG. 22 (2200), the present invention anticipates that the SGPC may operate in some preferred embodiments either synchronously or asynchronously to perform the following system functions:
  Reading energy consumption for an attached load device;
  Performing switch control;
  Reading inputs from a web page and updating SGPC configuration data structures;
  Communicating with the Internet;
  Communicating with sensors and other SGPCs to update locally stored sensor values and data from other SGPCs;
  Performing background network management;
  Looping and/or asynchronously executing the above functions.
One skilled in the art will recognize that this execution list is only exemplary and may be augmented/trimmed/rearranged without departing from the spirit of the invention.

Home Gateway Communication Channel Method (2300)

Figure 23:
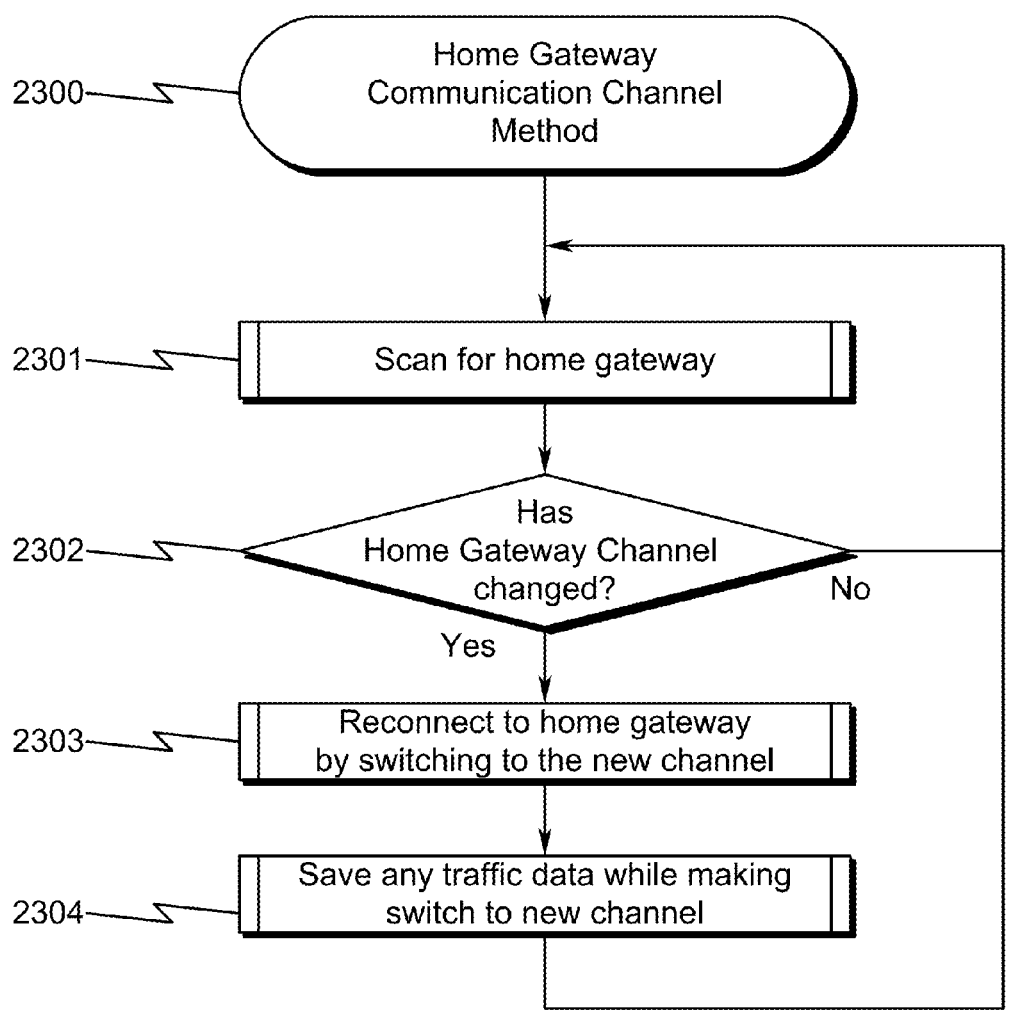
FIG. 23 illustrates an exemplary method flowchart diagram depicting a home gateway communication channel method useful in some preferred embodiments of the present invention.

As generally illustrated by the exemplary flowchart depicted in FIG. 23 (2300), the present invention anticipates that the SGPC will in many preferred embodiments continuously scan for changes in the home gateway configuration and when such configuration changes are encountered the SGPC will reconnect to the home gateway to permit home gateway connectivity to be continuously maintained.

Event Notification Configuration Method (2400)

Figure 24:
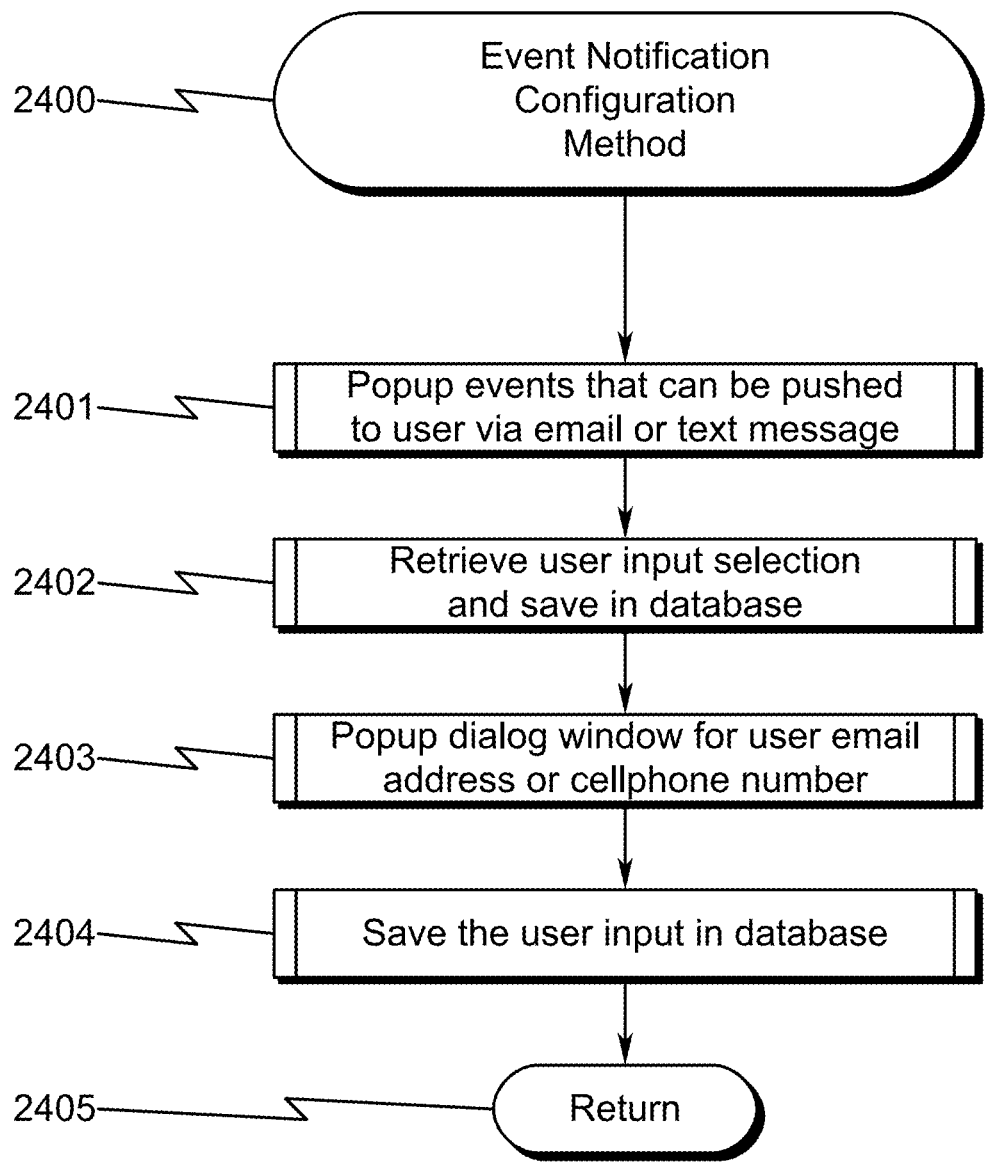
FIG. 24 illustrates an exemplary method flowchart diagram depicting an event notification configuration method useful in some preferred embodiments of the present invention.

As generally illustrated by the exemplary flowchart depicted in FIG. 24 (2400), the present invention anticipates that the SGPC will in many preferred embodiments permit event notifications to be configured by a user via popup events that are pushed to the user via email and/or text messages.

Switch Control Configuration Method (2500)-(2800)

Figure 25:
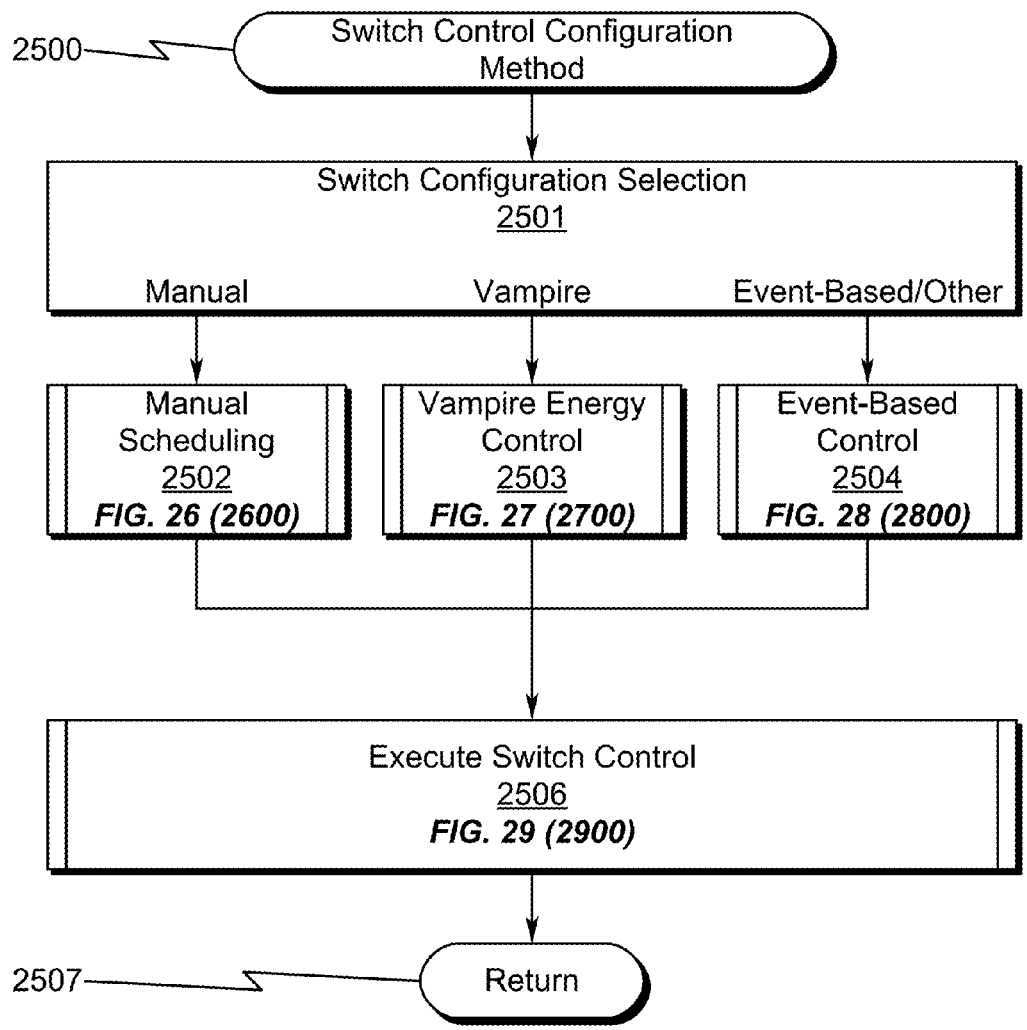
FIG. 25 illustrates an exemplary method flowchart diagram depicting a switch control configuration method useful in some preferred embodiments of the present invention.
Figure 26:
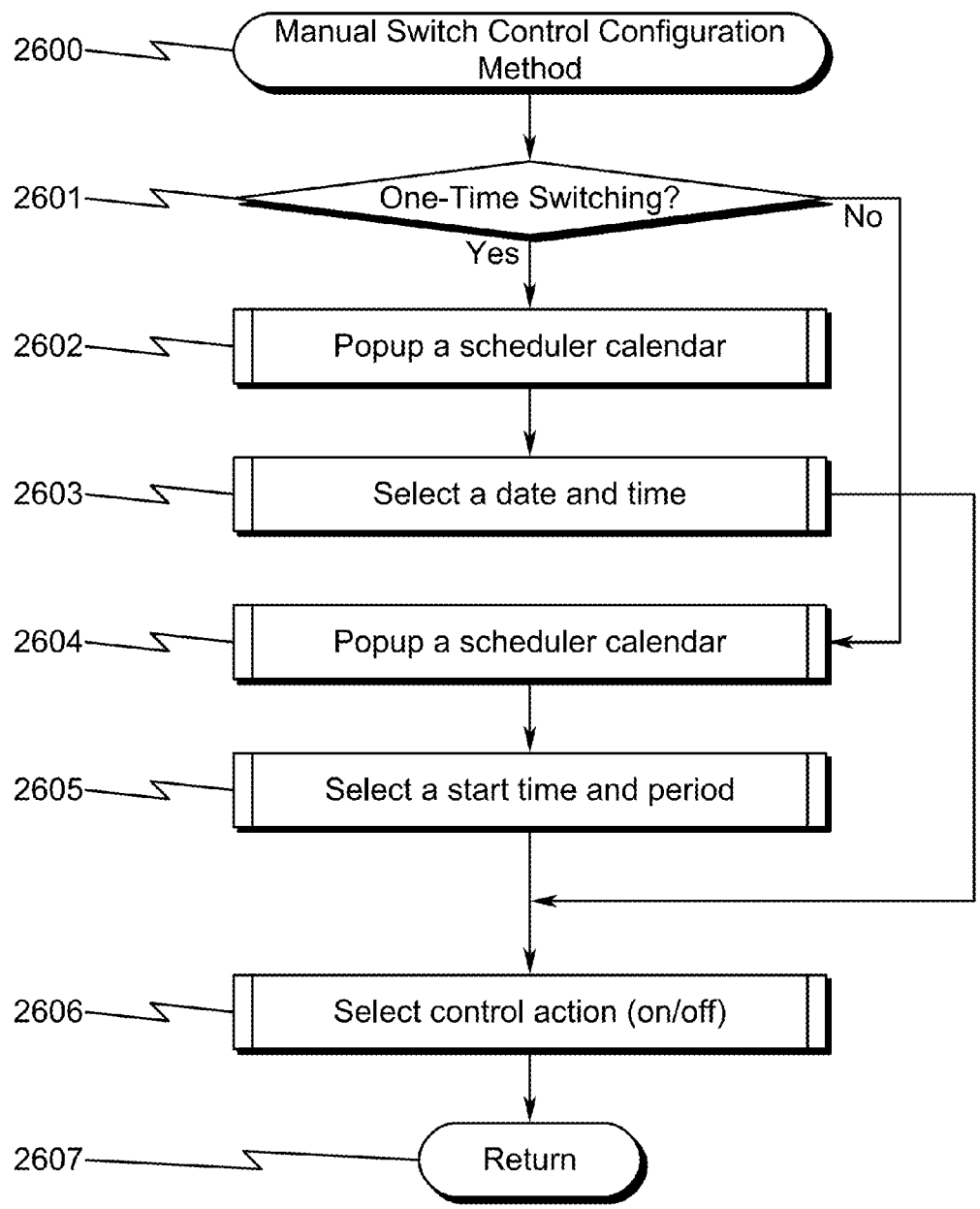
FIG. 26 illustrates an exemplary method flowchart diagram depicting a manual switch control configuration method useful in some preferred embodiments of the present invention.
Figure 27:
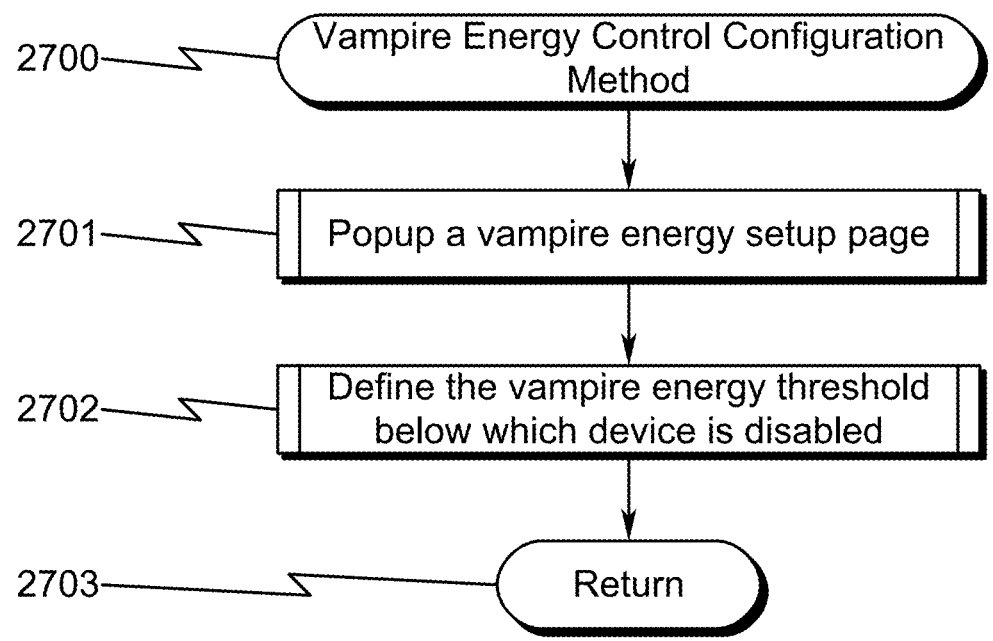
FIG. 27 illustrates an exemplary method flowchart diagram depicting a vampire energy control configuration method useful in some preferred embodiments of the present invention.
Figure 28:
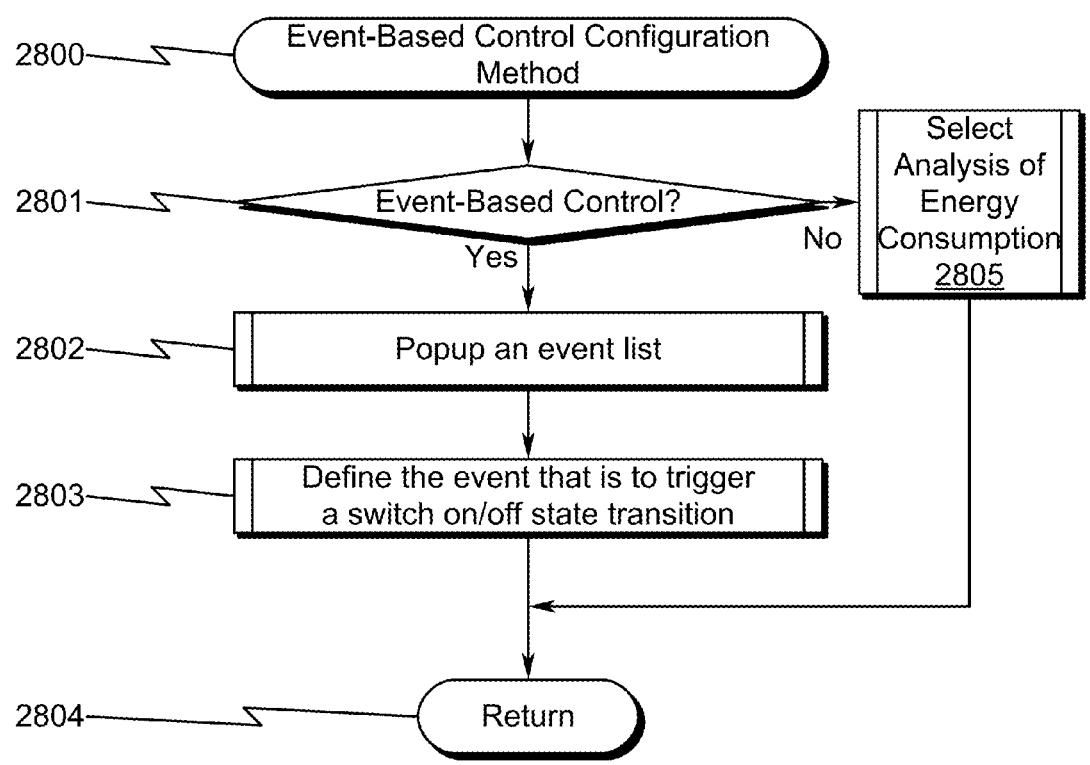
FIG. 28 illustrates an exemplary method flowchart diagram depicting an event-based control configuration method useful in some preferred embodiments of the present invention.

As generally illustrated by the exemplary flowcharts depicted in FIG. 25 (2500)-FIG. 28 (2800), the present invention anticipates that the SGPC will in many preferred embodiments permit power distribution switching to be configured by a user using a graphical user interface. These switch configuration interfaces may include manual switch scheduling (FIG. 26 (2600)), vampire energy switching (FIG. 27 (2700)), and/or event-based switching (FIG. 28 (2800)). Actual switch control implementation after this configuration process is complete is generally illustrated in FIG. 29 (2900)-FIG. 32 (3200).

Switch Control Execution Method (2900)-(3200)

Figure 29:
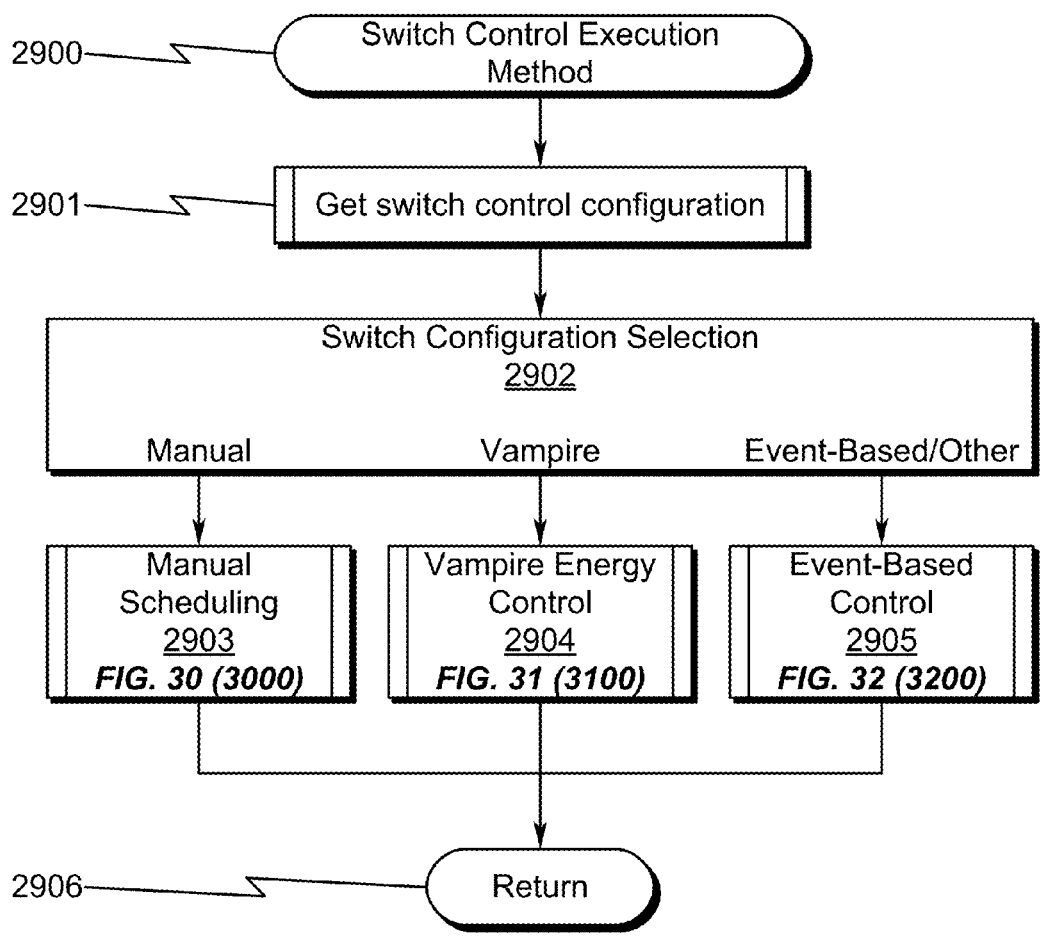
FIG. 29 illustrates an exemplary method flowchart diagram depicting a switch control execution method useful in some preferred embodiments of the present invention.
Figure 30:
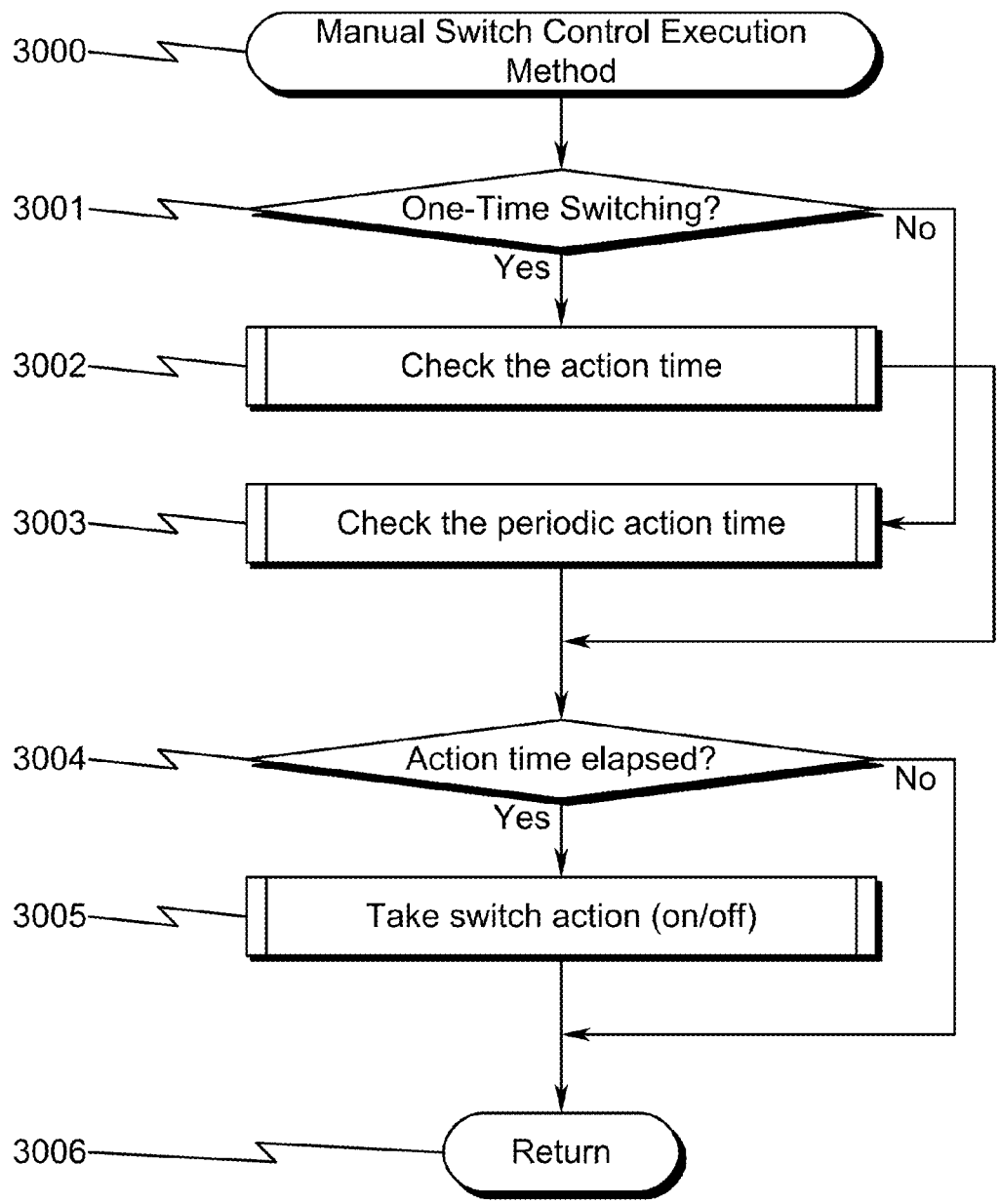
FIG. 30 illustrates an exemplary method flowchart diagram depicting a manual switch control execution method useful in some preferred embodiments of the present invention.
Figure 31:
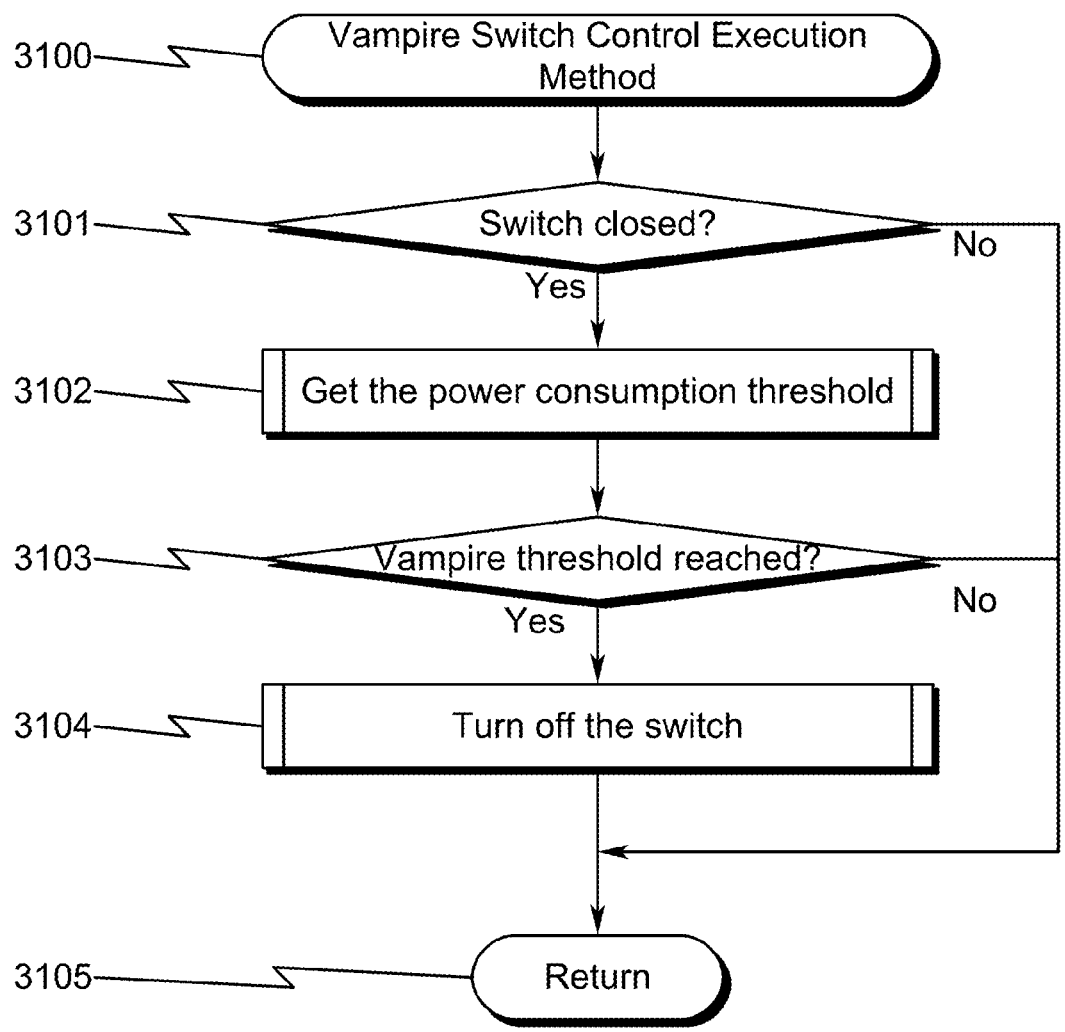
FIG. 31 illustrates an exemplary method flowchart diagram depicting a vampire switch control execution method useful in some preferred embodiments of the present invention.
Figure 32:
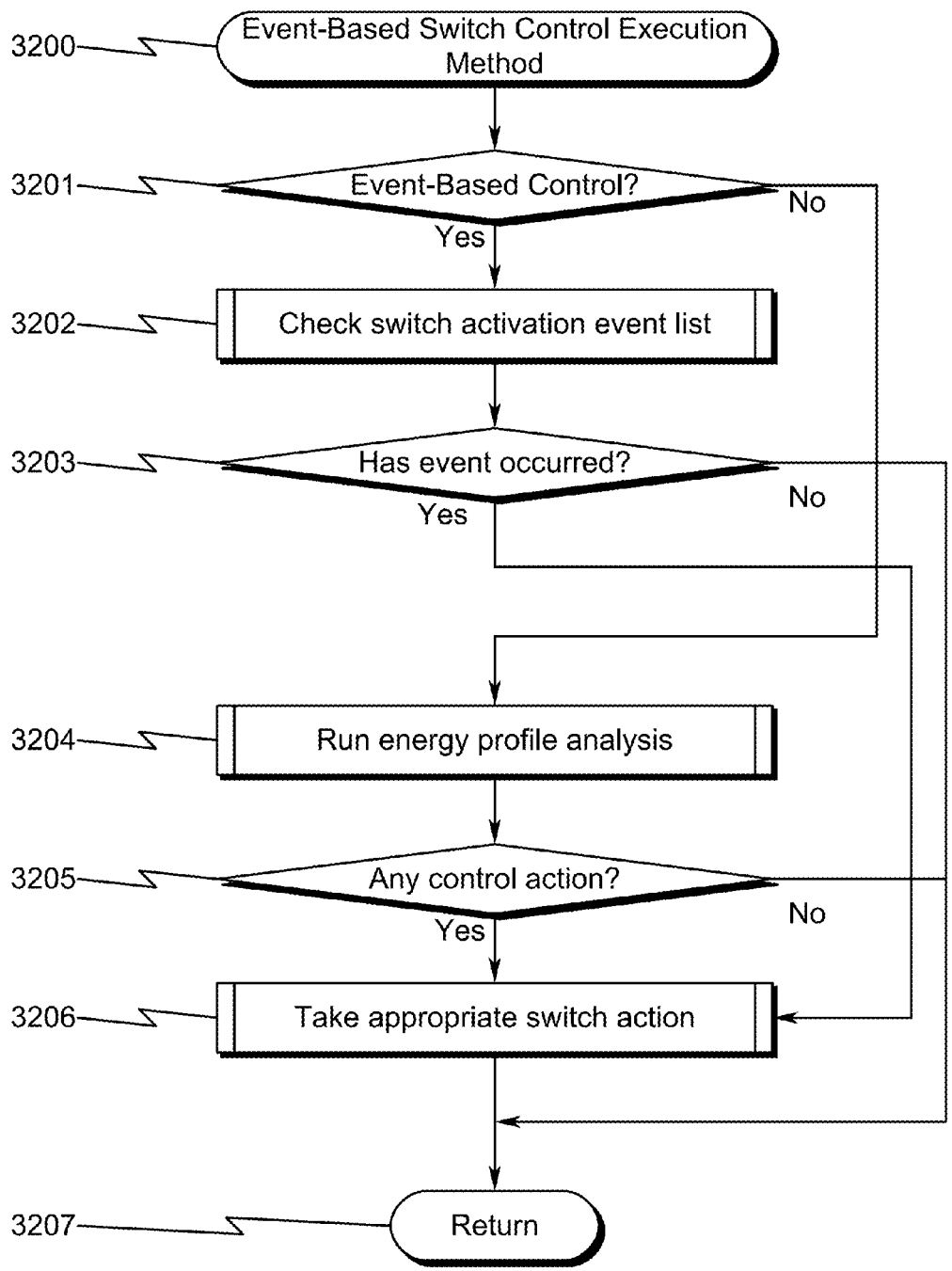
FIG. 32 illustrates an exemplary method flowchart diagram depicting an event-based switch control execution method useful in some preferred embodiments of the present invention.

As generally illustrated by the exemplary flowcharts depicted in FIG. 29 (2900)-FIG. 32 (3200), the present invention anticipates that the SGPC will in many preferred embodiments execute power distribution switching to support manual switch scheduling (FIG. 30 (3000)), vampire energy control (FIG. 31 (3100)), and/or event-based switching control (FIG. 32 (3200)). Associated configuration methodologies associated with these switch control execution flows are generally illustrated by the flowcharts in FIG. 25 (2500)-FIG. 28 (2800).

Energy Analysis Configuration Method (3300)

Figure 33:
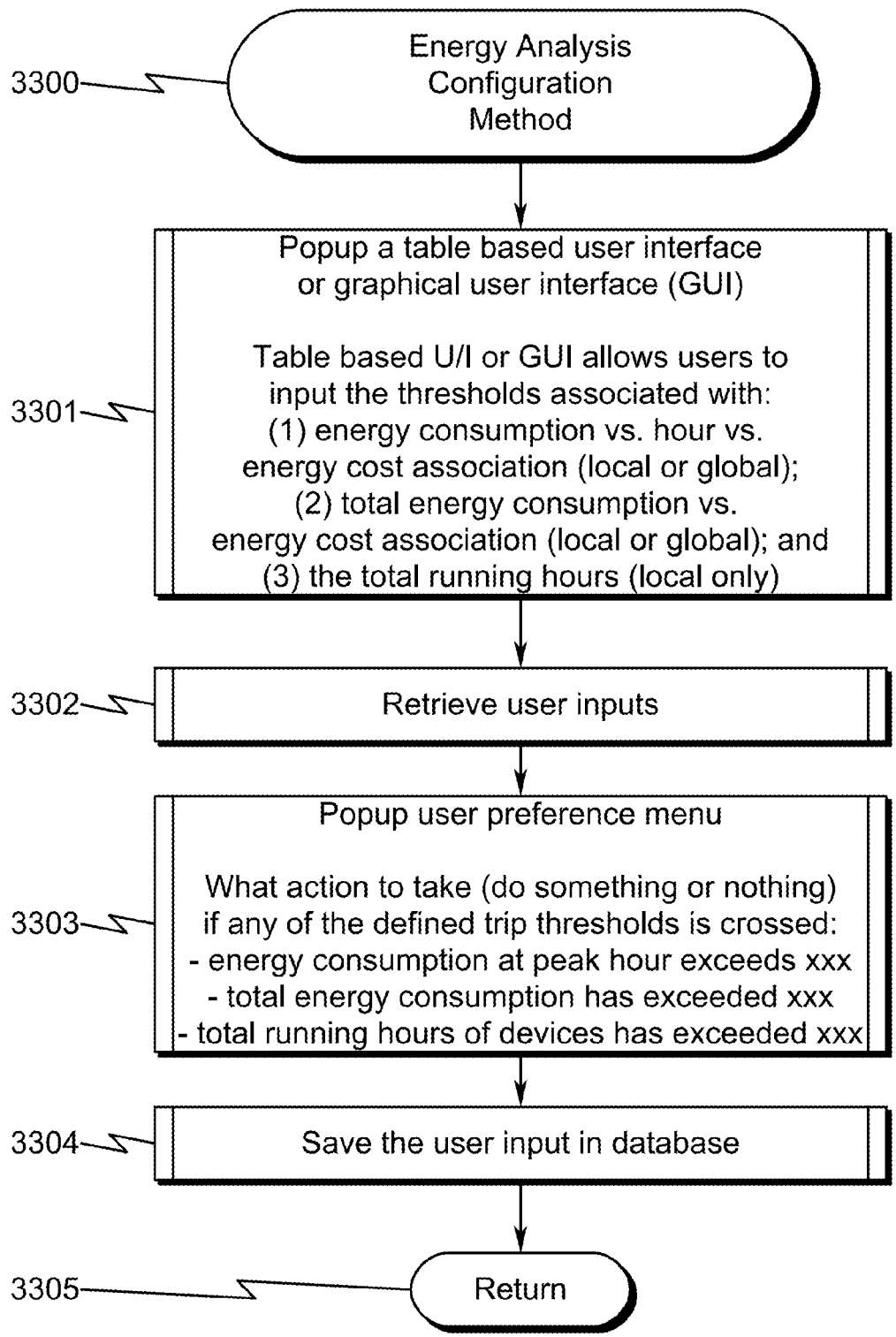
FIG. 33 illustrates an exemplary method flowchart diagram depicting an energy analysis configuration method useful in some preferred embodiments of the present invention.

As generally illustrated by the exemplary flowchart depicted in FIG. 33 (3300), the present invention anticipates that the SGPC will in many preferred embodiments present a user interface to permit selection of a wide variety of energy analysis functions to be performed on a given switched load. The exemplary flowchart in FIG. 33 (3300) presents an exemplary configuration methodology for these energy analysis functions.

Energy Profile Analysis Method (3400)

Figure 34:
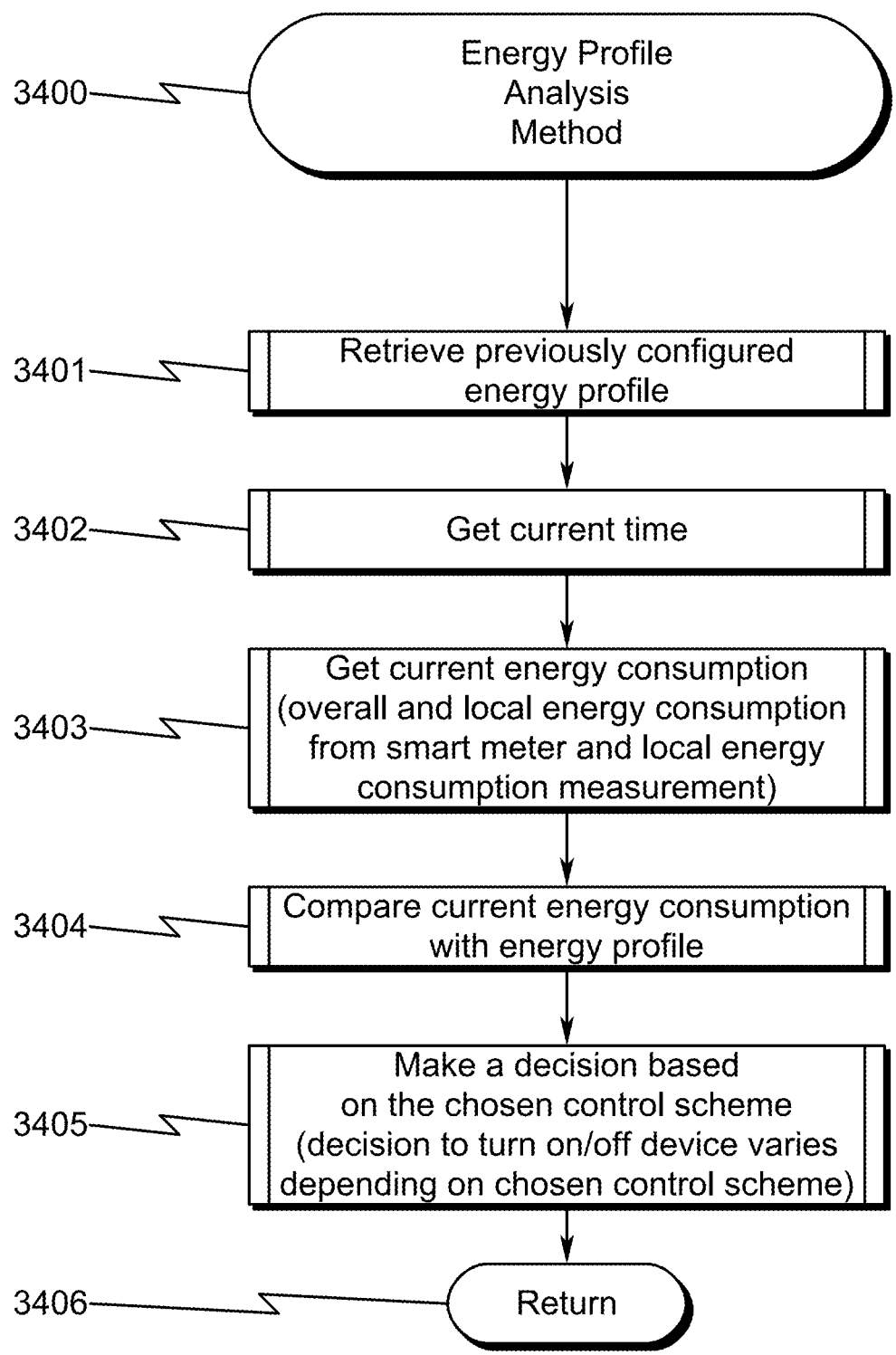
FIG. 34 illustrates an exemplary method flowchart diagram depicting an energy profile analysis method useful in some preferred embodiments of the present invention.

As generally illustrated by the exemplary flowchart depicted in FIG. 34 (3400), the present invention anticipates that the SGPC will in many preferred embodiments permit execution of a wide variety of energy analysis functions to be performed on a given switched load. The exemplary flowchart in FIG. 34 (3400) presents an exemplary energy measurement and reporting methodology for these energy analysis functions.

Communication Methods (3500)-(4000)

Figure 35:
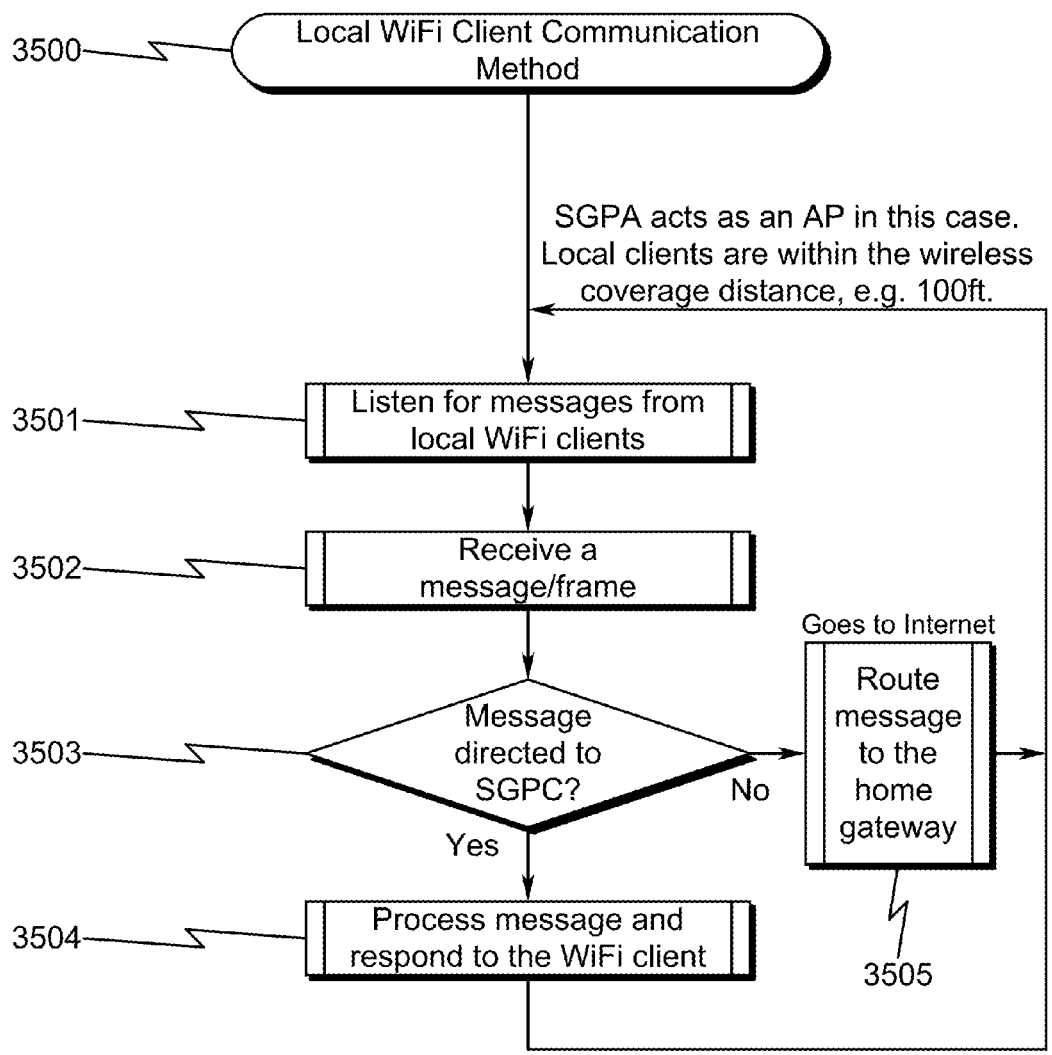
FIG. 35 illustrates an exemplary method flowchart diagram depicting a local WiFi client communication method useful in some preferred embodiments of the present invention.
Figure 36:
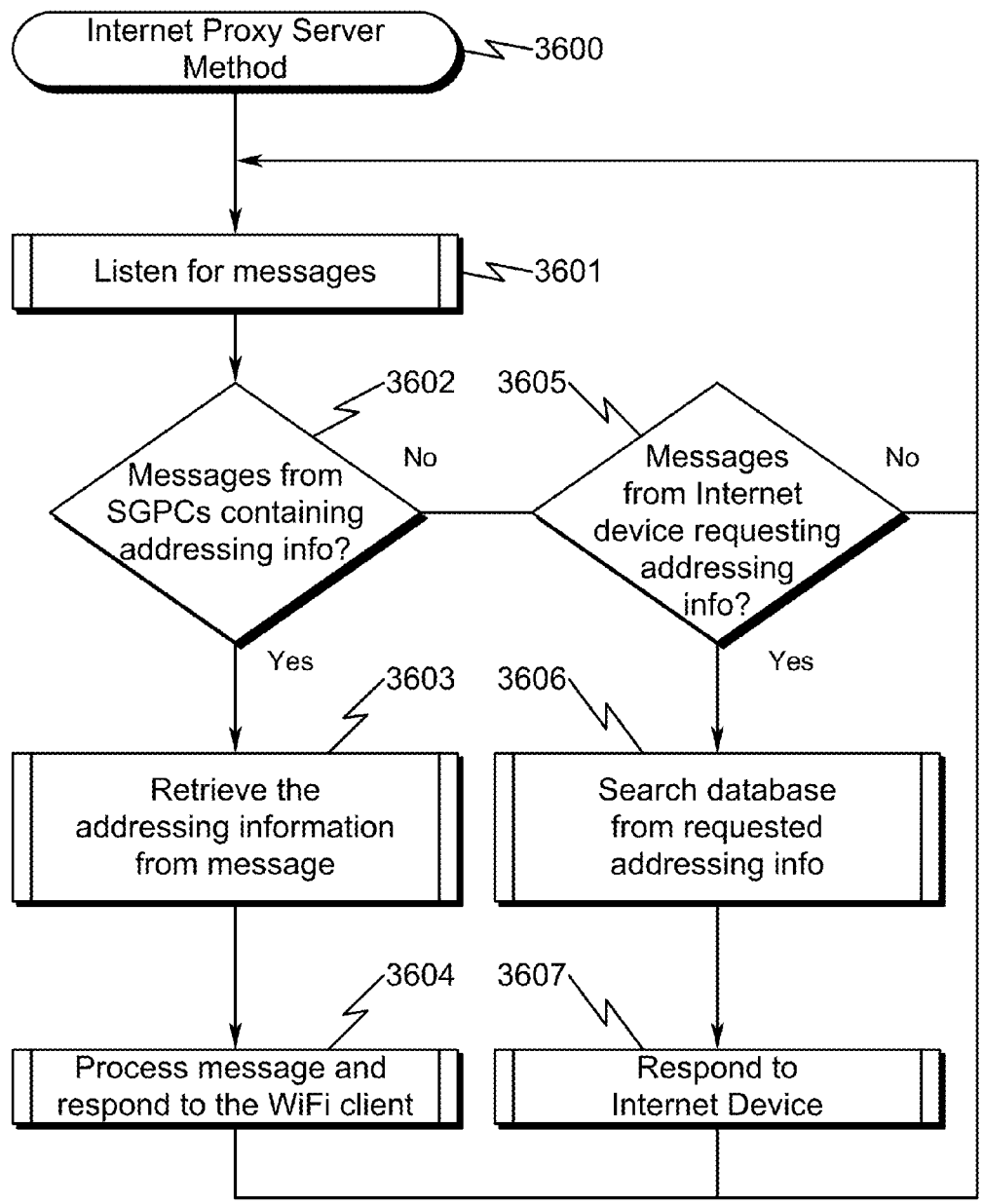
FIG. 36 illustrates an exemplary method flowchart diagram depicting an Internet proxy server method useful in some preferred embodiments of the present invention.
Figure 37:
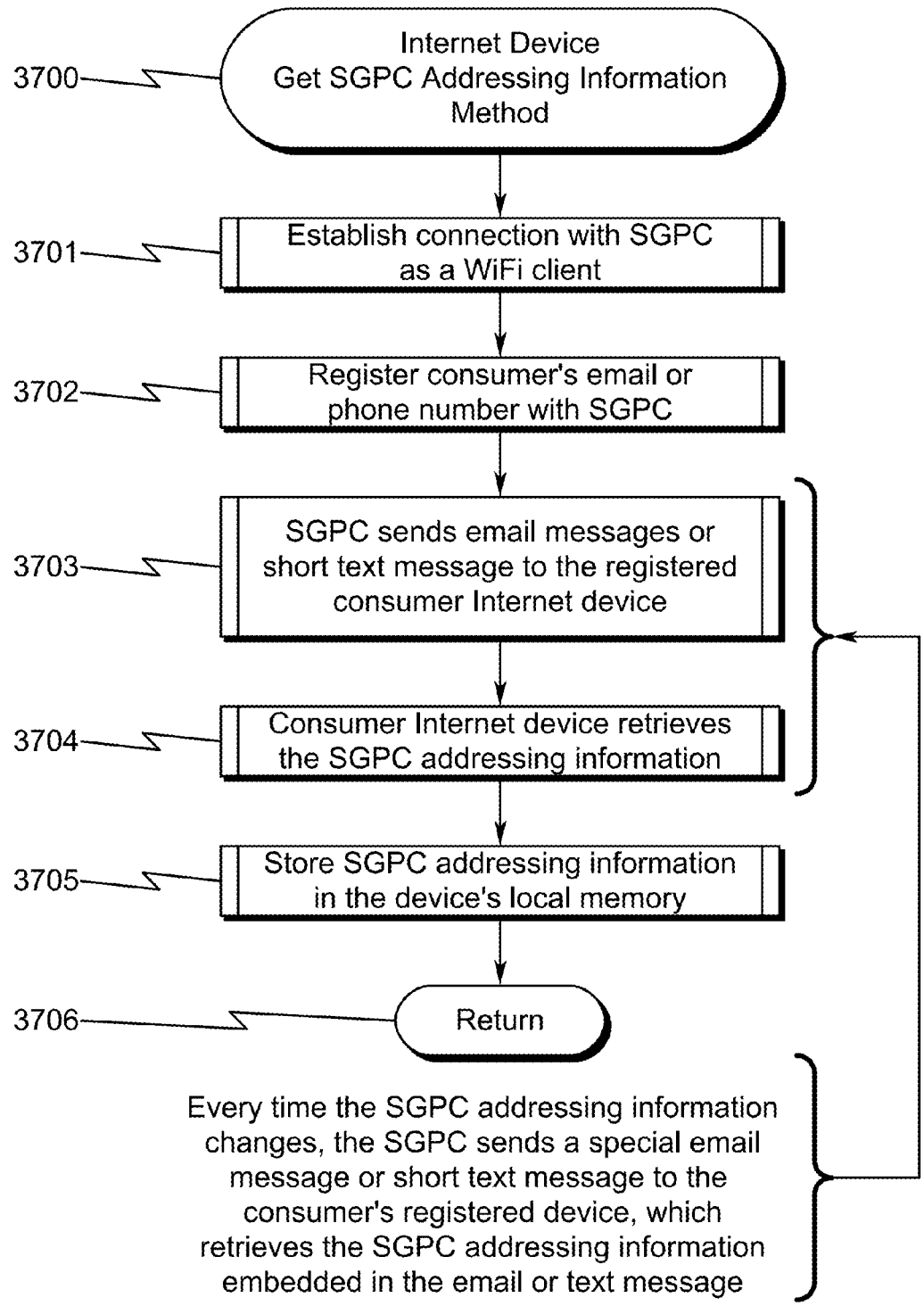
FIG. 37 illustrates an exemplary method flowchart diagram depicting an Internet device get SGPC addressing information method useful in some preferred embodiments of the present invention.
Figure 38:
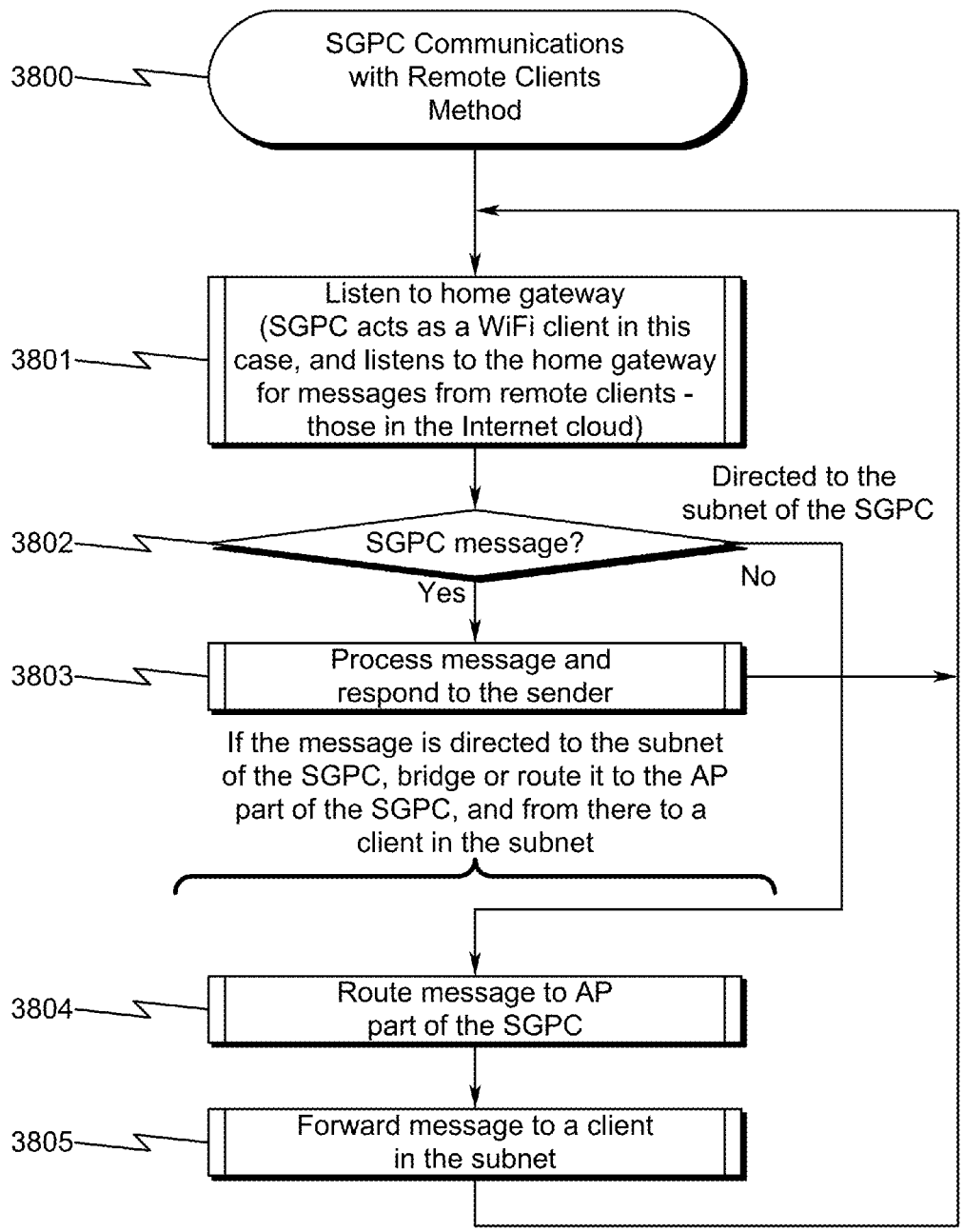
FIG. 38 illustrates an exemplary method flowchart diagram depicting a SGPC communications with remote client method useful in some preferred embodiments of the present invention.
Figure 39:
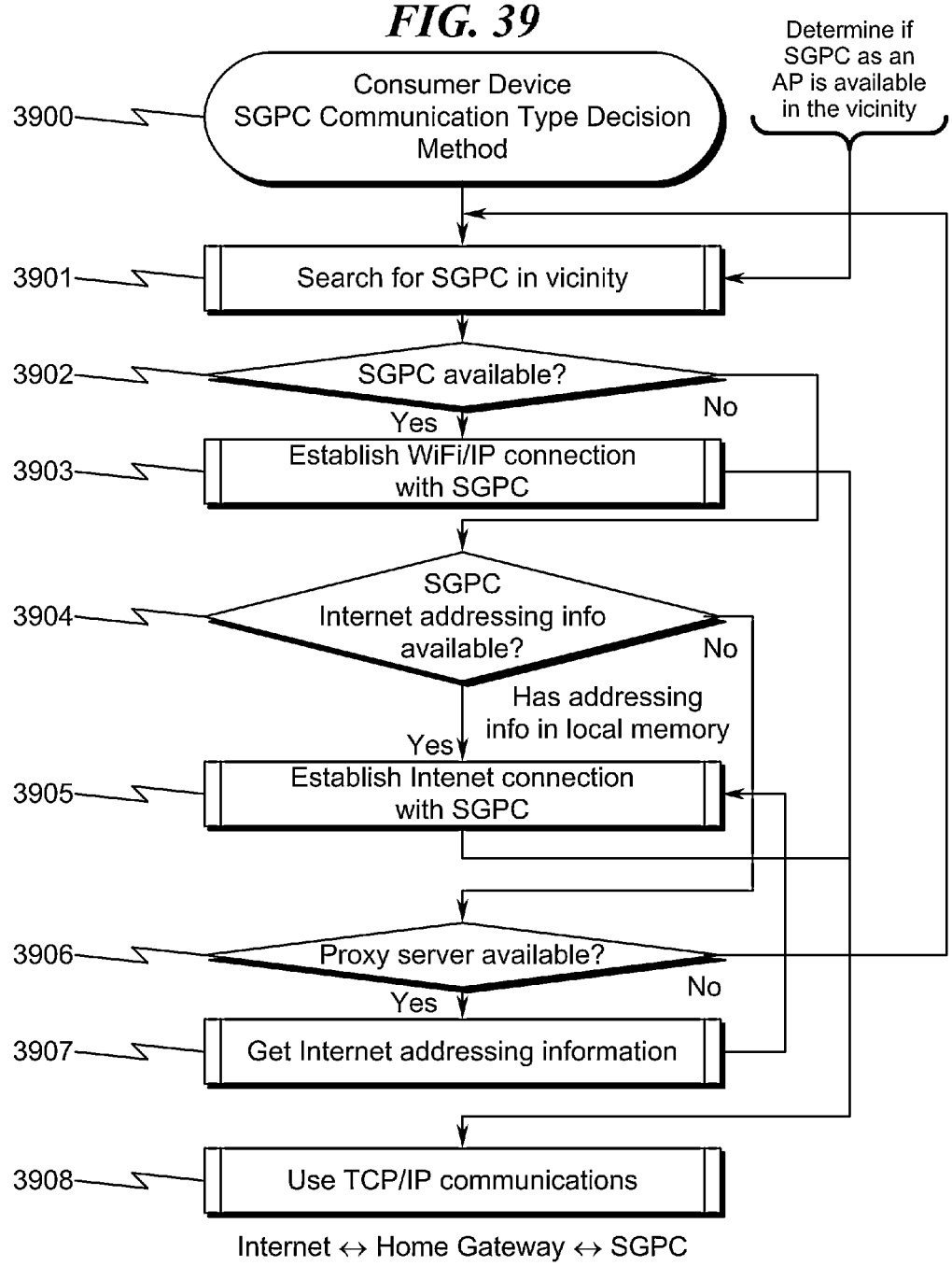
FIG. 39 illustrates an exemplary method flowchart diagram depicting a consumer device SGPC communication type decision tree method useful in some preferred embodiments of the present invention.
Figure 40:
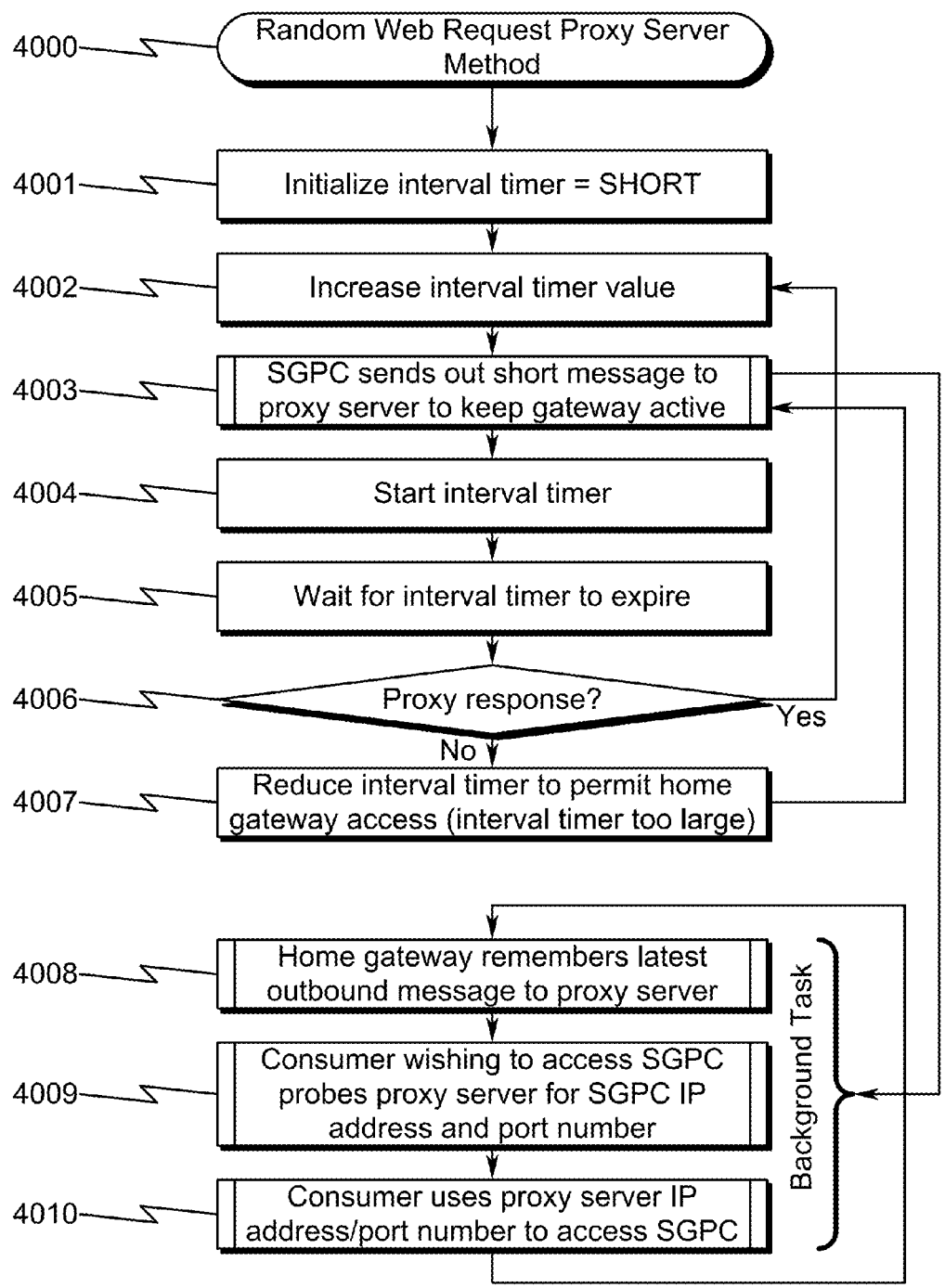
FIG. 40 illustrates an exemplary method flowchart diagram depicting a random web request proxy server method useful in some preferred embodiments of the present invention.

As generally illustrated by the exemplary flowcharts depicted in FIG. 35 (3500)-FIG. 40 (4000), the present invention anticipates that the SGPC will in many preferred embodiments incorporate a variety of communication methodologies and protocols to enable the SGPC to "bridge"Internet and local home automation networks. FIG. 35 (3500) illustrates an exemplary flowchart depicting a local WiFi communication method to permit message routing in a SGPC network. FIG. 36 (3600) illustrates an exemplary flowchart depicting an Internet proxy server method to permit message integration and routing external to a SGPC network. FIG. 37 (3700) illustrates an exemplary flowchart depicting an addressing update method to address updating of devices external to a SGPC network. FIG. 38 (3800) illustrates an exemplary flowchart depicting SGPC message routing method. FIG. 39 (3900) illustrates an exemplary flowchart depicting a communication decision tree method to select the appropriate message transport methodology within the SGPC network.

Exemplary Random Web Request Proxy Server Method (4000)

The present invention anticipates the use of a methodology to permit a proxy server to remain connected with a SGPC within a home automation network that is located within a home gateway. This configuration permits random web requests to pierce the home gateway firewall using information provided by the SGPC and maintained on the web proxy server. As generally illustrated by the flowchart in FIG. 40 (4000), this preferred exemplary proxy server method embodiment can be generalized comprising the following steps:
  (1) Initializing an interval timer value to a SHORT timespan (4001);

(2) Increasing the interval timer value (4002);
(3) Sending a short message from the SGPC to the proxy server through the home gateway (4003);
(4) Starting the interval timer (4004);
(5) Waiting for the interval timer to expire (4005);
(6) If a proxy response has been received, proceeding to step (2) (4006);
(7) Otherwise, reducing the interval timer value to permit the home gateway to maintain contact with the proxy server, and proceeding to step (3) (4007);
(8) In a background task, allowing the home gateway to remember the latest outbound message to the proxy server from the SGPC (this maintains an active link between the SGPC and the proxy server through the home gateway) (4008);
(9) Consumers wishing to access the SGPC probes the proxy server for the currently active SGPC IP address and port number (4009);
(10) Consumers utilize the currently active SGPC IP address/port number from the proxy server to access the SGPC through the home network interface (4010); and
(11) Proceeding to step (8) in the background task.

One skilled in the art will recognize that these method steps may be augmented or rearranged without limiting the teachings of the present invention. This general method summary may be augmented by the various elements described herein to produce a wide variety of invention embodiments consistent with this overall design description.

Exemplary Graphical User Interface (GUI) (4100)- (4700)

Figure 41:
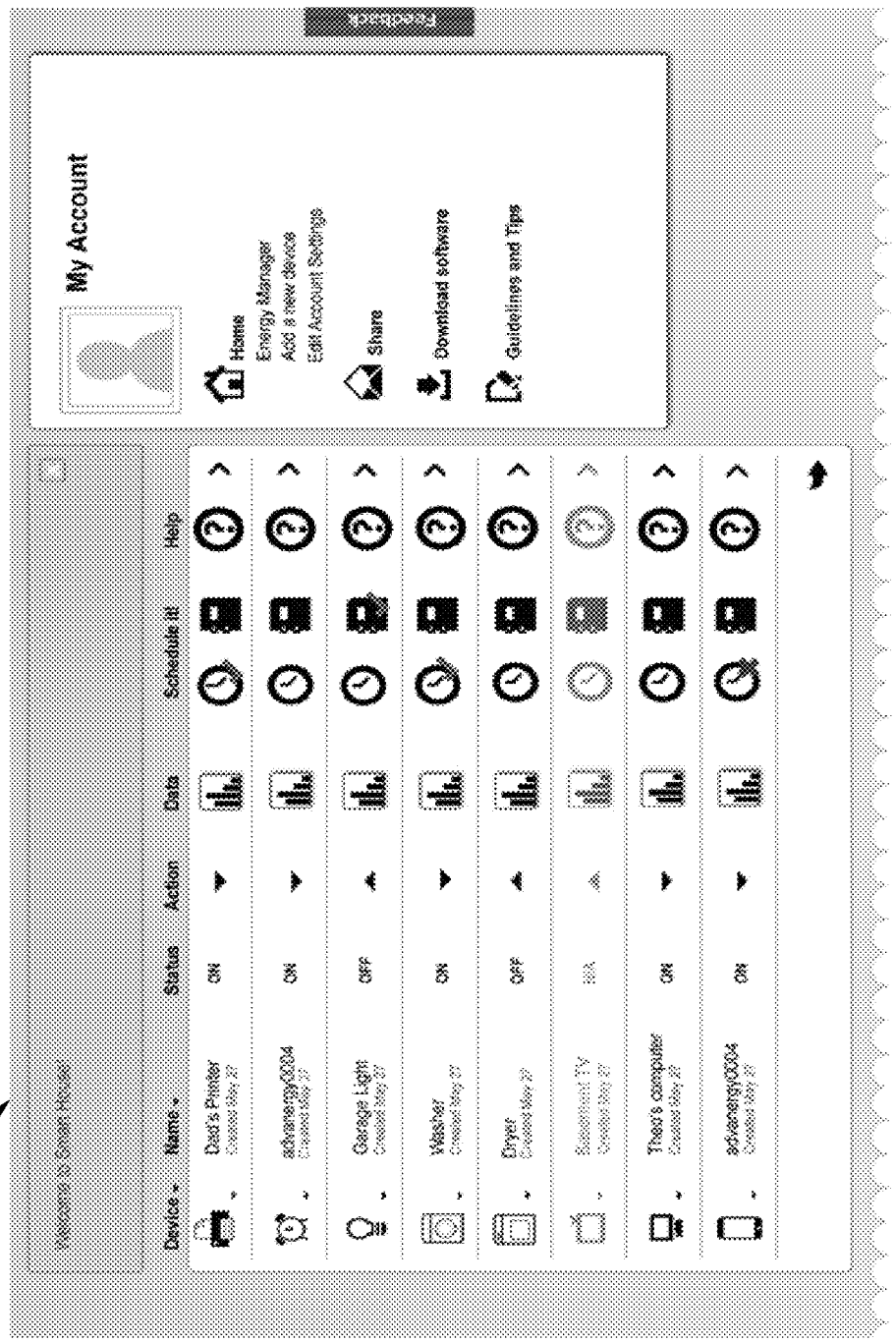
FIG. 41 illustrates an exemplary status screen and configuration dialog useful in some preferred embodiments of the present invention.
Figure 47:
FIG. 47 illustrates an exemplary energy management status dialog useful in some preferred embodiments of the present invention.

While the present invention may be embodied using a wide variety of graphical user interface (GUI) methodologies, several preferred GUIs are generally illustrated in FIG. 41 (4100)-FIG. 47 (4700). These exemplary screen dialog interfaces may be generally described as follows:

FIG. 41 (4100) illustrates a typical SGPC web page user interface that permits users to monitor status and configure the SGPC. As can be seen in this GUI dialog, the devices controlled by the SGPC may be represented by graphical icons, given identifying names, be provided a real-time status indicator, be available for on/off switch activation or scheduling, and be associated with real-time power consumption curves. On the right hand side of the dialog box a house wide information and setup configuration controls. The "download software" icon allows consumers to download software to their devices. The "Guidelines and Tips" icon opens a window that makes suggestions on energy usage. The "Edit Account Setting" icon allows password changes, etc. The "Add A New Device" icon allows adding devices from a list of all the available SGPC controlled devices to the list on the left of the GUI. A user may or may not want to put all SGPC controlled devices on the GUI. When adding a new device, the user may assign a name and an icon to the device, as shown in the FIG. 41 (4100). The "Share" and "Energy Manager" icons are discussed below. On the left hand side of the dialog screen associated with each device are buttons which allow control, setup, and monitoring of the device. Some of the buttons are self-explanatory. "Action" brings the device down or up depending on the direction of the arrow. "Help" pops up a window providing information on the device. The "Data" and "Schedule It!" icons are discussed below.

Figure 42:
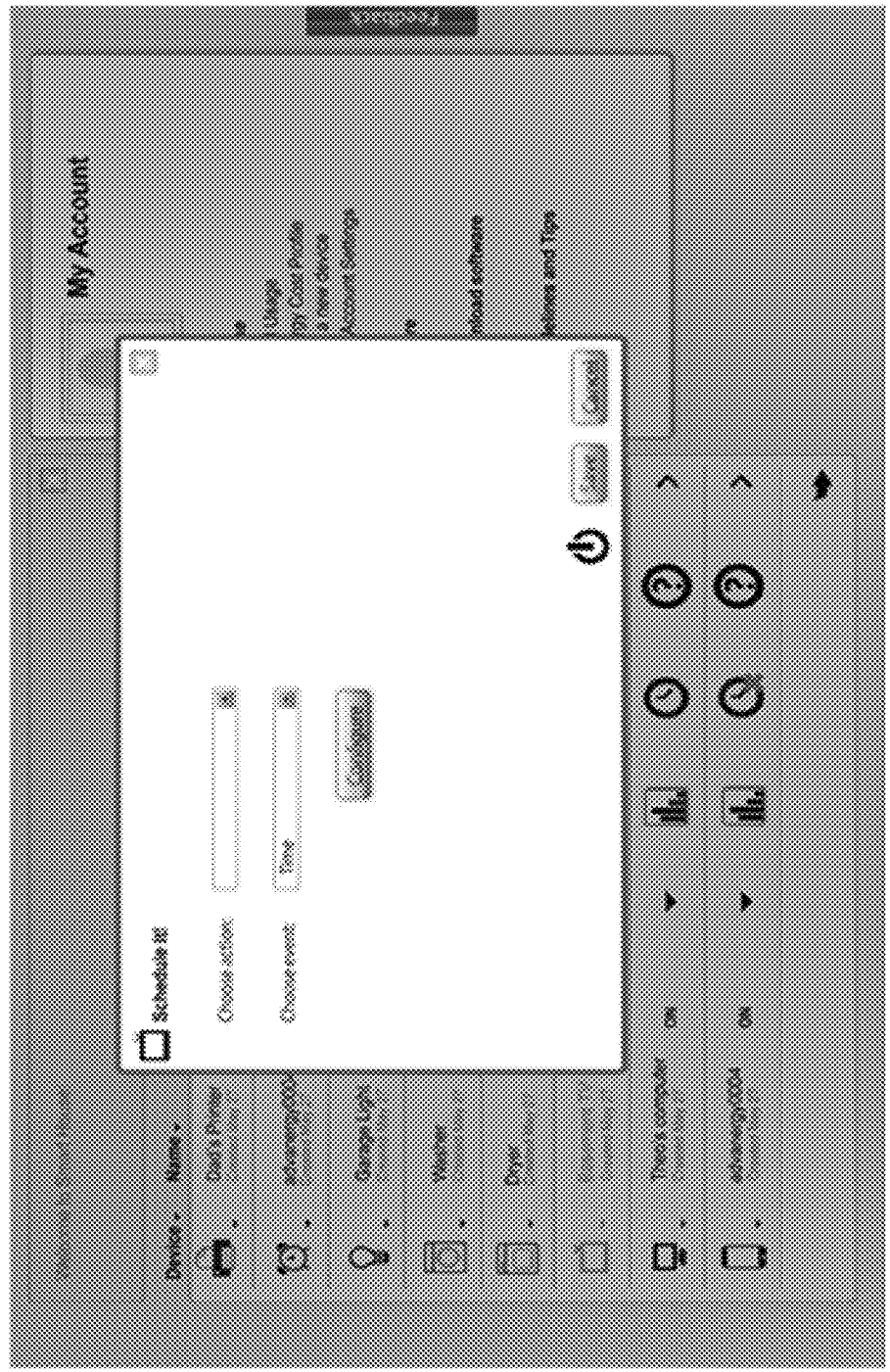
FIG. 42 illustrates an exemplary switch action/event scheduling configuration dialog useful in some preferred embodiments of the present invention.

FIG. 42 (4200) generally illustrates an exemplary switch action/event scheduling configuration dialog used to trigger power distribution switching events. This dialog is a general entrypoint to the more detailed calendar event scheduling dialog of FIG. 43 (4300).

Figure 43:
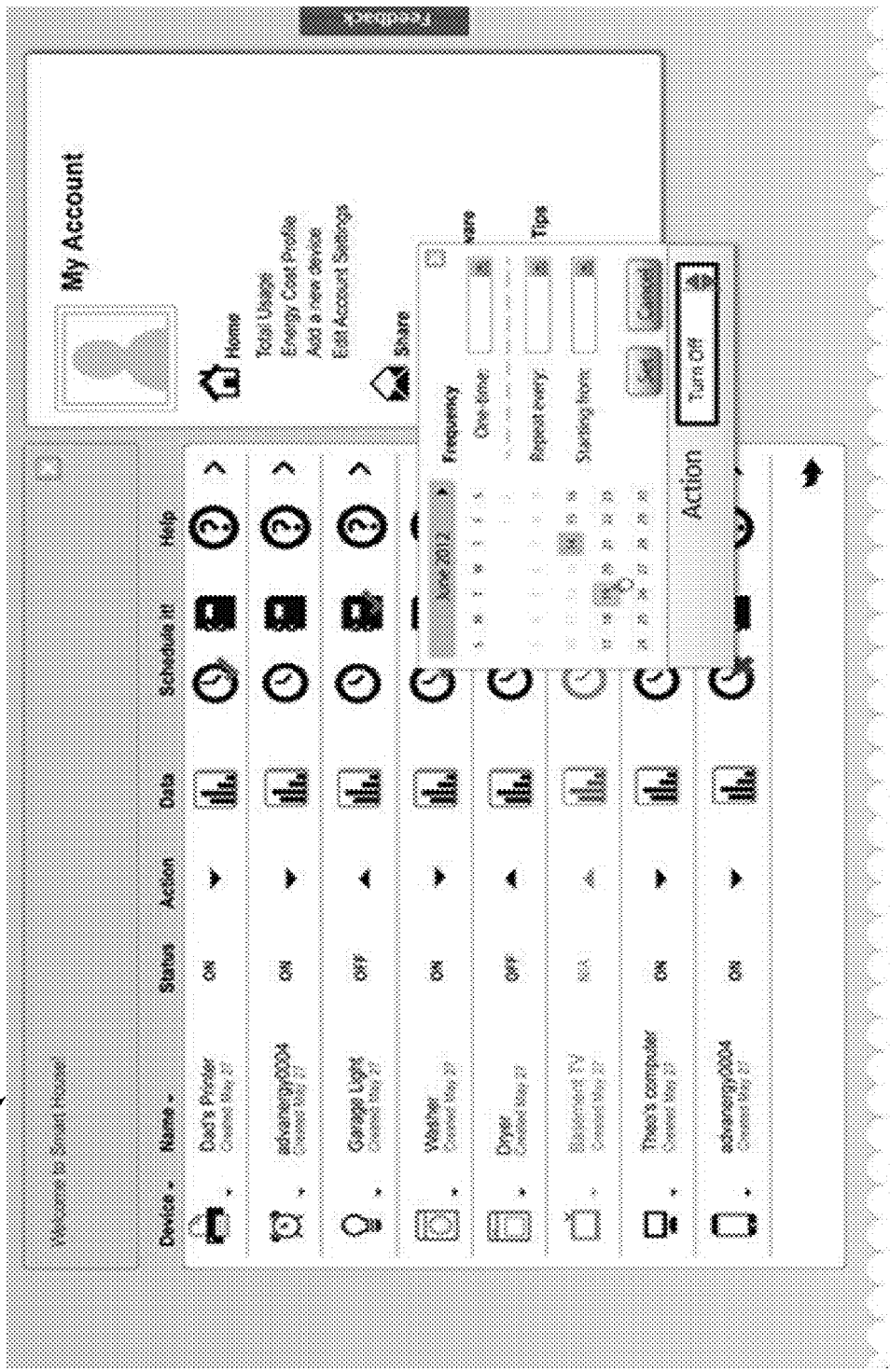
FIG. 43 illustrates an exemplary calendar based switch action/event scheduling configuration dialog useful in some preferred embodiments of the present invention.
Figure 44:
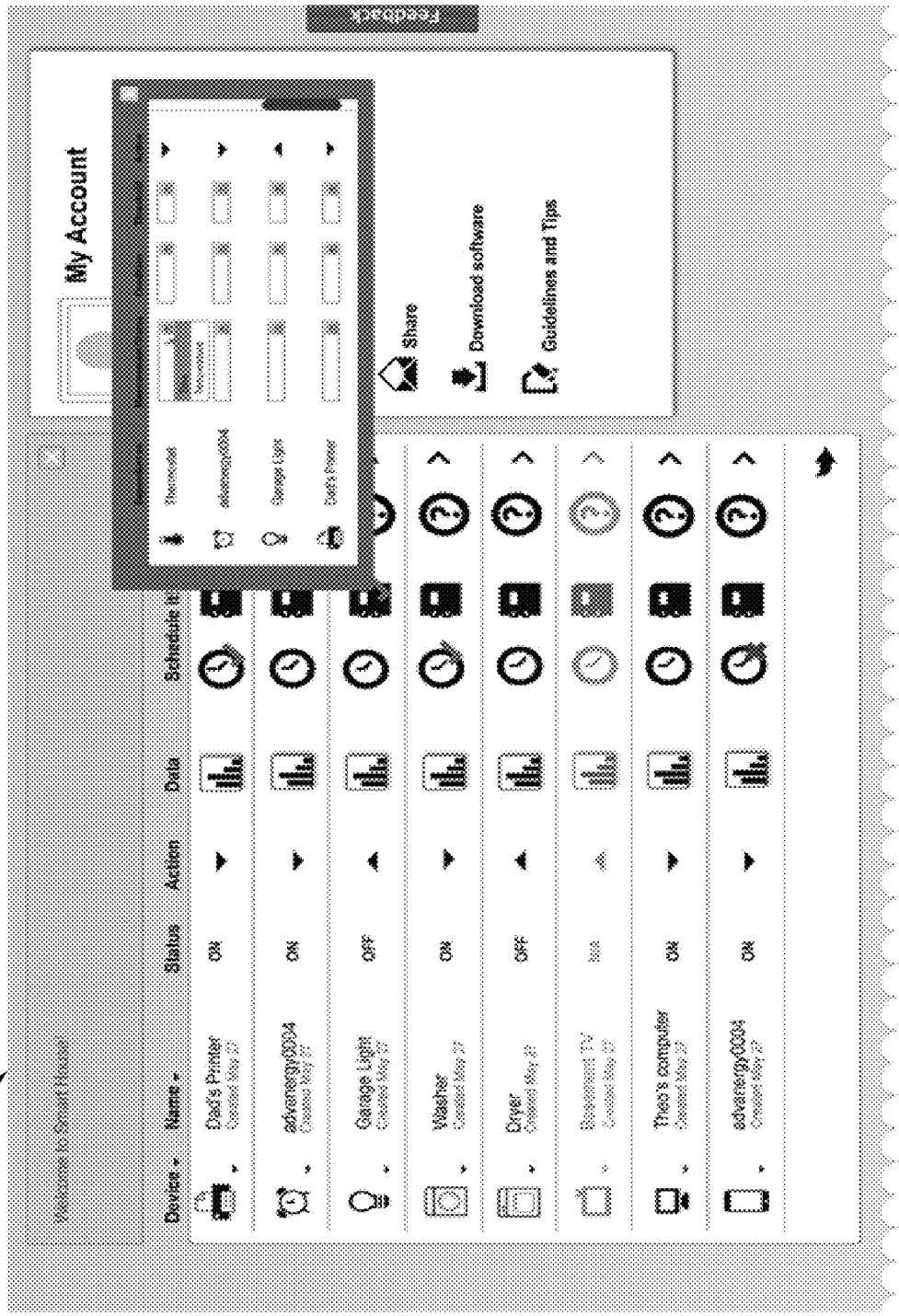
FIG. 44 illustrates an exemplary control scheduling dialog useful in some preferred embodiments of the present invention.

FIG. 43 (4300) generally illustrates an exemplary calendar based switch action/event scheduling configuration dialog used to trigger power distribution switching events. Selecting the clock icon under Schedule It! Invokes this dialog screen. This permits the user to set a one-time schedule or periodic schedule switching event. Once the schedule has been set, the action associated with the schedule can be selected from a menu.

FIG. 43 (4300) generally illustrates an exemplary device configuration dialog used to configure switched devices and monitor switch triggering events/sensors. Selecting the event icon button (the notebook symbol) associated with a SGPC controlled device (for example, a printer) activates this dialog screen. In this window the user may associate the dependencies between the devices (i.e., a printer) (and their measurements/status) and the SGPC controller. For example, the user may choose "Thermostat", and its "temperature" measurement, define a condition from a list of predefined conditions, for example, "greater or equal", define a threshold, for example, "98 degrees", and finally, define an action, say, "down off". Therefore, in this example, the printer will turn off, if the thermostat's measured temperature is greater or equal to 98 degrees. Note that this popup also allows an action to be associated with a status change. The dependent devices (the thermostat for example) may also be part of the devices listed on the main GUI page.

Figure 45:
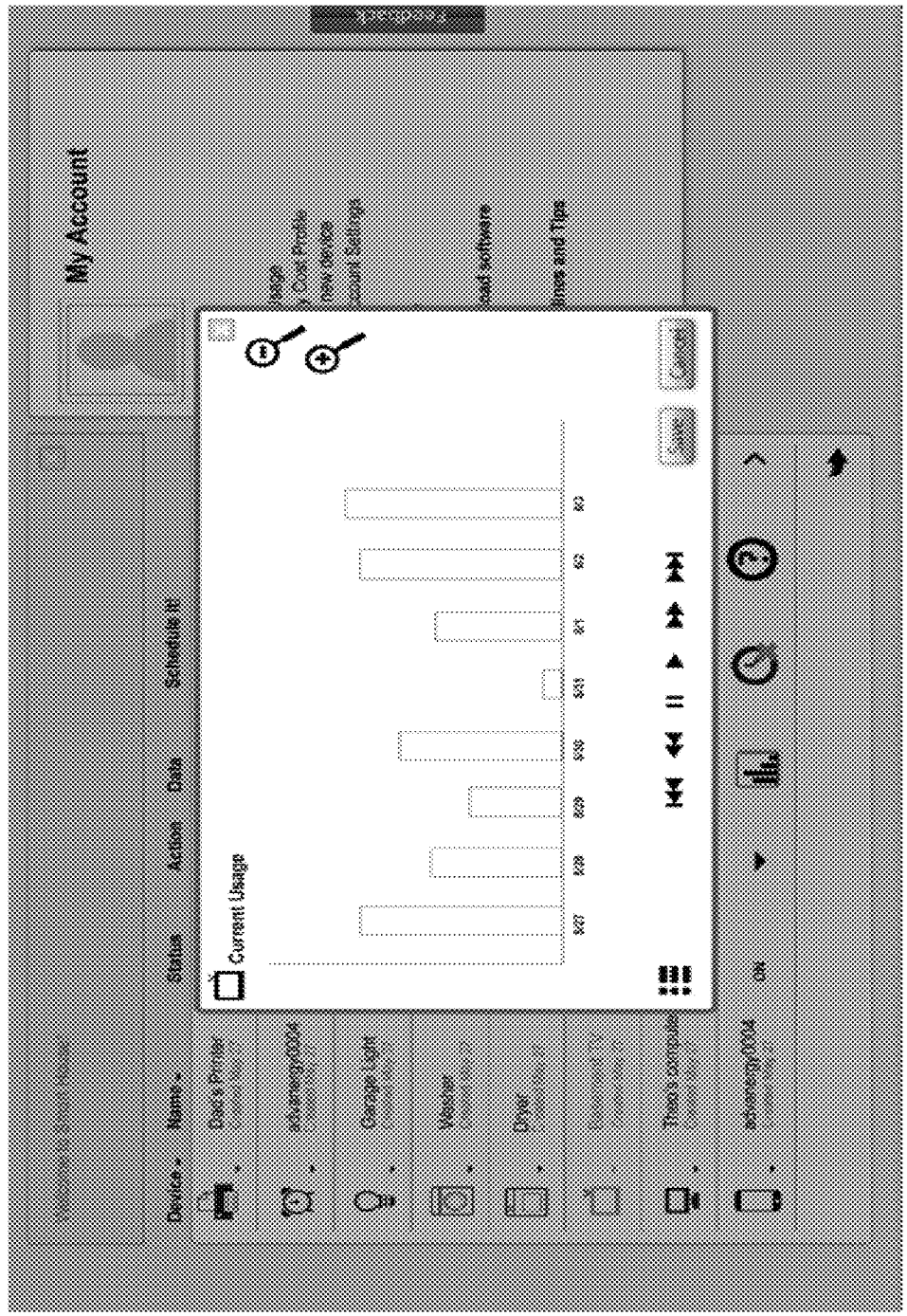
FIG. 45 illustrates an exemplary energy consumption status dialog useful in some preferred embodiments of the present invention.

FIG. 45 (4500) illustrates an exemplary energy consumption status dialog that is used to monitor the current energy consumption of a switched device. Selecting the "Data" icon displays this dialog and generally displays energy consumption at some scale, permitting the user to select zoom-in and zoom-out buttons to see data at finer scale, for example, hours and minutes, and allowing the user to move right and left to see data in different time frames.

Figure 46:
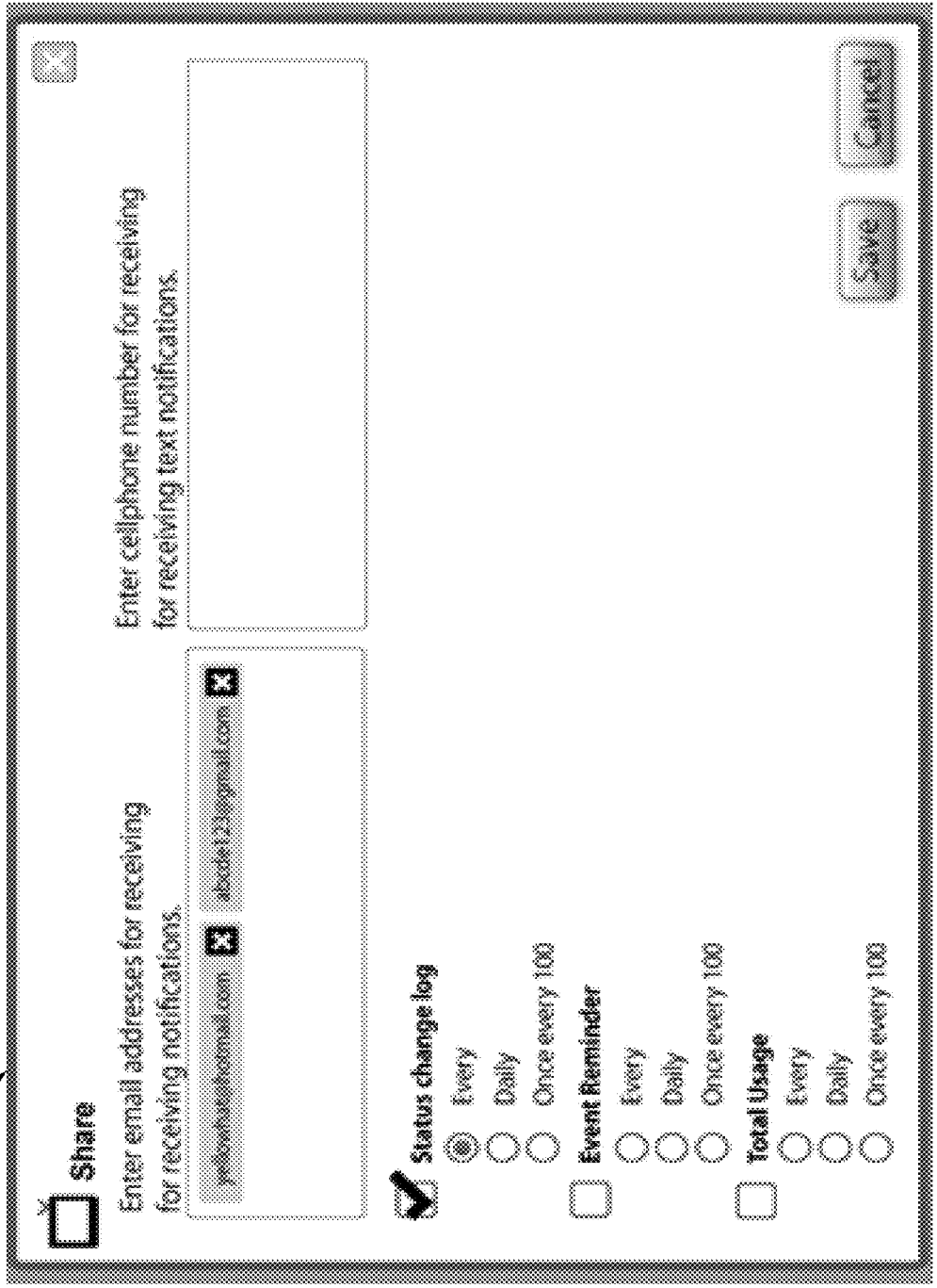
FIG. 46 illustrates an exemplary notification configuration dialog useful in some preferred embodiments of the present invention.

FIG. 46 (4600) illustrates an exemplary notification configuration dialog useful used to push notification messages to users regarding switch functions and energy consumption. This dialog permits access to data sharing features. The user may specify e-mail addresses and phone numbers as well as defining what information they would like to be notified of and at what frequency of notification.

FIG. 47 (4700) illustrates an exemplary energy management status dialog depicting trends in actual daily energy consumption. This dialog box illustrates the popup windows for the "Energy Management" button. The total energy consumption of the house is displayed and the user may be able to configure the time-of-day energy cost for the auto mode of control action described elsewhere herein.

One skilled in the art will recognize that these dialog interfaces are merely exemplary of a wide variety of GUI interfaces possible in implementing particular embodiments of the present invention.

Exemplary Power Integration Application Context (4800)

Figure 48:
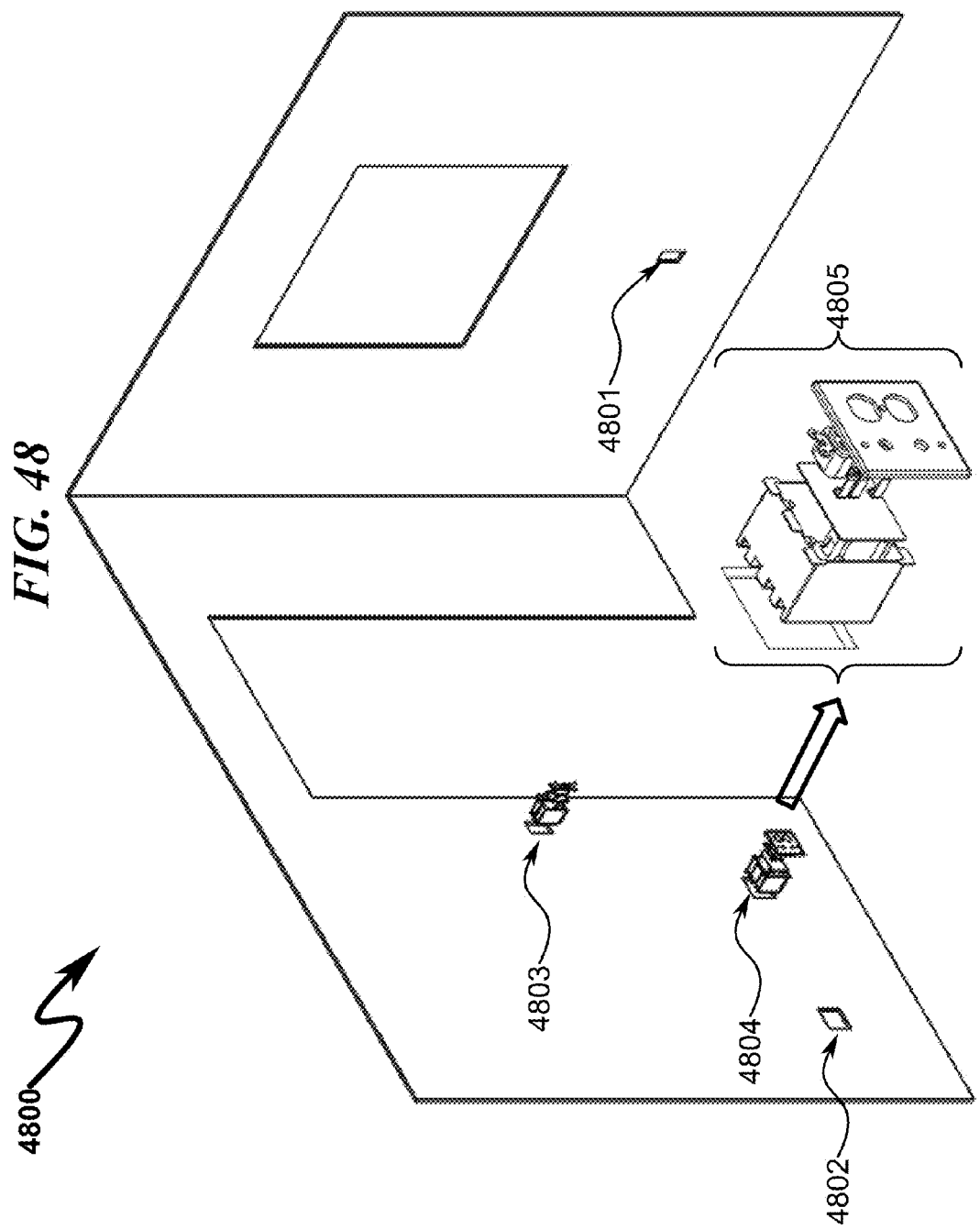
FIG. 48 illustrates an exemplary application context for the present invention.

A preferred exemplary application context for the present invention is generally illustrated in FIG. 48 (4800), wherein new or existing wiring within a building structure is to be configured with SGPC modules that permit control of lighting and other consumer loads. This application context may include any number of single duplex (4801) and/or quad box (4802) electrical enclosures placed typically at either chest level (4803) and/or knee level (4804). One invention objective is to provide replacement hardware (4805) that may be retrofit into existing building structures (or installed in new building structures) that provides Internet replacement switching capability for existing wall switches (4803) and traditional power receptacles (4804).

Exemplary Power Integration System (4900)

Figure 49:
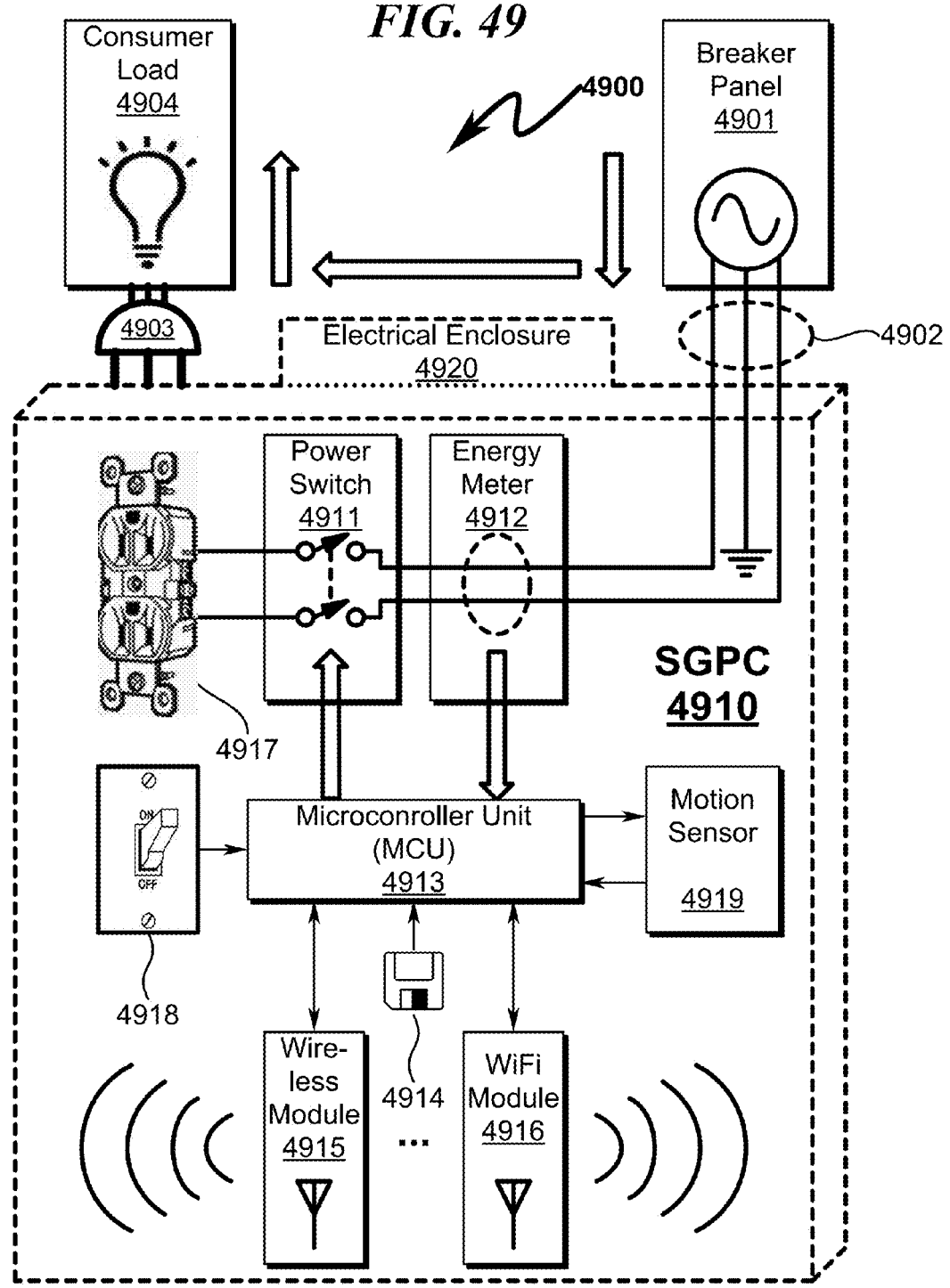
FIG. 49 illustrates a preferred exemplary system embodiment of the present invention as applied to a power distribution switching application.

A preferred exemplary system embodiment of the present invention is generally illustrated in FIG. 49 (4900), wherein the SGPC (4910) previously discussed is integrated into a form factor suitable with a conventional electrical enclosure (4920) such as a conventional NEMA electrical enclosure that may be used in a building/house wiring application. This application context may include both conventional chest-high wall switching applications as well as knee-level wall outlet applications.

The system as depicted operates in conjunction with a traditional breaker panel (4901) and associated building wiring (4902) to supply power via NEMA electrical connectors (4903) (or in some cases direct wiring) to a consumer load (4904). As previously indicated the system incorporates a power switch (4911) and energy metering functions (4912) to connect the power source (4901) to the consumer load (4904) via either direct wiring (not shown) or a standard plug (4903)/receptacle (4917) combination. The power switch (4911) as illustrated is a single switch but in some configurations may be implemented as multiple switches that are independently controlled to support multiple independent receptacles (4917)/loads (4904). This may be used to support switching features such as normal/emergency lighting and other features associated with electrical power distribution.

The power switch (4911) is controlled by a MCU (4913) or other computing device executing instructions read from a computer readable medium (4914). The MCU (4913) is configured to communicate to other SGPC (4910) systems and/or the Internet or other local home automation devices via a variety of wireless (4915) and/or WiFi (4916) modules. The control software (4914) provides for local web page hosting and control functions within the context of a meshed network of SGPC (4910) modules as well as network bridging functions that permit the SGPC (4910) to be accessed across firewalls within a private home computer network.

The SGPC (4910) in this context may be augmented with a power receptacle (4917) to permit switched power to be made available via standard NEMA power receptacle or the like. This configuration is typically placed at approximately knee level above the floor but placement may vary based on various standards such as contained in the National Electrical Code (NEC) or equivalent regulatory standard. Thus, the SGPC (4910) in this context may be placed within a standard DUPLEX or QUAD electrical box and used to switch power to traditional DUPLEX electrical receptacles as illustrated in FIG. 49 (4900, 4917) contained within the enclosure (4920). While FIG. 49 (4900) discloses a conventional three-prong (hot/neutral/ground) power plug/receptacle configuration, the present invention also anticipates the use of a conventional two-prong (hot/neutral) wiring configuration.

The SGPC (4910) in this context may be augmented with a NEMA-style power switch (4918) or other switching element (pushbutton, etc.) to permit user input to the MCU (4913) for the purposes of changing the state of the power switch (4911). This configuration is typically placed at approximately chest level above the floor but placement may vary based on various standards such as contained in the National Electrical Code (NEC) or equivalent regulatory standard. Thus, the SGPC (4910) in this context may be placed within a standard DUPLEX or QUAD electrical box and used to switch power to traditional DUPLEX electrical receptacles as illustrated in FIG. 49 (4900, 4917) or used to directly switch power to a conventional consumer load (4904) via direct wiring from the power switch (4911). This configuration is useful in situations where a building is to be retrofit with "smart" wall switches that are networked together under a distributed mesh network but which may be controlled in a centralized manner via the Internet or some other computer network interface. The present invention anticipates that in some configurations the wall switch (4918) may be placed in parallel with the power switch (4911) rather than being used as a direct signaling input to the MCU (4913).

The system may also incorporate a motion sensor (4919) (incorporating a wide range of sensor capabilities not necessarily directed specifically at motion detection) that may be used to detect motion or other activity within an area associated with the SGPC (4910) and proximal to the associated electrical enclosure (4920). For example, the motion sensor (4919) may be used to automatically activate the power switch (4911) in response to the detection of movement within a room in spite of power switching schedules that would normally have the power switch (4911) disabled. This motion detection information may also be used for security purposes to detect unauthorized intrusions, entry into high security or restricted areas, or for fire detection. Thus, the system as depicted may be used to both automate the power switching function associated with a consumer load (4904) but also retrofit security/safety monitoring in the same context.

The ability of the disclosed invention to be retrofit within existing wall switch/receptacle wiring infrastructures and operate under coordinated wireless control is a significant improvement over the prior art in the sense that no infrastructure wiring is necessary to implement the switching/monitoring functions of the system and the system is not limited by distance or other constraints typically associated with communication methodologies that use the building wiring infrastructure as the communication medium (variously referred to as power line carrier, power line digital subscriber line (PDSL), mains communication, power line telecom (PLT), power line networking (PLN), and broadband over power lines (BPL)).

Exemplary Power Distribution Switching Method (5000)

The present invention anticipates a method that may be used with conventional wall power switches that permits the function of the wall switches to be modified in a coordinated fashion to permit optimal power utilization within a building structure. This application context when generally applied using the system described in FIG. 49 (4900) permits a traditional wall switch to be replaced with a smart controller capable of monitoring activity within a room and controlling power switching based on a variety of environmental and time/event-driven conditions.

Figure 50:
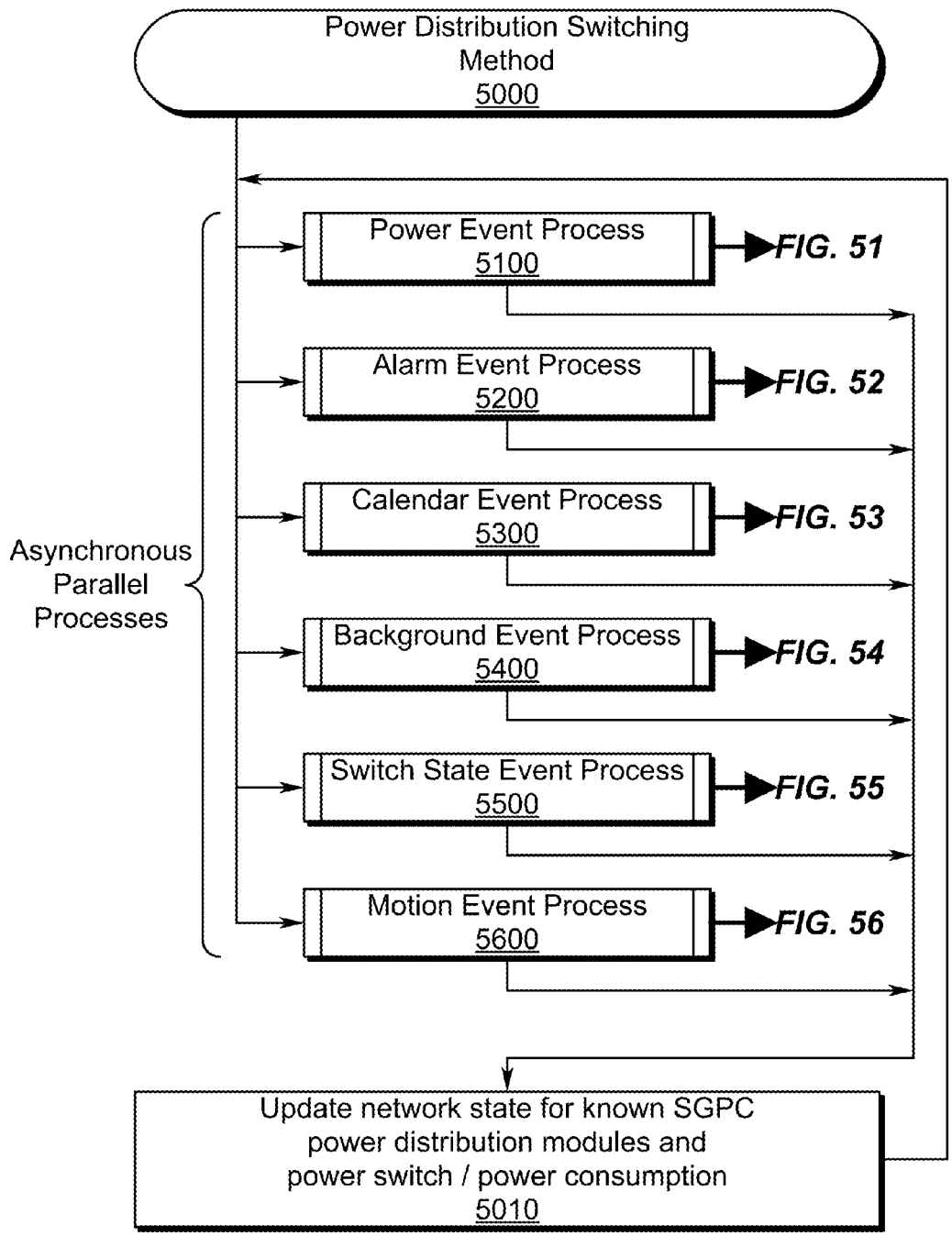
FIG. 50 illustrates a preferred exemplary method embodiment of the present invention as applied to a power distribution switching application.

A typical method associated with this functionality is generally illustrated in FIG. 50 (5000) and comprises the following steps that are typically processed in an asynchronous fashion:

(1) Executing a power event process to process power failures to the SGPC (5100);

(2) Executing an alarm event process to process alarm events detected in the SGPC network (5200);
(3) Executing a calendar event process to process power switching based on a predefined calendar/time (5300);
(4) Executing a background event process to process network configuration and communication messaging (5400);
(5) Executing a switch state event process to process user inputs detected from wall switch state transitions (5500);
(6) Executing a motion event process to process evens detected from the motion detector (5600); and
(7) Updating the network states for known SGPC power distribution modules, power switches, and power consumption and continuing to execute event processes as they are triggered (5010).

One skilled in the art will recognize that this list of executed processes is only exemplary of the types of status monitoring and switch control that may be accomplished using the present invention teachings.

The individual exemplary processes depicted in FIG. 50 (5100, 5200, 5300, 5400, 5500, 5600) are generally detailed in FIG. 51 (5100)-FIG. 56 (5600)) and discussed below.

Power Event Process Method (5100)

Overview

Power event processing may be incorporated in many preferred invention embodiments, permitting a predetermined sequence of events to occur on the detection of a power fail event on power-up (a power good event) or a power fail event on power-down (a brownout event). In many situations, the ability for the SGPC to coordinate power distribution on power reset/brownout conditions can have a significant benefit to the operation and longevity of electrical equipment connected to the SGPC power switch (PS).

Power Sequencing

This capability permits the SGPC to wait a certain period of time before activating the power switch after power is initially applied to the system, or to delay the power switch activation a fixed period of time, and/or sequence the power switch after another SGPC has enabled power to their power switch. This power sequencing technique reduces the potential for a breaker trip event during a power restart for a building and also minimized power line spikes during these events. By sequencing power to the SGPC after power is determined to be "good", the overall integrity of the power distribution grid within the building electrical system is improved. This can have a significant impact on the reliability and longevity of electronic equipment powered under SGPC control as compared to equipment directly attached to the building power grid. A similar capability may be applied to brownout events in which equipment connected to the SGPC is to be disconnected and remain disconnected during brownout events. This capability also permits activation of emergency lighting on a limited basis after a blackout/brownout event to minimize grid disruptions that would occur with switching on all consumer loads simultaneously after a power-fail/brownout event.

Soft-Start Power Sequencing

As generally illustrated in FIG. 15 (1500), in some preferred invention embodiments the SGPC power switch (PS) may incorporate a solid-state switching element such as a solid state relay, SCR, TRIAC, power MOSFET, IGBT, etc., that may be used to switch power to the consumer load or modulate the power provided to the consumer load to implement a "soft-start" feature. This capability may be used in isolation or in conjunction with a traditional contactor to provide "FULL-ON" switching when the consumer load is to be fully activated.

This optional capability allows some consumer loads such as motors and other reactive components to be started gradually to avoid large inrush currents that can occur as a result of sudden application of power after a power reset condition is encountered. This feature in conjunction with power line monitoring may permit soft starting of consumer loads only after power-on switching transients normally associated with a power recovery cycle have dissipated or are no longer detected.

Exemplary Power Event Method

Figure 51:
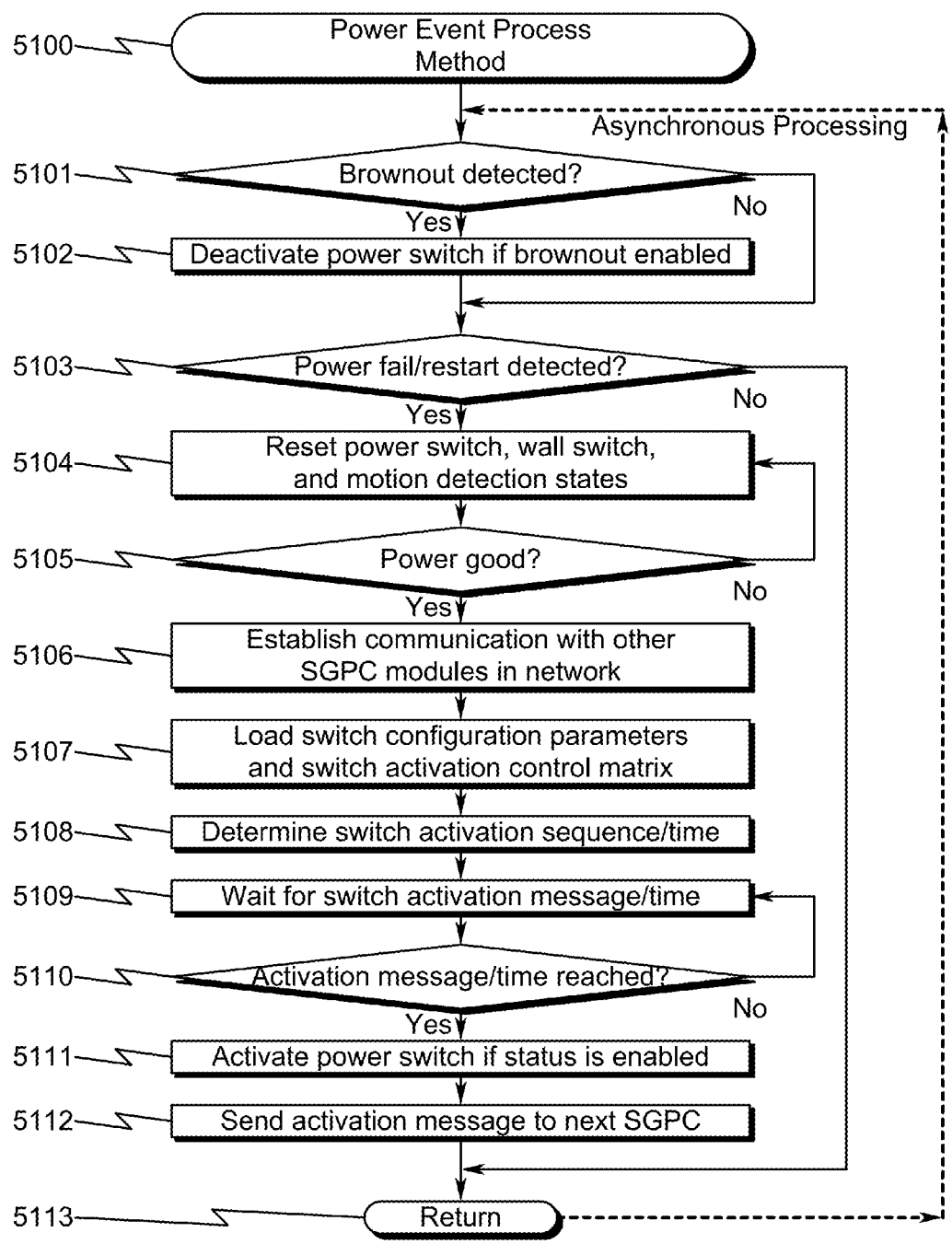
FIG. 51 illustrates a flowchart depicting a preferred exemplary power event processing method.

A typical method associated with power event processing functionality is generally illustrated in FIG. 51 (5100) and comprises the following steps:
(1) Determining if a brownout has been detected, and if not, proceeding to step (3) (5101);
(2) Deactivating the power switch if brownout detection has been enabled for this SGPC (5102);
(3) Determining if a power fail/restart event has occurred (either a power-up reset event or a power-down brownout event), and if not, proceeding to step (13) (5103);
(4) Resetting the power switch, wall state, and motion detection states to known idle/off states to initialize both the power switching and power activation controls to an idle/off configuration (5104);
(5) Determining if incoming power is good, and if not, proceeding to step (4) (5105);
(6) Establishing communication with other SGPC modules in the network to integrate the mesh network and permit Internet access if so configured (5106);
(7) Loading power switch configuration parameters and a power switch activation control matrix from a remote host to define the states/events/conditions under which the power switch will be activated (5107);
(8) Determining when the power switch will be activated either by a set activation sequence message and/or a predefined delay time (5108);
(9) Waiting for a switch activation message and/or time delay (5109);
(10) Determining if the switch activation message has been received and/or the delay time has elapsed, and if not, proceeding to step (9) (5110);
(11) Activating the power switch if the switch activation control matrix indicates it should be activated (this may incorporate soft-start power cycling if supported by the SGPC and enabled for the power switch serving the consumer load) (5111);
(12) Forwarding a switch activation message to the next SGPC in the sequenced power-on control chain (5112); and
(13) Returning to the calling procedure or proceeding to step (1) based on the type of power event processing implemented (synchronous or asynchronous) (5113).

One skilled in the art will recognize that this list of executed processes is only exemplary of the types of status monitoring and switch control that may be accomplished using the present invention teachings.

Alarm State Event Process Method (5200)

Some preferred invention embodiments may incorporate alarm event processing to enable sensor alarms associated with the SGPC to be reported to a remote host or via a web banner (web page) configured to provide status information. Various types of sensors are anticipates, broadly incorporating sensors that detect environmental conditions such as temperature, smoke, carbon monoxide (CO), motion, audio, video, and the like.

Alarm Reporting Methodologies

Some alarm conditions may be immediately triggered by sensor detection of a given environmental condition. This might be the case for over-temperature detection, smoke detection, or carbon monoxide detection. Other alarm conditions may be defined in terms of active security areas in which any detected wall switch state change or motion detection (broadly construed as defined herein) is detected. Either of these broadly defined alarm conditions when detected may trigger a report to a remote host logger and/or web page (banner) interface to allow security/building management personnel an opportunity to address the alarm condition.

SGPC-Connected Activity Alarms

The present invention also in some preferred embodiments permits the SGPC to activate fire alarms and/or security lighting in response to detected fire alarm events and/or security intrusion events. This capability may be programmed within the system using appropriate entries in the Power Switch Activation Control Matrix.

Retrofitting Security/Safety Reporting Systems into Existing Infrastructure

Since the SGPC system as described herein may be retrofitted into existing wall switch plate enclosures, the opportunity to retrofit existing buildings with additional security and safety features is specifically anticipated by many invention embodiments.

Exemplary Alarm Event Method

Figure 52:
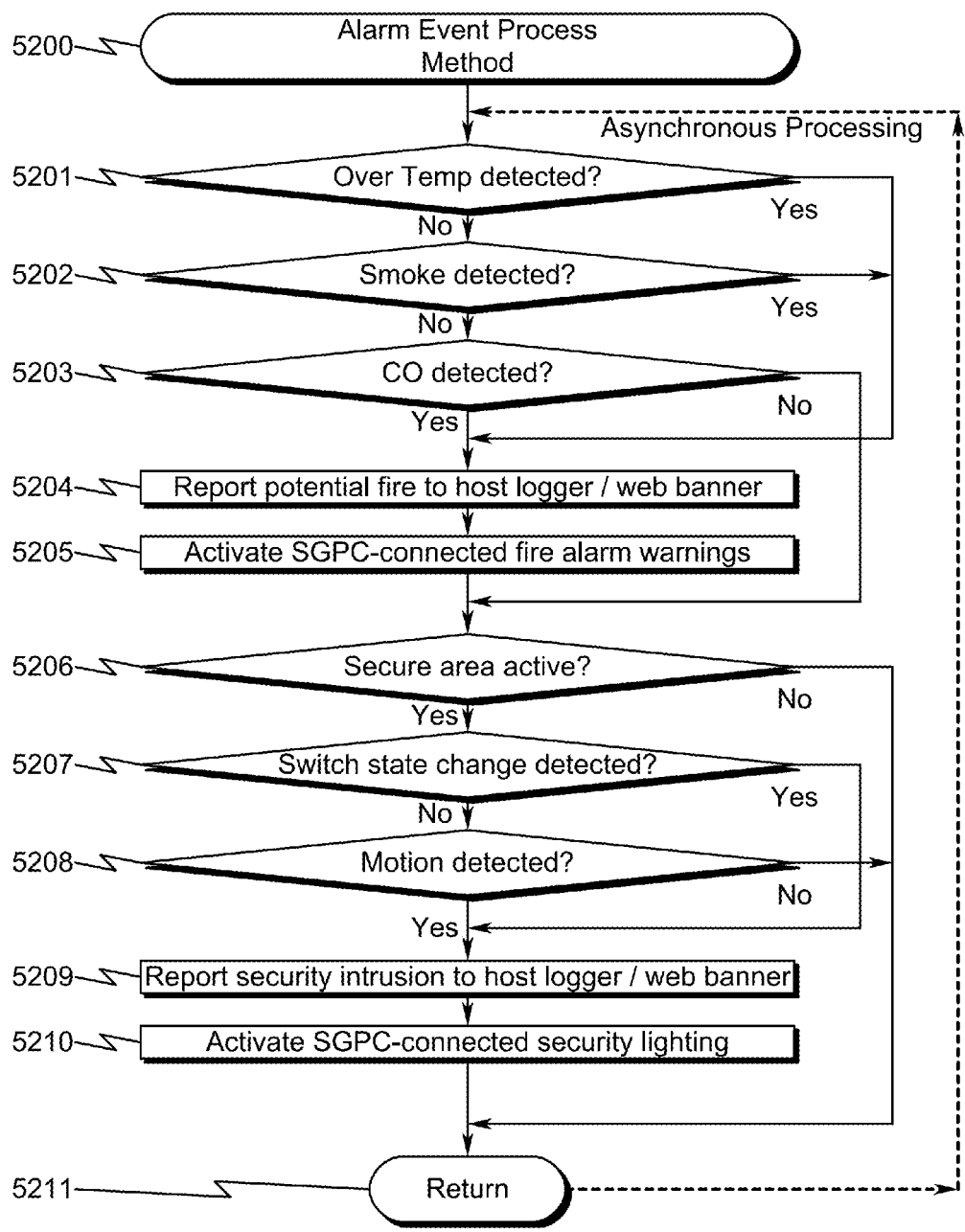
FIG. 52 illustrates a flowchart depicting a preferred exemplary alarm event processing method.

A typical method associated with alarm event processing functionality is generally illustrated in FIG. 52 (5200) and comprises the following steps:
 (1) Determining if an over-temperature condition has been sensed with a SGPC-attached sensor, and if so, proceeding to step (4) (5201);
 (2) Determining if smoke been sensed with a SGPC-attached sensor, and if so, proceeding to step (4) (5202);
 (3) Determining if carbon monoxide (CO) been sensed with a SGPC-attached sensor, and if not, proceeding to step (6) (5203);
 (4) Reporting a potential fire to a host logging system and/or displaying a fire alarm on a web page/banner (5204);
 (5) Activating SGPC-connected fire alarm warning indicators (5205);
 (6) Determining if the SGPC is operating in an active security area, and if not, proceeding to step (11) (5206);
 (7) Determining if a wall switch state change has been detected, and if so, proceeding to step (9) (5207);
 (8) Determining if a motion detector state change has been detected, and if not, proceeding to step (11) (5208);
 (9) Reporting a potential security intrusion to a host logging system and/or a web page/banner (5209);
 (10) Optionally activating SGPC-connected security lighting (5210); and
 (11) Returning to the calling procedure or proceeding to step (1) based on the type of alarm event processing implemented (synchronous or asynchronous) (5211).

One skilled in the art will recognize that this list of executed processes is only exemplary of the types of status monitoring and switch control that may be accomplished using the present invention teachings.

Calendar Event Process Method (5300)

Some preferred invention embodiments may incorporate calendar processing to trigger power switch activation/deactivation based on an event calendar. This event calendar may also be used in some preferred embodiments to modify the behavior of monitored sensors such as temperature, smoke, carbon monoxide (CO), motion, audio, video, and the like, and their associated notifications to a remote host and/or web page/banner user interface.

Calendar Event Methodologies

While several calendar event methodologies are possible using the present invention, a preferred methodology permits a host computer to define a series of date/time/sequential chronological times that may be used to trigger the activation/deactivation of a SGPC power switch. This calendar data may be defined in a variety of ways, with an Internet-based web page/banner being a preferred definition mechanism.

In addition to being able to download the calendar definition from a remote host (or define it locally using a locally-supported web hosting interface), the present invention may support clock calibration features that allow the local time associated with event calendaring to be retrieved from a remote host/web time calibration standard. This permits the local SGPC to operate without the need for an accurate local chronographic timebase and allows low power clocking for the MCU to be utilized.

Once a calendar database and associated timebase have been established, the SGPC can determine which events in the calendar are due for processing, wait until the appropriate time, and then activate/deactivate the SGPC power switch (PS) based on the calendared event definition. This process can be repeated for any number of SGPC-controlled power switches (PS), as for example the use of primary/emergency light switching, etc.

Exemplary Calendar Event Method

Figure 53:
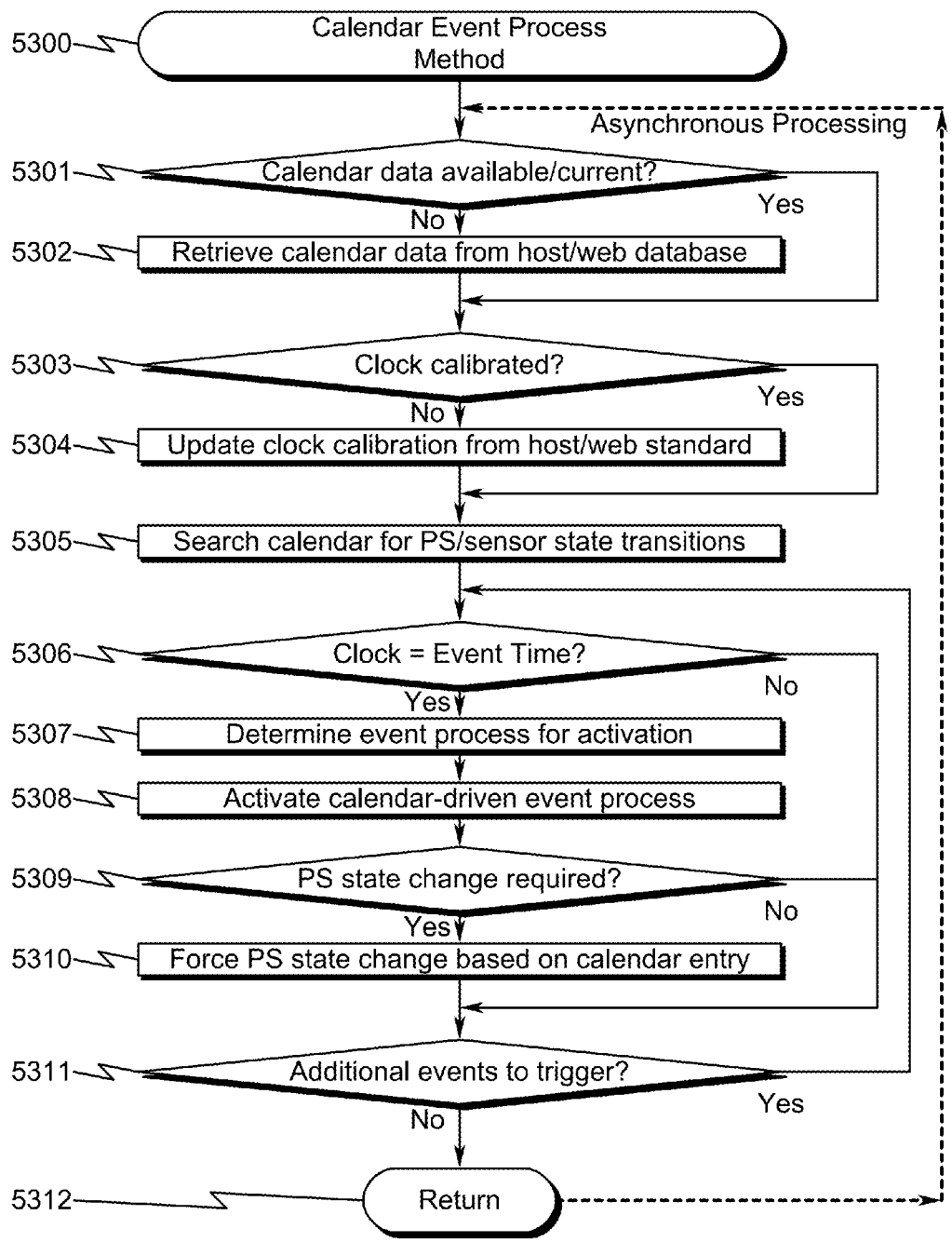
FIG. 53 illustrates a flowchart depicting a preferred exemplary calendar event processing method.

A typical method associated with calendar event processing functionality is generally illustrated in FIG. 53 (5300) and comprises the following steps:
 (1) Determining if the calendar data is available and current, and if so, proceeding to step (3) (5301);
 (2) Retrieving the calendar data from a remote host/web database or allowing this information to be defined within a SGPC-local web page/banner (5302);
 (3) Determining if the local clock timebase is calibrated, and if so, proceeding to step (5) (5303);
 (4) Updating the local SGPC clock timebase from a remote host/web calibration standard (5304);
 (5) Searching the local SGPC calendar data for SGPC power switch (PS) and/or SGPC sensor state transitions (5305);
 (6) Determining if the current SGPC clock is equal to a calendar event time, and if not, proceeding to step (11) (5306);
 (7) Determining the event process for activation that is associated with the current calendar event (5307);
 (8) Activating the calendar-driven event process for execution (5308);
 (9) Determining if a state change is required in a SGPC power switch or SGPC sensor, and if not, proceeding to step (11) (5309);
 (10) Forcing a state change in the selected power switch/sensor based on data in the calendar event entry (5310);
 (11) Determining if there are additional calendar events to trigger that are associated with the current timebase clock value, and if so, proceeding to step (6) (5311); and
 (12) Returning to the calling procedure or proceeding to step (1) based on the type of calendar event processing implemented (synchronous or asynchronous) (5312).

One skilled in the art will recognize that this list of executed processes is only exemplary of the types of status monitoring and switch control that may be accomplished using the present invention teachings.

Background Event Process Method (5400)

Some preferred invention embodiments may incorporate a variety of background processing tasks. These include but are not limited to the following:

- Maintaining network communications connectivity between the SGPC and the Internet.
- Maintaining network communications connectivity between the SGPC and other SGPCs in a meshed network.
- Monitoring power consumed by the consumer load(s) attached to the SGPC.
- Logging power consumption by the consumer load(s) attached to the SGPC to a remote host/web interface (page/banner).
- Monitoring power quality of the line power supplying the SGPC.
- Logging power quality of the line power supplying the SGPC to a remote host/web interface (page/banner).
- Monitoring state transitions in SGPC-connected wall switch and/or sensor(s).
- Logging state transitions in SGPC-connected wall switch and/or sensor(s) to a remote host/web interface (page/banner).
- Passing data collected from the SGPC environment to a remote host in realtime.
- Relaying broadcast messages from adjacent SGPCs to other SGPCs within the mesh network.

One skilled in the art will recognize that this list is not exhaustive and only illustrative of a variety of tasks that may be executed as background processes within the context of the SGPC.

Exemplary Background Event Method

Figure 54:
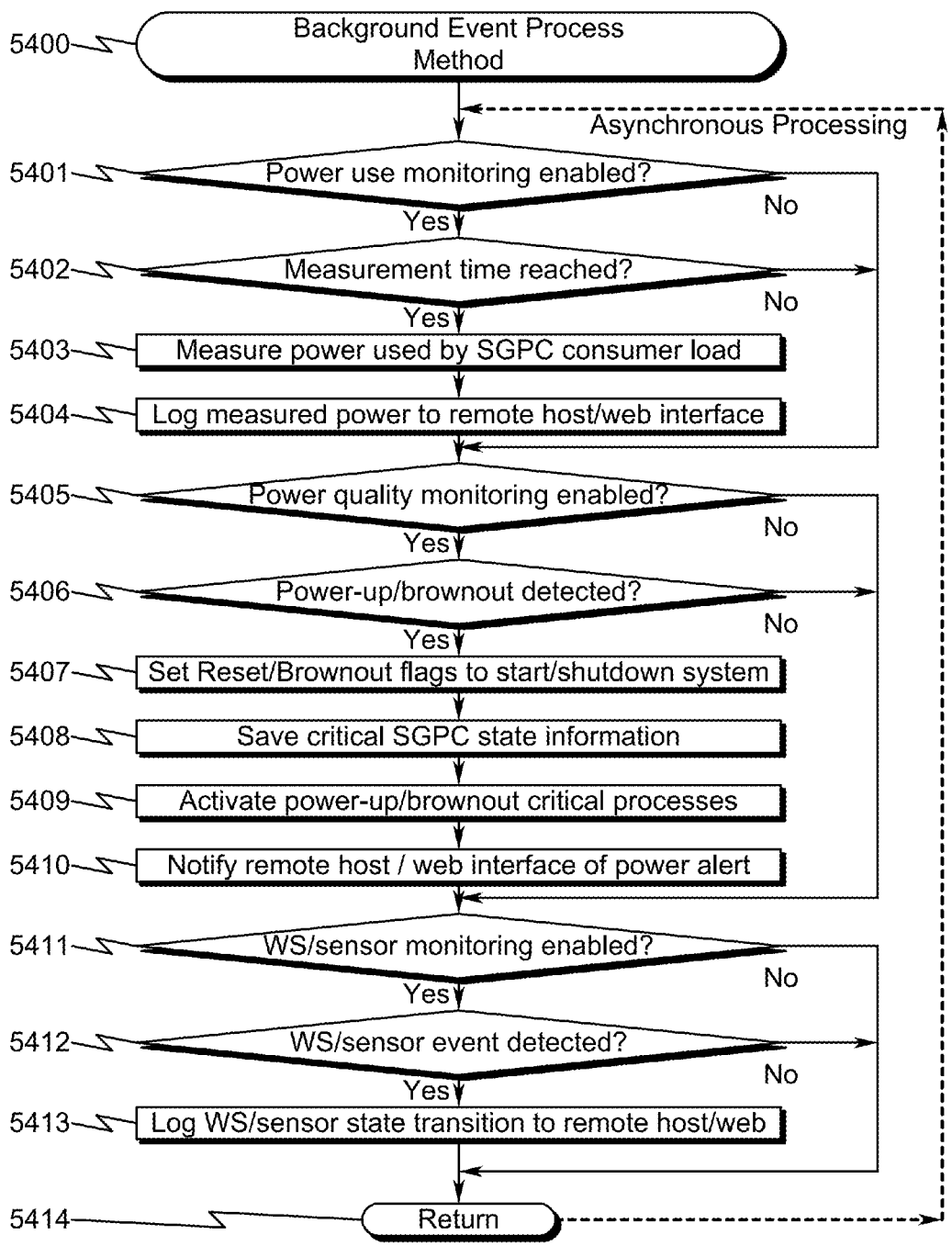
FIG. 54 illustrates a flowchart depicting a preferred exemplary background event processing method.

A typical method associated with background event processing functionality is generally illustrated in FIG. 54 (5400) and comprises the following steps:

(1) Determining if power use monitoring is enabled for the SGPC, and if not, proceeding to step (3) (5401);
(2) Determining if a measurement time has been reached, and if not, proceeding to step (5) (5402);
(3) Measuring the power consumed by the SGPC-attached consumer load (5403);
(4) Logging the power consumed to a remote host/web interface (page/banner) (5404);
(5) Determining if power quality monitoring is enabled, and if not, proceeding to step (11) (5405);
(6) Determining if a power-up or brownout condition has been detected, and if not, proceeding to step (11) (5406);
(7) Setting RESET/BROWNOUT flags within the SGPC to start/shutdown the system and other asynchronous processes (5407);
(8) Activating power-up/brownout critical processes within the SGPC (5408);
(9) Saving critical SGPC state information prior to BROWNOUT shutdown or restoring critical SGPC state information after a RESET condition is detected. (5409);
(10) Notifying a remote host/web interface of a power alert condition (5410);
(11) Determining if wall switch (WS) and/or sensor monitoring is enabled, and if not, proceeding to step (14) (5411);
(12) Determining if a wall switch (WS) and/or sensor monitoring event has occurred, and if not, proceeding to step (14) (5412); and
(13) Logging the wall switch (WS) and/or sensor monitoring event to a remote host/web interface (5413); and
(14) Returning to the calling procedure or proceeding to step (1) based on the type of background event processing implemented (synchronous or asynchronous) (5413).

One skilled in the art will recognize that this list of executed processes is only exemplary of the types of status monitoring and switch control that may be accomplished using the present invention teachings.

Wall Switch State Event Process Method (5500)

Some preferred invention embodiments may incorporate coordination with a wall switch (such as conventional NEMA style toggle switches, push button switches, or the like) to determine whether the power switch associated with the SGPC is activated. While some invention embodiments may use the wall switch as a parallel contactor to the power switch within the SGPC, many preferred invention embodiments may utilize the wall switch as a state input to the SGPC MCU to determine the state of the SGPC power switch consistent with the overall operation of the SGPC within the meshed SGPC network. Within this context, several operational modes are anticipated for the wall switch as detailed below.

Two-Way Switching

Traditional wall switches that are configured in SPST configurations simply switch power to a consumer load and have two states: ON and OFF. The present invention anticipates that this operational mode may be used to force the operation of the SGPC power switch in direct response to the ON/OFF state of the wall switch. This mode will be designated as "2-way switching" and will activate the SGPC power switch unless overridden by a "forced" power switch (PS) state by the SGPC. Thus, while two-way switching allows the consumer to directly impact the state of the SGPC power switch, it can also be overridden by the SGPC in some circumstances.

Three-Way Switching

Conventional wall switches that are configured in SPDT configurations may also provide for "three-way switching-"functionality that permits the state of a consumer load to be toggled based on a state transition of the wall switch. This permits, for example, two wall switches that are located at different locations within a building to independently control the state of a lighting fixture. This feature is useful in situations where a common consumer load (such as an overhead light) to be switched ON/OFF independently by different wall switches (such as in the case of a lighting fixture in a stairwell having wall switches located at the top and bottom of the stairs). Conventional SPST switches can typically implement 3-way switching as well as 4-way switching using conventional mechanical toggle switches and suitable switch wiring interconnects.

The present invention anticipates that three-way switching (and switching orders greater than three) may be implemented by having the wall switch state sampled by the SGPC and then used to toggle the state of the SGPC power switch. Note that multiple SGPCs may cooperate to form a multi-switch network in which each wall switch may independently be sampled and used to toggle the state of one or more SGPC power switches based on the state change of one or more SGPC wall switches. This permits, for example wall switches positioned along a long hallway to be configured to independently toggle the state of lighting fixtures along the hallway or a portion of the hallway.

Exemplary Wall Switch Method

Figure 55:
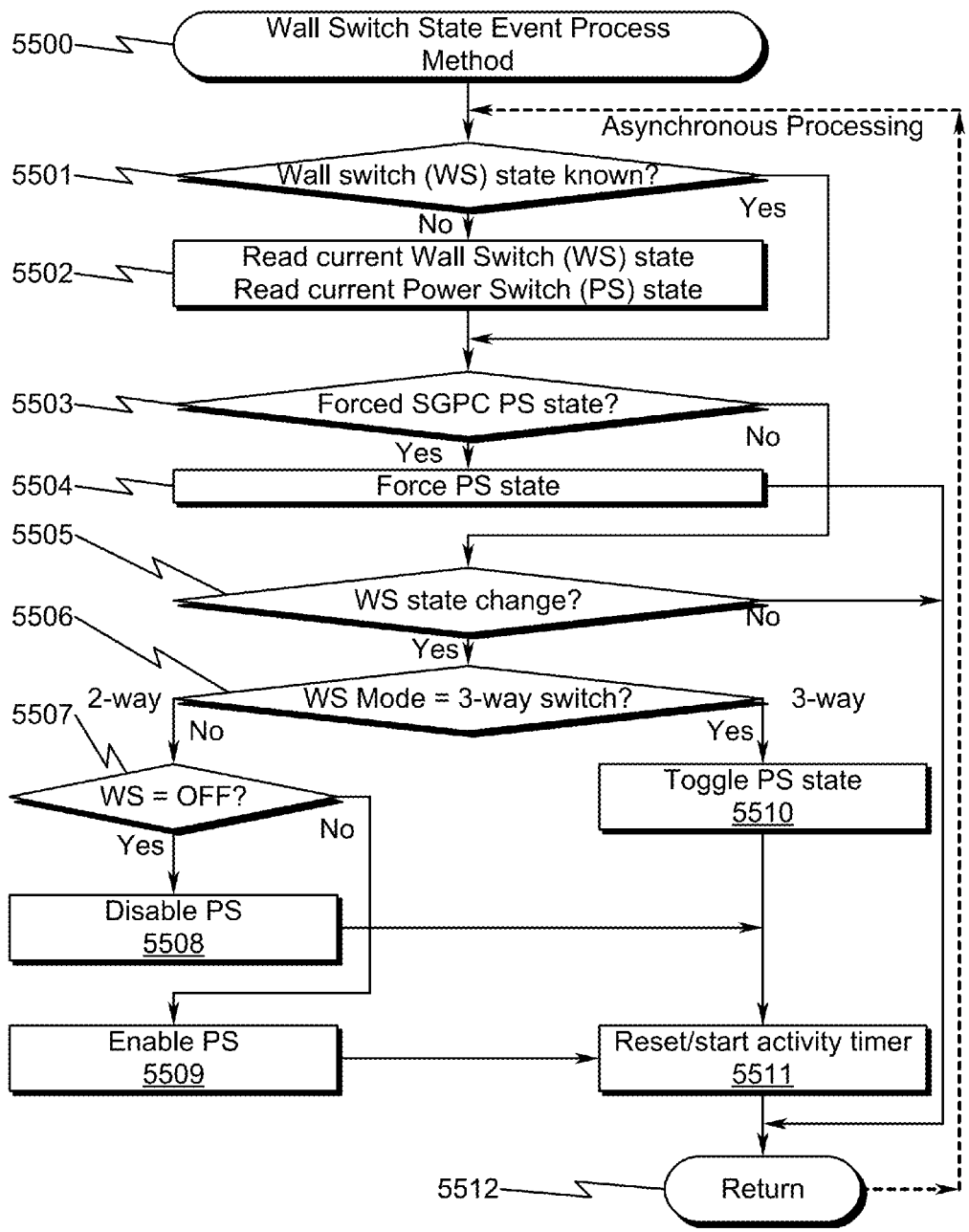
FIG. 55 illustrates a flowchart depicting a preferred exemplary wall switch state event processing method.

A typical method associated with processing wall switch event processing functionality is generally illustrated in FIG. 55 (5500) and comprises the following steps:
(1) Determining if a wall switch (WS) state is known, and if so, proceeding to step (3) (5501);
(2) Reading the current state of the wall switch (WS) and associated SGPC power switch (PS) (5502);
(3) Determining if the state of the SGPC power switch (PS) is forced (overridden) and if not, proceeding to step (5) (5503);
(4) Forcing the state of the power switch (PS) based on SGPC configuration parameters and proceeding to step (12) (5504);
(5) Determining if a wall switch state change has been detected, and if not, proceeding to step (12) (5505);
(6) Determining if the SGPC is operating in three-way wall switching mode, and if so, proceeding to step (10) (5506);
(7) Determining if the wall switch is in the OFF state, and if not, proceeding to step (9) (5507);
(8) Disabling the SGPC power switch (PS) and proceeding to step (11) (5508);
(9) Enabling the SGPC power switch (PS) and proceeding to step (11) (5509);
(10) Toggling the SGPC power switch (PS) state (5510);
(11) Resetting and starting an activity timer (5511); and
(12) Returning to the calling procedure or proceeding to step (1) based on the type of wall switch event processing implemented (synchronous or asynchronous) (5512).

One skilled in the art will recognize that this list of executed processes is only exemplary of the types of status monitoring and switch control that may be accomplished using the present invention teachings.

Motion Event Process Method (5600)

Overview

As generally illustrated in FIG. 49 (4900), the SGPC (4910) may incorporate support for a motion detector (4919) which may incorporate a sensor supporting motion detection or a wide variety of other types of SGPC sensors. While the following discussion concentrates on motion detection, the present invention anticipates and may be easily expanded to incorporate a wide variety of other types of sensor similarly monitored, such as temperature, audio, video, smoke, carbon monoxide, radiation, etc. with no loss of generality in the invention scope.

Motion Detection Methodology

While many different types of motion detection methodologies may be used within the present invention application context, a preferred methodology sets a threshold for motion detection to determine the noise floor for the particular motion sensor, and then compares sensor activity to this baseline activity threshold to determine if a motion event has occurred. Once triggered, a motion detection event can be reported to a remote host and/or logged on a local web page/banner for display/monitoring over the Internet.

Other features possible using the present invention include periodic monitoring of motion sensors that may include audio sampling, video/camera sampling, or the use of other sensors involving temperature, smoke, carbon monoxide, etc. While some of the anticipated sensor types are not strictly associated with motion, they can nonetheless be incorporated into the motion sensor data capture methodology.

Exemplary Motion Event Method

Figure 56:
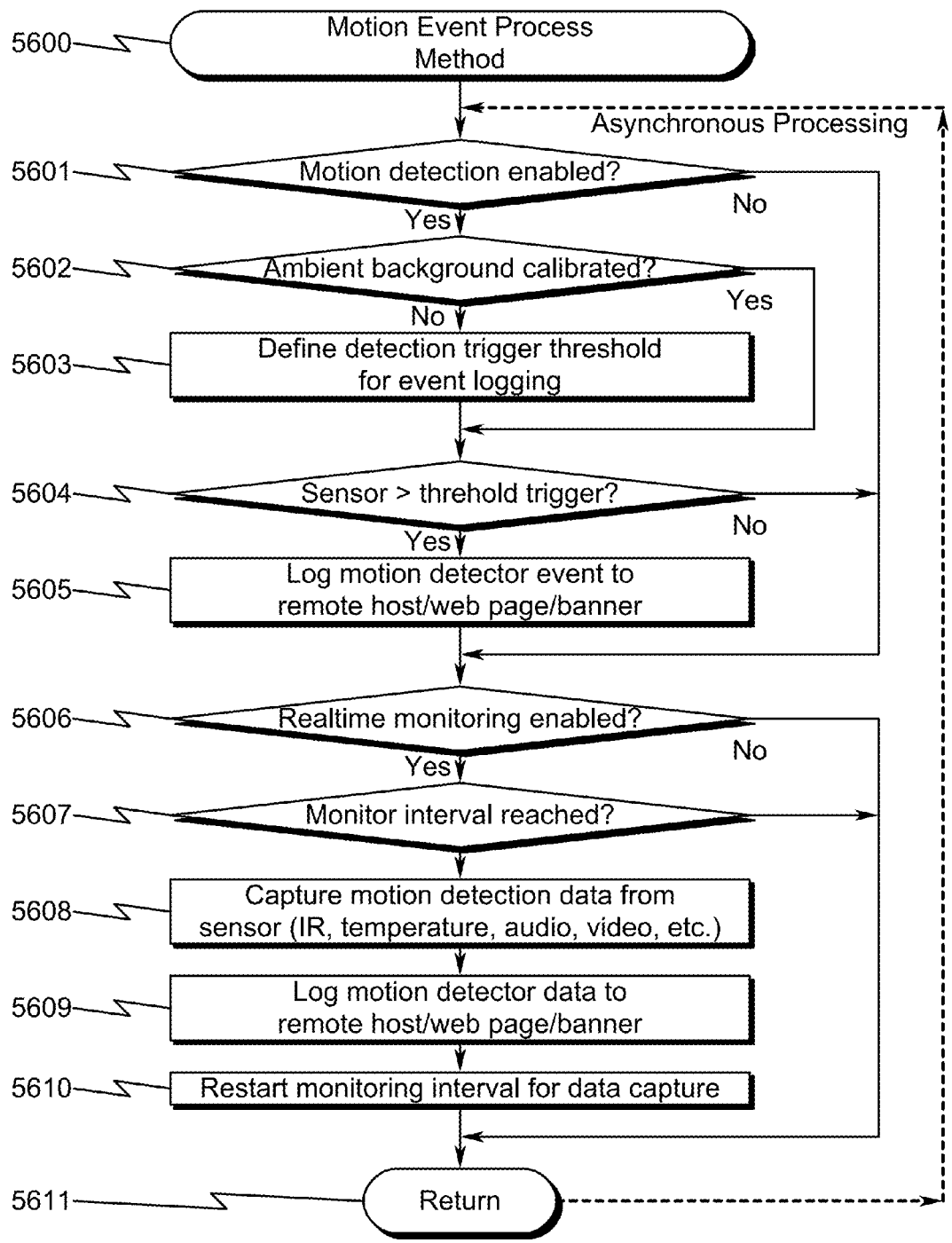
FIG. 56 illustrates a flowchart depicting a preferred exemplary motion event processing method.

A typical method associated with motion event processing functionality is generally illustrated in FIG. 56 (5600) and comprises the following steps:
(1) Determining if motion detection event processing is enabled, and if not, proceeding to step (6) (5601);
(2) Determining if the ambient background sensor value has been calibrated (to determine the noise floor for motion detection), and if so, proceeding to step (4) (5602);
(3) Defining a detection trigger threshold for motion event logging by reading the motion sensor for a period of time or by arbitrarily setting a motion detection threshold (5603);
(4) Determining if the measured motion sensor value exceeds the trigger threshold, and if not, proceeding to step (6) (5604);
(5) Logging the motion detector event to a remote host/web page/banner (5605);
(6) Determining if realtime motion detection monitoring is enabled, and if not, proceeding to step (11) (5606);
(7) Determining if the motion detection monitoring monitor interval has been reached, and if not, proceeding to step (11) (5607);
(8) Capturing motion detection data from the sensor (IR, temperature, audio, video, smoke, carbon monoxide, radiation, etc.) (5608);
(9) Logging the motion detector data to a remote host/web page/banner (5609);
(10) Restarting the monitoring interval timer to set the measurement time for the next sensor data capture (5610);
(11) Returning to the calling procedure or proceeding to step (1) based on the type of motion event processing implemented (synchronous or asynchronous) (5611).

One skilled in the art will recognize that this list of executed processes is only exemplary of the types of status monitoring and switch control that may be accomplished using the present invention teachings.

Power Switch Activation Control Matrix

Associated with many preferred invention embodiments is a power switch activation control matrix (PSACM) that may be used to configure when the power switch is activated within the SGPC. While this control matrix may take many forms, the following discussion details various data and associated capabilities that are anticipated to be incorporated in many preferred variants of this data structure. Of course, one skilled in the art may incorporate other elements in this control structure that are consistent with the overall objectives of the present invention.

Date/Time

This datum indicates a set date/time (or delay time) when the power switch state will be set/reset/switched. Thus, this data might be used to force the power switch to be on during nighttime hours, but only during the weekdays of MON-FRI.

Motion

This datum indicates a processing event associated with detection of motion. This could be activation of the power switch, notification of a remote host of a security event, and/or notification of another SGPC to activate a power switch based on a localized detection of motion in the area.

Wall Switch

This datum indicates a processing event associated with the detection of a state in the wall switch. This might be a standard toggle switch that changes state (from ON-to-OFF or visa-versa) or a transition to a fixed state (ON/OFF). What is done in any of these situations may be programmed to either activate/deactivate/swap the state of the power switch. Additionally, alarm events can be triggered based on any of these states/transitions.

Notify

This datum permits notification of another SGPC in a state change associated with the current SGPC. This could include detection of a switch event, motion activity, brownout, power-fail restart, an increased in monitored power, and/or other activity.

Group

This datum permits grouping of SGPCs so that they operate in unison with respect to power switch ON/OFF functionality. Thus, activation of a power switch in one SGPC automatically results in coordinated operation of the power switches in associated grouped SGPCs.

Relay

This datum permits relaying of sensor information from one SGPC to a terminal host through network routing provided by intermediate SGPCs. This permits (for example) several of the following capabilities:

continuous monitoring of power consumption from a remote location;

continuous video monitoring of activity proximal to a wall/baseboard switch/receptacle plate incorporating a video-enabled SGPC;

continuous audio monitoring of activity proximal to a wall/baseboard switch/receptacle plate incorporating a video-enabled SGPC;

continuous motion sensor monitoring of activity proximal to a wall/baseboard switch/receptacle plate incorporating a video-enabled SGPC; and continuous temperature sensor monitoring of activity proximal to a wall/baseboard switch/receptacle plate incorporating a video-enabled SGPC.

The above constitutes only a small exemplary portion of potential data relaying capabilities possible using the present invention teachings.

Power Distribution Integration (5700)-(8000)

Introduction

The present invention in some preferred embodiments may be applied to a cost-effective retrofit of wall power switches and/or power outlets that may be supervised under remote control from the Internet. This permits retrofitting wall power switches and outlets with remote control capability that is supervised and monitored over the Internet via a mobile device or some other computing device. These wall-enclosed devices are an extension to the Smart Gateway Power Control (SGPC) module described herein and in the Document PCSM.

A SGPC module based wall switch/outlet may typically host one or two AC power relays that consumers can turn on and off from anywhere to connect and disconnect the AC power supply to the electronic devices connected to the wall switches and outlets. In addition, consumers can access the devices to:

see the ON and OFF status of these switches and outlets from anywhere;

read power consumption of the connected electronic devices and thus based on this information know if a TV, light, or other consumer load is actually active among other things;

configure the time and condition based on which the switches and outlets are turned on or off through a smartphone, tablet, or other mobile computing device.

Since these devices may be retrofit into the existing wall boxes with the familiar faceplates and minor cosmetic modifications, they do not introduce any "disruption" or "intrusion" in terms of look and feel. Consumers can manually turn on and off a faceplate switch as usual in addition to the added remote control capability.

General Retrofit Method

The only complication is that the devices must be installed into the standard wall boxes (typically conforming to NEMA standards and referred to as "duplex" or "quad" boxes depending on their sizing). This installation process is no more difficult than replacing wall outlets and switches with the existing off-the-shelf devices and requires only the following steps:

turn off the house power;
open the faceplate;
connect 2 or 3 wires as instructed;
replace the faceplate; and
turn back on the power.

Document PCSM describes the functionality and usage of the SGPC, a wireless remotely controlled switch, and power measurement device. Although some mention of the functionality of the SGPC will be given herein, refer to Document PCSM for additional details. In the present invention application context, the focus will be on retrofitting the SGPC into the wall switches and outlets.

Retrofitting Scope

The scope of this application is the retrofitting of American wall power plug and receptacle in general compliance with ANSI/NEMA WD 6-2002 or equivalent standards.

The following discussion will first address retrofitting of a wall power switch (WPS) and then the retrofitting of a wall power outlet (WPO).

Retrofitting Wall Power Switch with a SGPC (5700)

Figure 57:
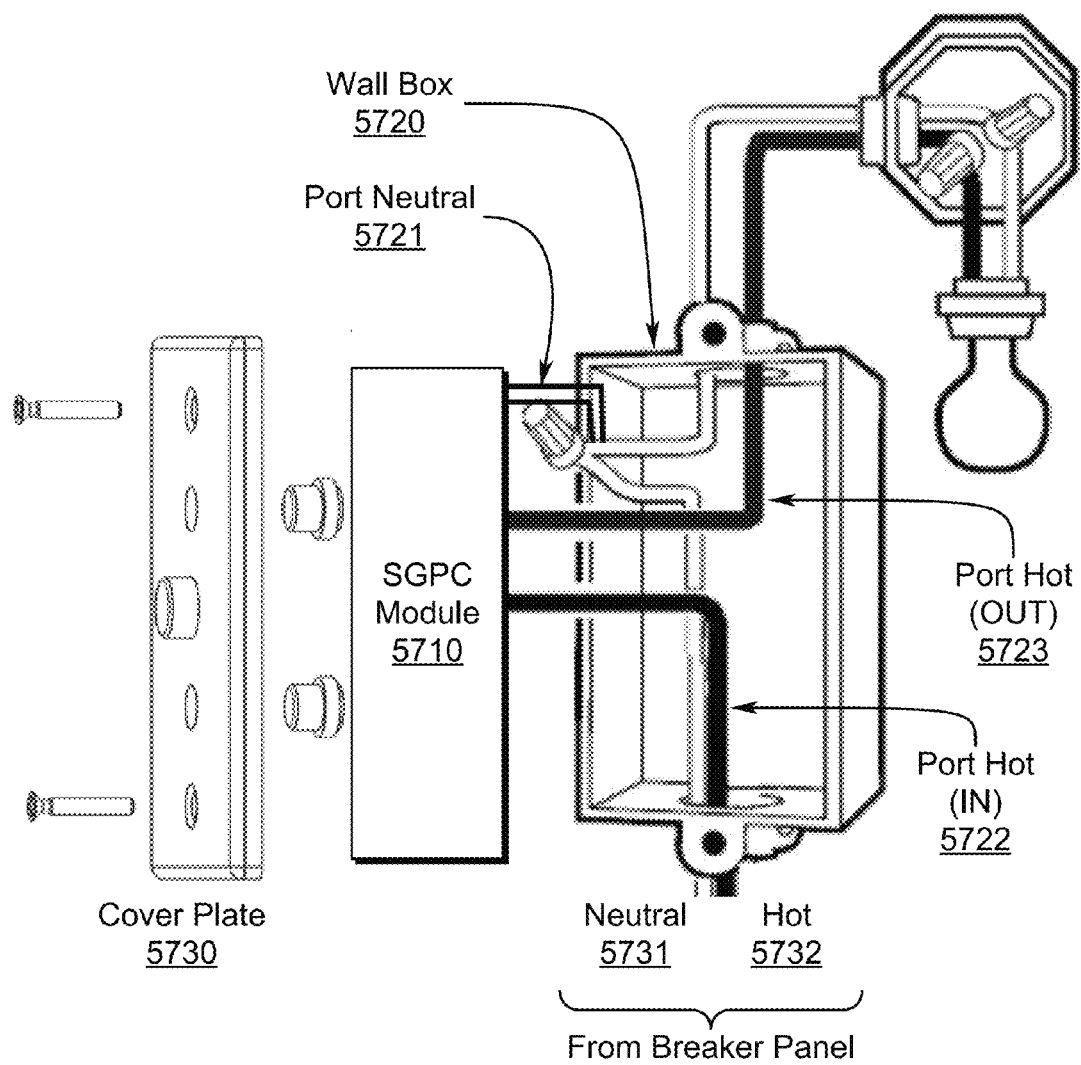
FIG. 57 illustrates an exemplary wiring diagram for a SGPC module installed within traditional wall electrical boxes.

FIG. 57 (5700) generally illustrates that a retrofit switch may embed a SGPC module (5710) between the power wall outlet (5720) and the faceplate (5730). It is housed in a standard wall receptacle box (5720) (a "duplex" receptacle box as illustrated here). The HOT wire from AC power source is connected to the SGPC module at PORT HOT (IN) (5722), and the NEUTRAL wire connected to the module at PORT NEUTRAL (5721) as well as to the neutral wire leading to the light bulb socket. The PORT HOT (OUT) (5723) comes out of SGPC module (5710) and leads to the HOT wire of the light bulb socket. The PORT HOT (IN) (5722) and PORT HOT (OUT) (5723) wires are connected by a power relay inside the SGPC module (5710). The relay is turned ON and OFF by the microcontroller (MCU) in the SGPC, thus connecting and disconnecting the HOT wire from the AC power source to the light bulb socket. A GROUND wire is also sourced from the power distribution source (breaker panel) and leads to the light socket but is not illustrated in FIG. 57 (5700).

SGPC Configuration for Wall Installation (5800)

Figure 58:
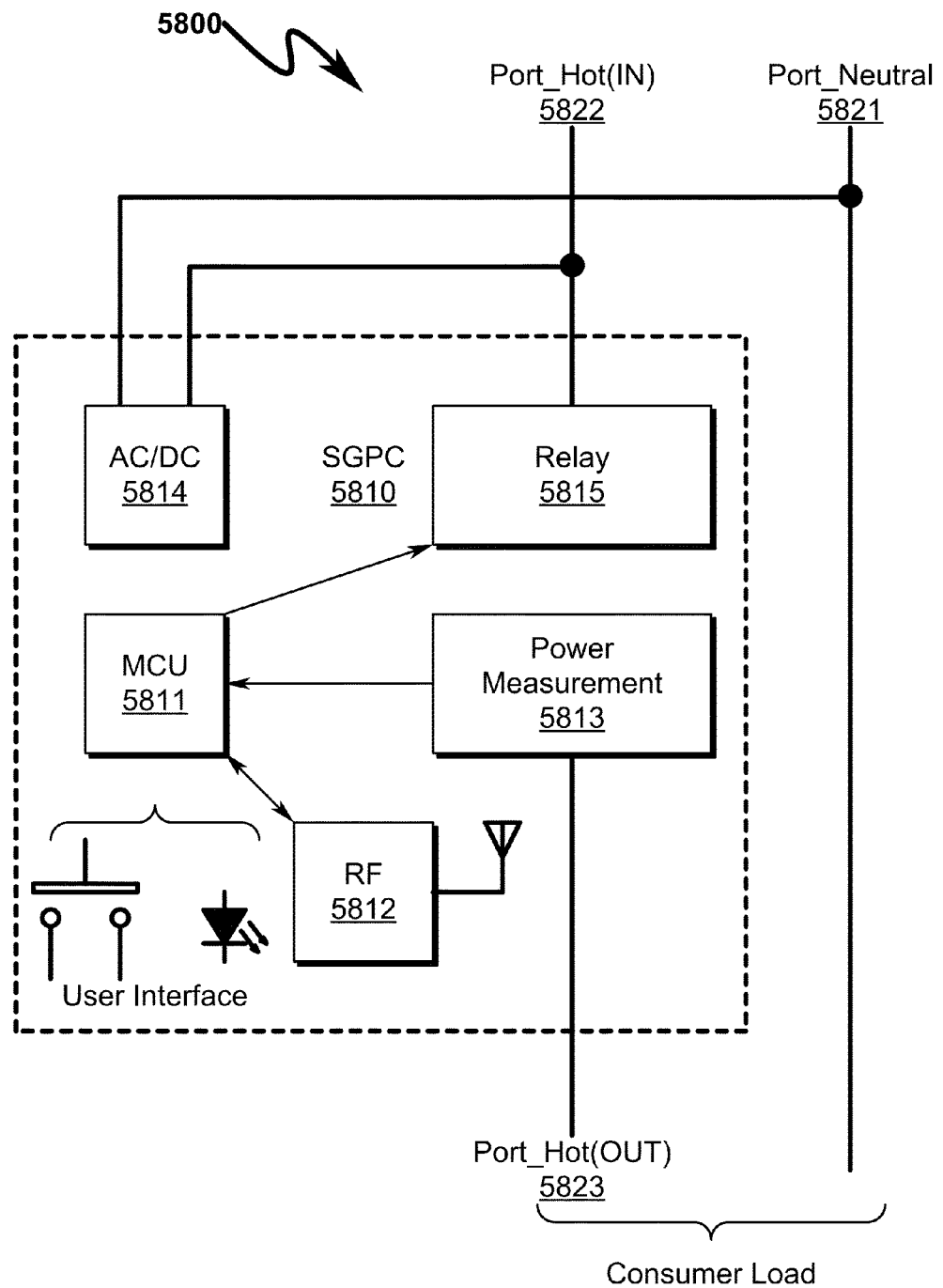
FIG. 58 illustrates a preferred exemplary system block diagram for a SGPC module as applied to power distribution within a building wiring application.

A typical SGPC module (5810) is described in detail in Document PCSM. As shown in FIG. 58 (5800), it contains a microcontroller (5811), a wireless module (WiFi, ZIGBEE®, for example) (5812) and a power measurement unit (5813). The Port_Hot (IN) (5822) and Port_Neutral (5821) wires also supply the power for the SGPC module (5810) via an AC/DC converter (5813).

The SGPC module first converts the input AC voltage at 110 or 220ACV to a DC voltage, then the DC regulator regulates (5814) to lower DC voltages and distributed to each individual function unit as illustrated in FIG. 58 (5800). In this case, the wireless module (5812) requires +3.3V to 5VDC voltage and the power relay switch runs at 5-12V DC. The power relay (5815) in the SGPC module (5810) is a key element for this application and is a retrofit of the traditional mechanical switch. It is controlled by the microcontroller (5811) through the wireless communication (5812). The power relay (5815) connects internally from the input port named Port_Hot (IN) (5822) at the module, and carries on the connection to the HOT wire via the output port named Port_Hot (OUT) (5823). A power measurement unit (5813) measures the AC path, and the digital measurement values are taken by the microcontroller.

Exemplary Faceplate Configurations (5900)-(6400)

It should be noted that the sizes of wall plates, the positions of the screw holes, the size of the plugs and receptacles discussed in this document typically comply with standard ANSI/NEMA WD 6-2002. For example, the American main plug and receptacle referred to in this document comply with NEMA 5-15. Rather than specifically referring to that standard, this document will reference the use of off-the-shelf conforming components as references in our discussion.

Figure 59:
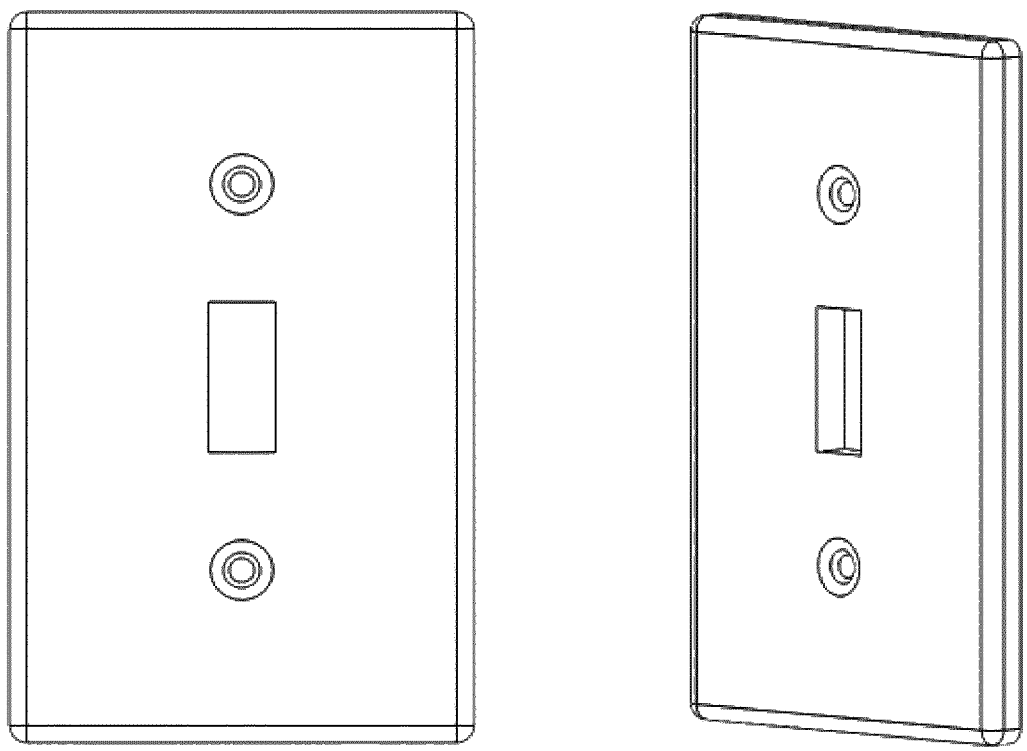
FIG. 59 illustrates front/perspective views of a preferred exemplary duplex wall switch faceplate with rectangular cutout for toggle/pushbutton switch activation of the SGPC module.
Figure 60:
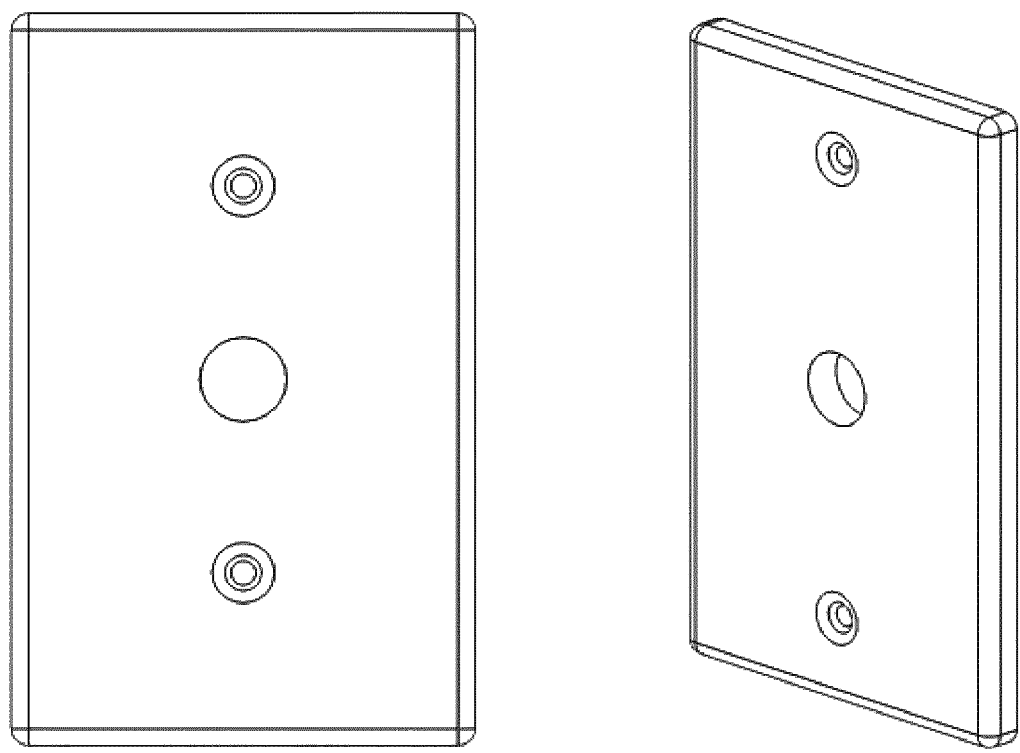
FIG. 60 illustrates front/perspective views of a preferred exemplary duplex wall switch faceplate with circular cutout for toggle/pushbutton switch activation of the SGPC module.
Figure 62:
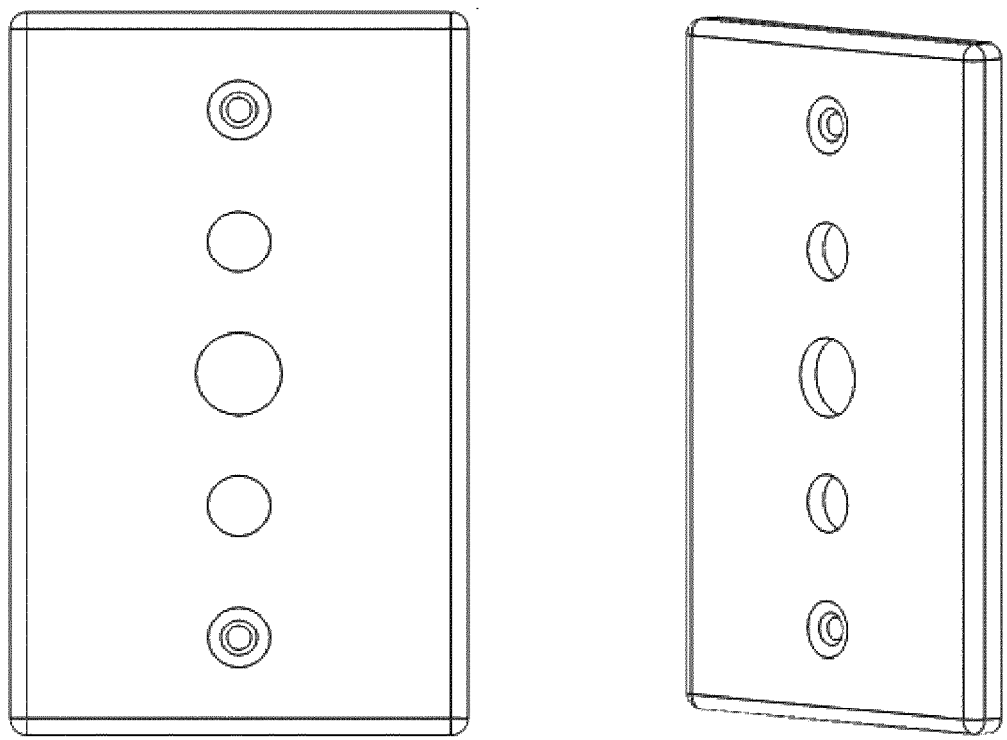
FIG. 62 illustrates front/perspective views of a preferred exemplary duplex wall switch faceplate with circular cutouts for toggle/pushbutton switch activation of the SGPC module and LED indicators.

The screw holes at the board edge of the SGPC module allow mounting the screws on to both wall outlet and the faceplate. The location of screw holes on module board should be matched to those on an off-the-shelf wall switch and faceplate as generally shown in FIG. 59 (5900)—FIG. 62 (6200).

Figure 61:
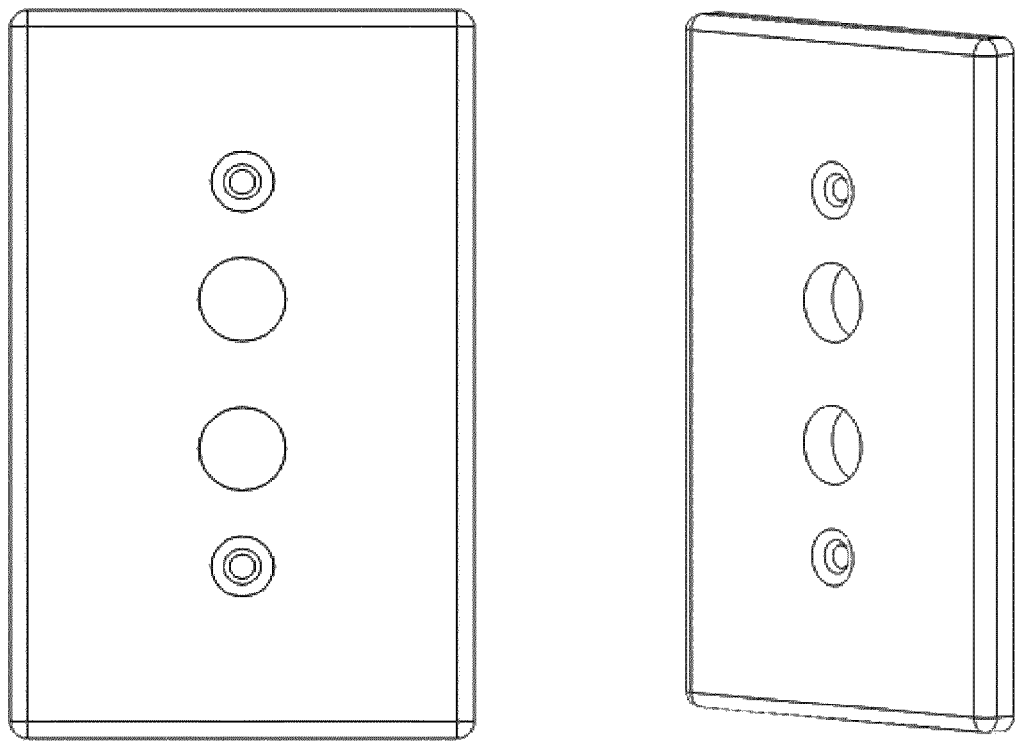
FIG. 61 illustrates front/perspective views of a preferred exemplary duplex wall switch faceplate with circular cutouts for toggle/pushbutton switch activation of the SGPC module and LED indicators.

A push button may be installed on the SGPC PCB module board through the center aperture of the faceplate. It can have the rectangular or round shape to fit the hole of the faceplate covers (5900, 6000, 6100, 6200) as generally illustrated in FIG. 59 (5900)—FIG. 62 (6200). This manual switching feature allows consumers switch manually as well as remotely control the switching through the smart phone and phone. The push button produces a 3.3V or 4V pulse on a pin of the microcontroller, which triggers the switch of the power relay. A LED light indicating the status of the switch (ON or OFF) may be provided as a back light behind the push button (the push button is light up (red or green) when the switch is on, and becomes dark when the switch is off) or may be provided using separate LED apertures as illustrated in variations of the faceplate configurations in FIG. 61 (6100)—FIG. 61 (6200).

The present invention also anticipates the use of SGPC power distribution management modules in the context of "duplex" or multi-gang electrical boxes as typified by the wall plate examples provided in FIG. 63 (6300) and FIG. 64 (6400). FIG. 63 (6300) illustrates the use of the system configured with a conventional duplex power receptacle and a rectangular switch cutout that might support a toggle switch, pushbutton switch (with optional indicator), or sensor (motion, audio, video, etc.). In FIG. 64 (6400), a traditional QUAD box faceplate is configured with a conventional duplex power receptacle and two cutouts to support pushbutton switches and/or indicators and/or sensors. These configurations may be utilized both at chest-level as well as at knee-level as a standard power receptacle incorporating additional indicators and/or sensors as determined on installation.

Exemplary Pushbutton SGPC Wall Switch Embodiment (6500)-(6900)

Figure 65:
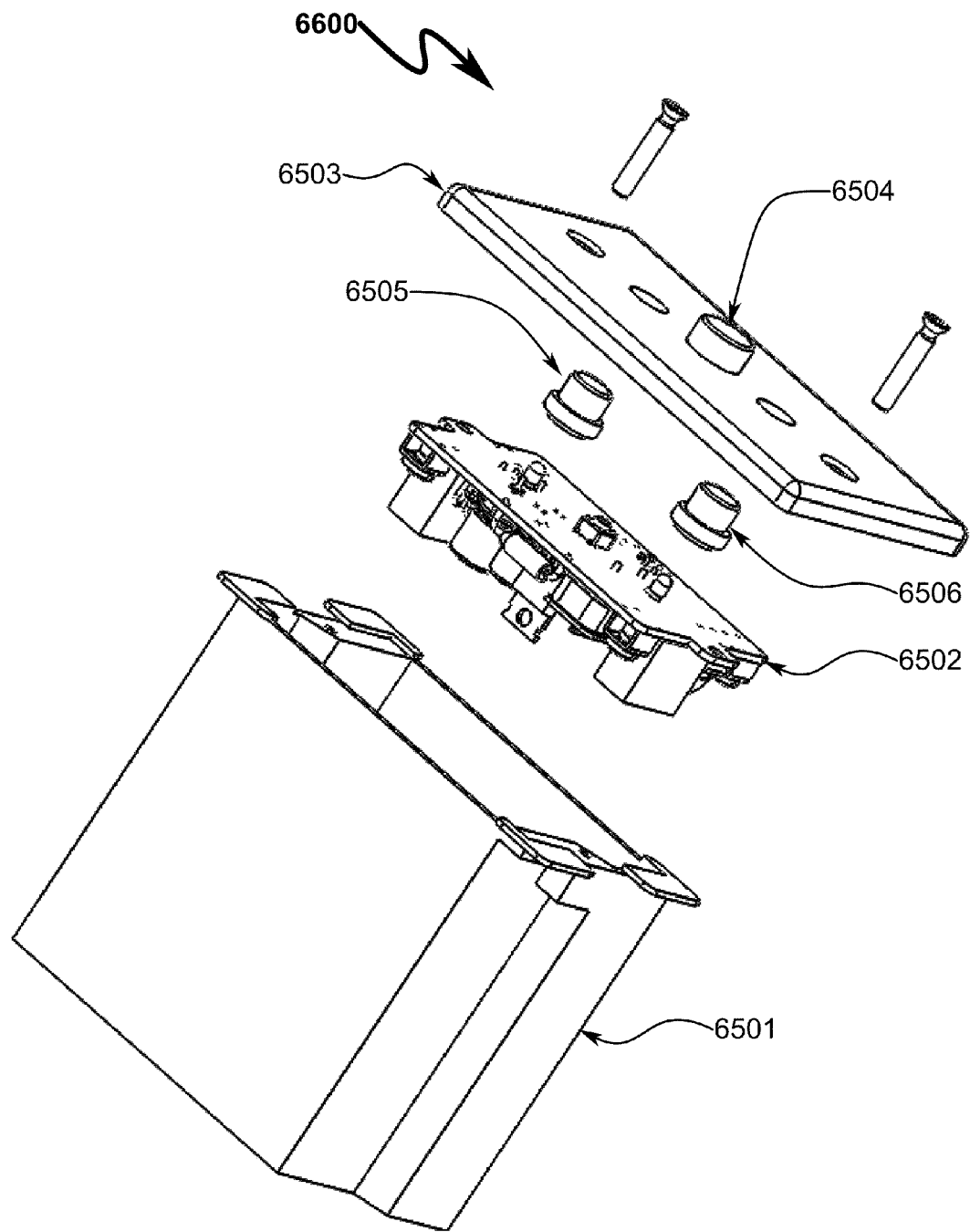
FIG. 65 illustrates a side perspective assembly view of a preferred exemplary pushbutton wall switch implementation of a SGPC power distribution system.
Figure 66:
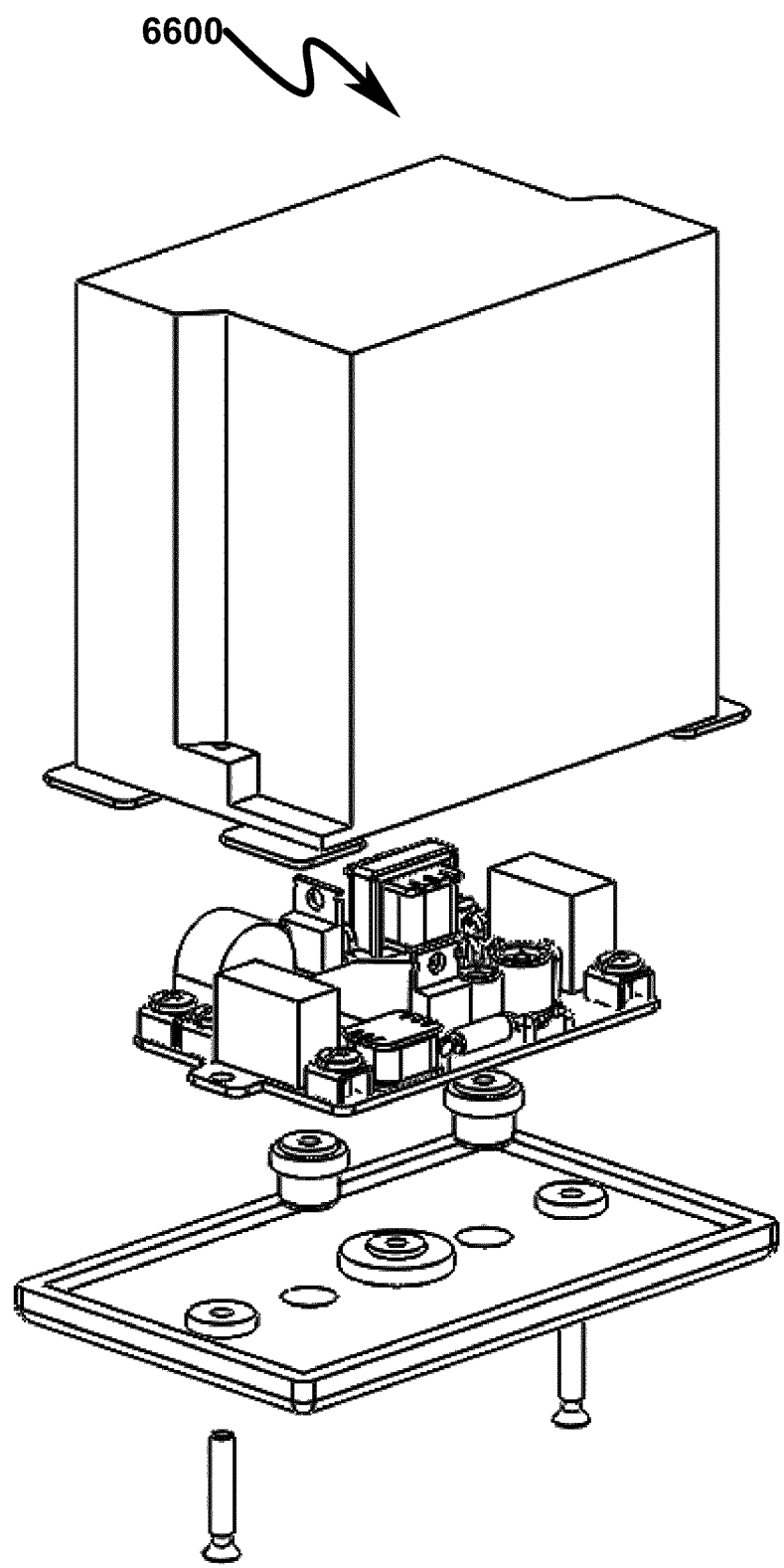
FIG. 66 illustrates a side perspective assembly view of a preferred exemplary pushbutton wall switch implementation of a SGPC power distribution system.

An exemplary SGPC power distribution system using a pushbutton wall switch is generally illustrated in FIG. 65 (6500)—FIG. 66 (6600), and illustrates an exemplary rectangular cuboid electrical box (6501) in which the SGPC module (6502) is placed. This particular embodiment illustrates the wall plate (6503) configured with a pushbutton (6504) and two LED indicators with translucent bezels (6505, 6506) to permit indication of the system state to the user. Other variations of this configuration may utilize sensors within the translucent bezels (6505, 6506) to perform a variety of localized sensor functions (motion, audio, video, etc.) as discussed herein.

Figure 67:
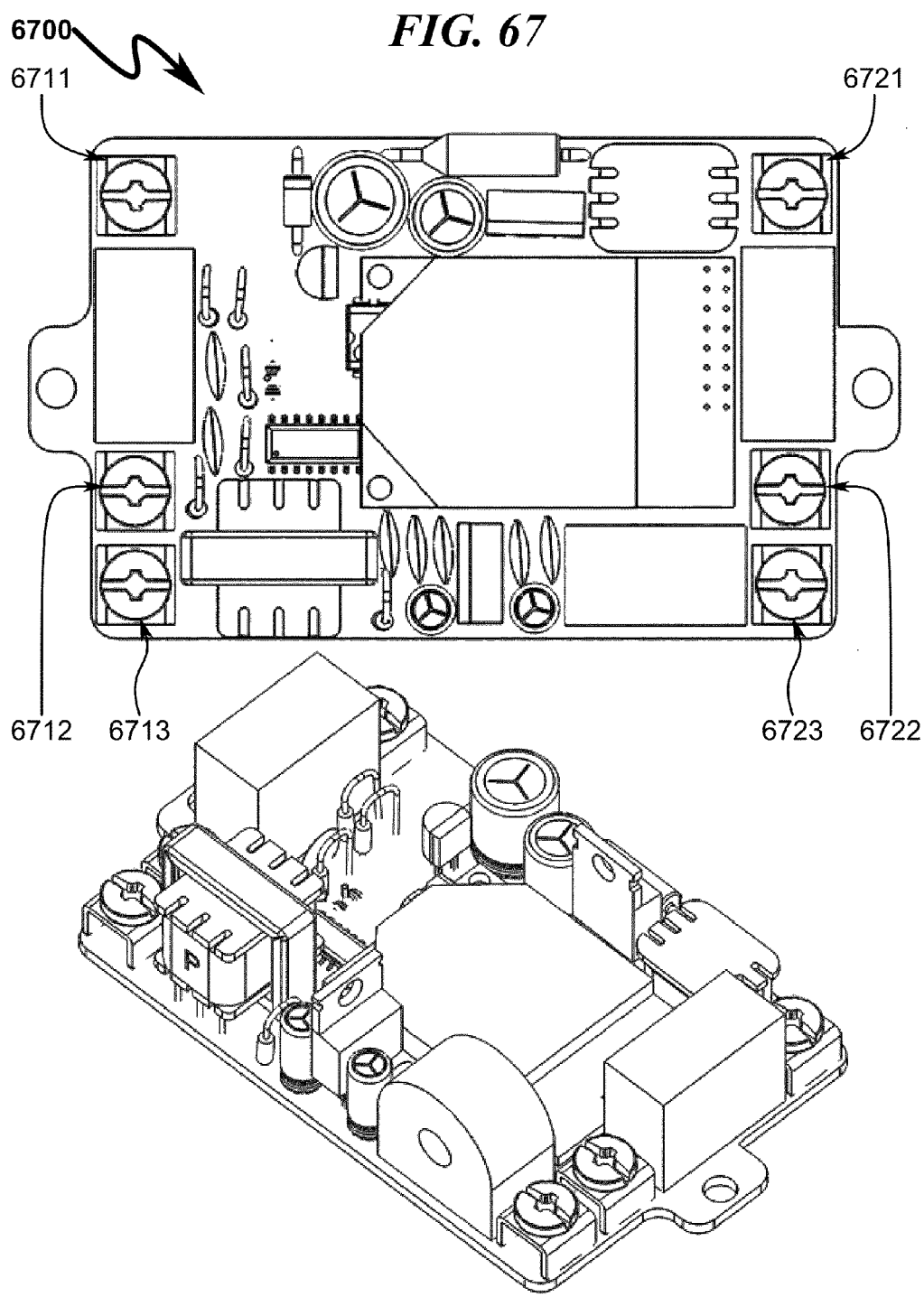
FIG. 67 illustrates top and perspective views of a preferred exemplary SGPC PCB module implementation (with wireless module installed) that may be suitable for use in a duplex wall electrical box application.
Figure 68:
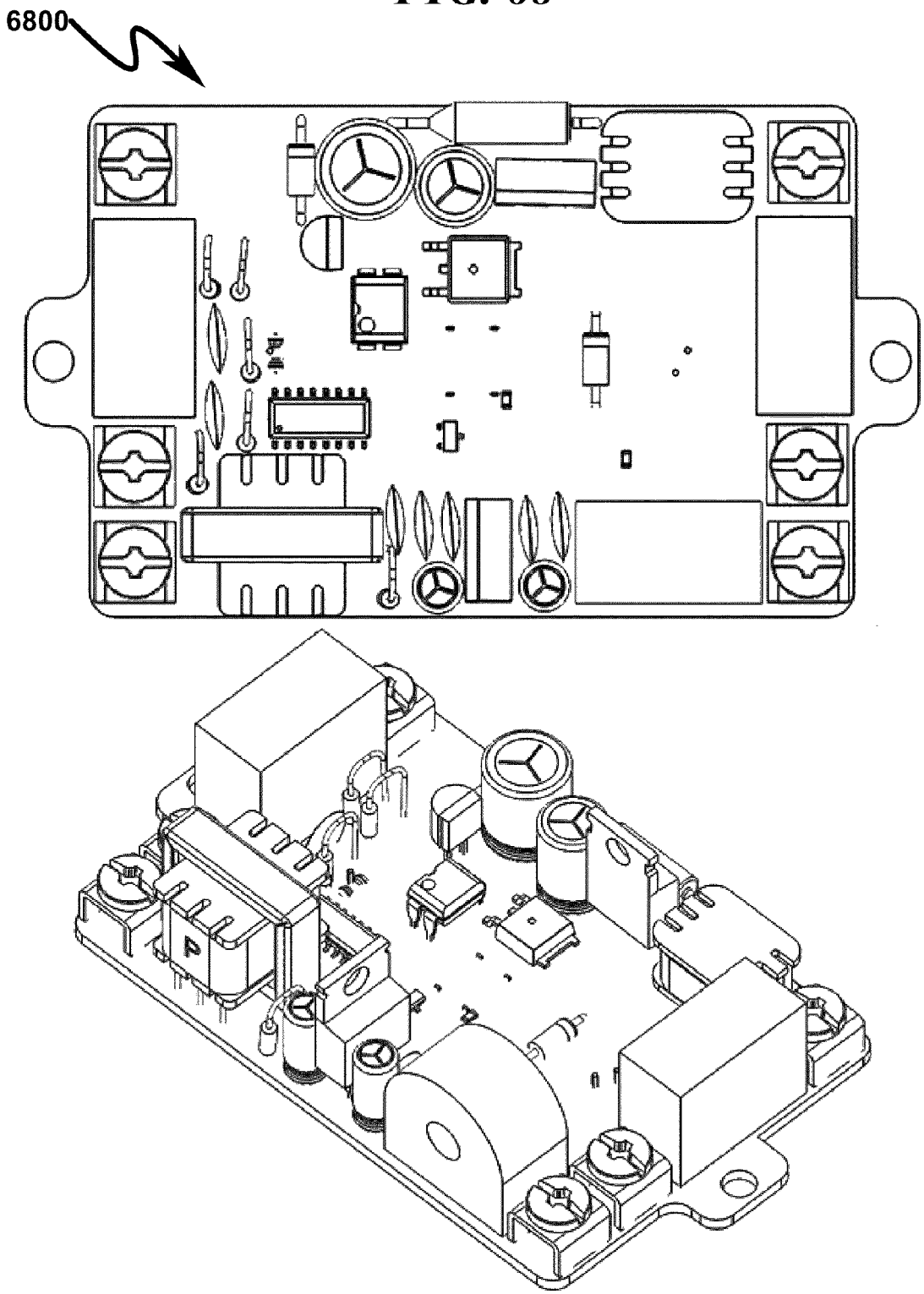
FIG. 68 illustrates top and perspective views of a preferred exemplary SGPC PCB module implementation (without wireless module installed) that may be suitable for use in a duplex wall electrical box application.

FIG. 67 (6700) and FIG. 68 (6800) illustrate top and perspective views of an exemplary SGPC PCB module suitable for use in these pushbutton applications. Note that the use of screw terminals (6711, 6712, 6713, 6721, 6722, 6723) permit easy accommodation of incoming breaker panel power (GROUND, NEUTRAL, HOT) as well as outgoing wiring connections to other daisy-chained consumer loads (GROUND, NEUTRAL, HOT). This reduces or eliminates the use of twist-lock connections within the wall electrical box thus minimizing consumed volume as well as simplifying wiring of the overall system. FIG. 69 (6900) illustrates bottom and perspective views of the SGPC PCB detailing the presence of the pushbutton switch and dual LED indicators implemented in this preferred embodiment.

Exemplary Toggle Switch SGPC Wall Switch Embodiment (7000)-(7300)

Figure 70:
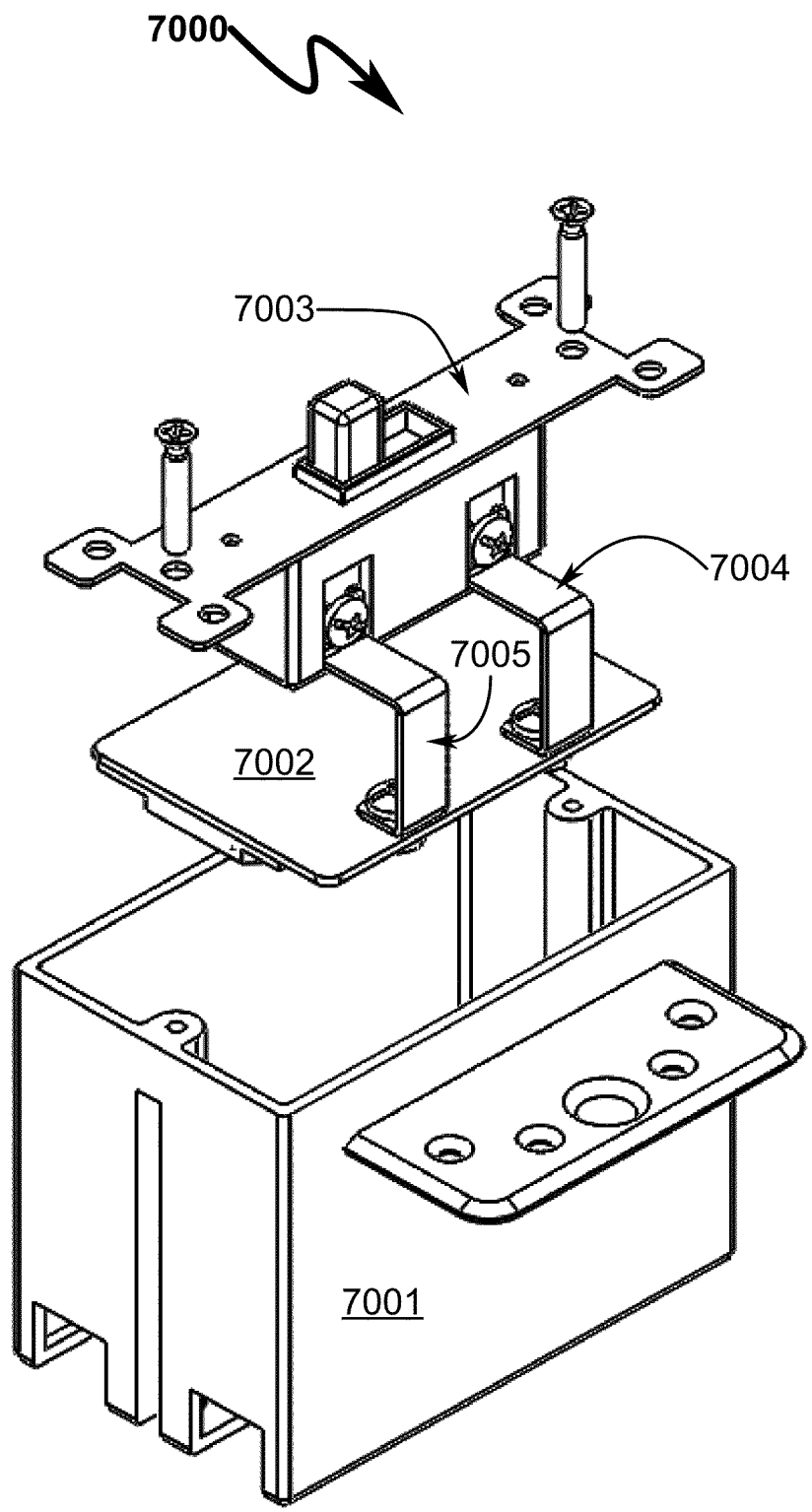
FIG. 70 illustrates a perspective view of a preferred exemplary SGPC PCB module implementation (that may be suitable for use in a toggle switch wall electrical box application.
Figure 71:
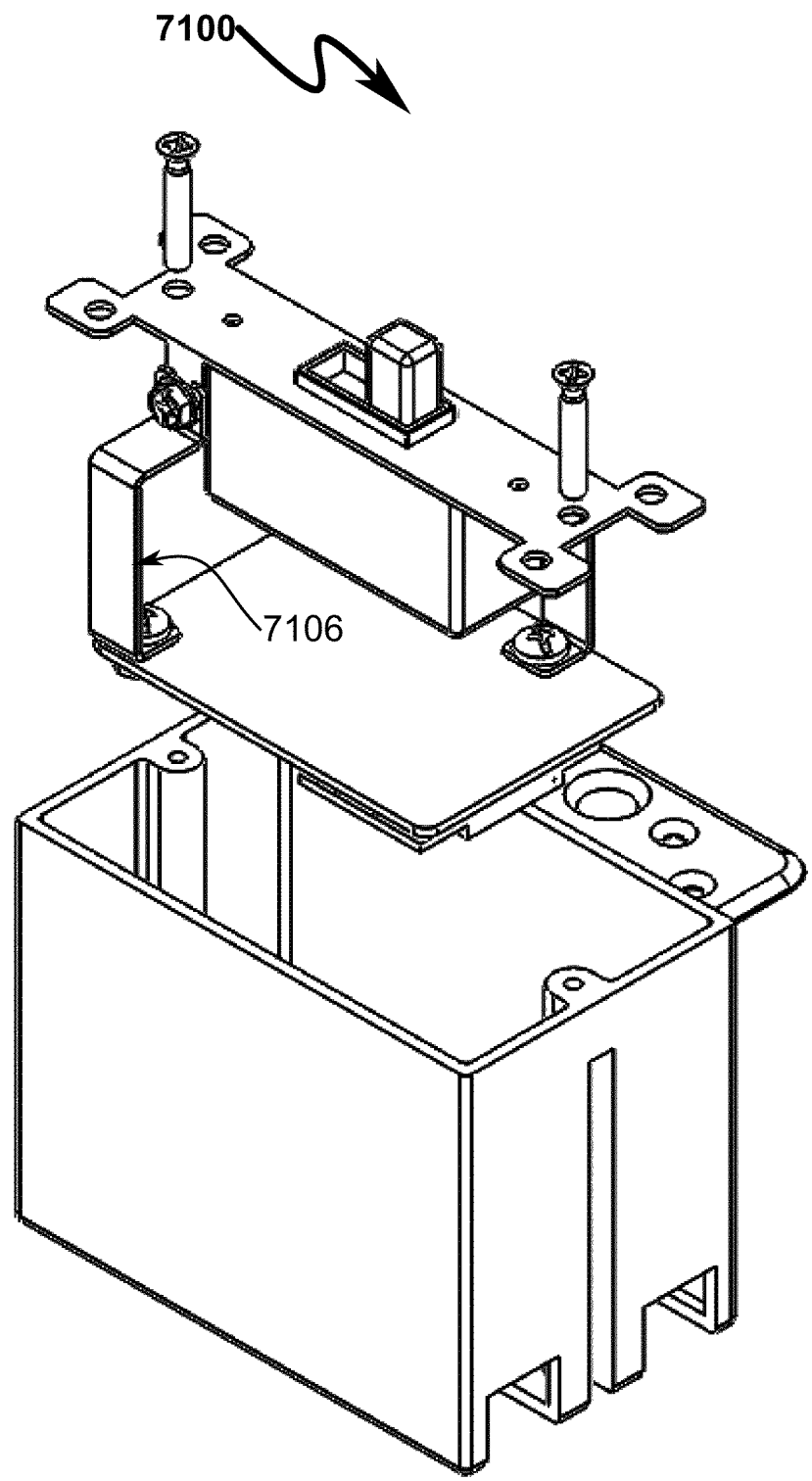
FIG. 71 illustrates a perspective view of a preferred exemplary SGPC PCB module implementation (that may be suitable for use in a toggle switch wall electrical box application.
Figure 72:
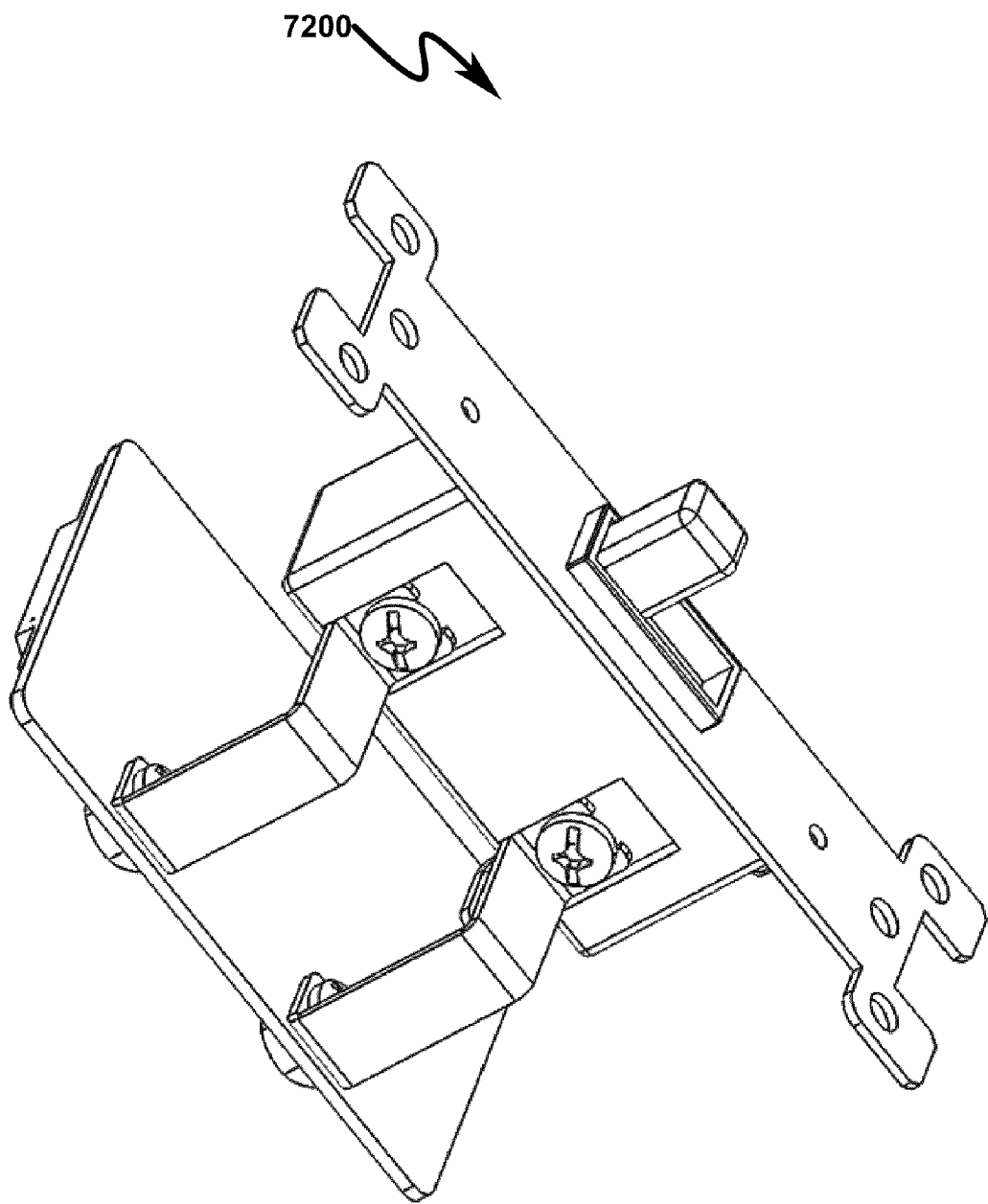
FIG. 72 illustrates a perspective view of a preferred exemplary SGPC PCB module implementation (that may be suitable for use in a toggle switch wall electrical box application.
Figure 73:
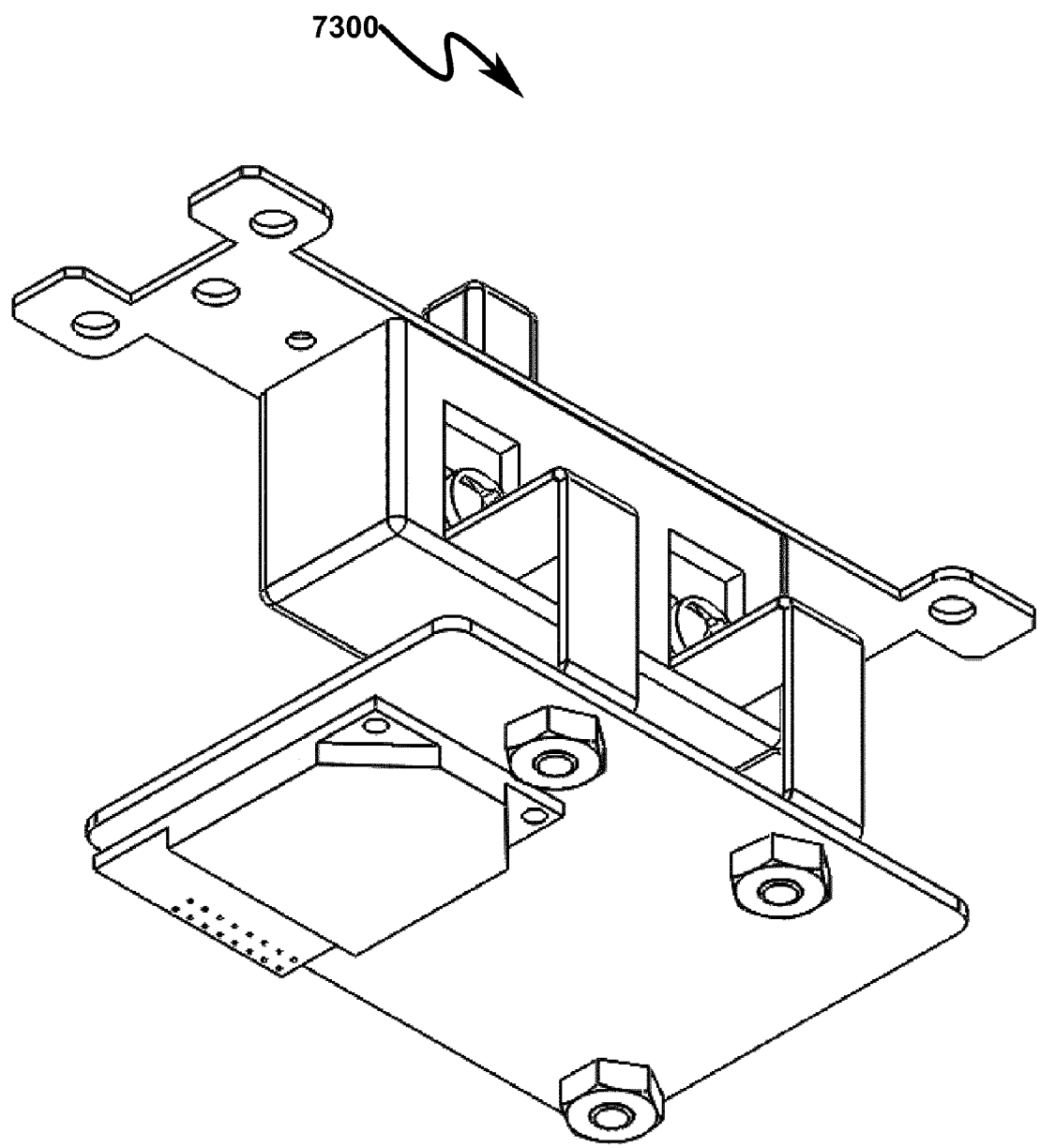
FIG. 73 illustrates a bottom perspective view of a preferred exemplary SGPC PCB module implementation (that may be suitable for use in a toggle switch wall electrical box application.

An exemplary SGPC power distribution system using a conventional toggle wall switch is generally illustrated in FIG. 70 (7000)-FIG. 73 (7300), and illustrates an exemplary rectangular cuboid electrical box (7001) in which the SGPC PCB module (7002) is placed. This particular embodiment illustrates the toggle switch (7003) configured with mounting straps (7004, 7005, 7106) to permit support of the SGPC PCB within the electrical box cuboid enclosure. Note that this configuration permits the SGPC module (7002) to be populated on both sides of the PCB (as generally illustrated in FIG. 73 (7300)) while being securely supported by the toggle switch (7003) within the electrical wall box enclosure (7001). The general illustrations provided in FIG. 70 (7000)-FIG. 73 (7300) do not include a populated SGPC PCB module, as the components have been omitted (with the exception of the wireless communication module as depicted in FIG. 73 (7300)) to clarify the mounting relationship between the PCB and the toggle switch. While traditional screw fasteners have been used to attach the SGPC PCB to the mounting straps (7004, 7005, 7106), one skilled in the art will recognize that these straps may be soldered, riveted, or otherwise fastened to the SGPC in a number of equivalent ways.

Wireless Communication

The micro-controller can communicate with users remotely through the wireless module. For example, the wireless module can be a WiFi module or a ZIGBEE® module. Through the wireless communication, the users can do the following using a communication device such as a laptop, a tablet or a smart phone:

Turn on and off the power relays remotely from anywhere;
  Schedule the power relays to turn on and off at a future time from anywhere; and
  Read the power consumption of the electronic devices plugged into the receptacle.

Document PCSM discusses in detail how the above functionality is achieved and is not necessarily repeated herein. All functionality of the SGPC as described in Document PCSM applies to this retrofitting device.

Retrofitting Existing Duplex Wall Outlet with a SGPC (7400)-(7600)

Figure 76:
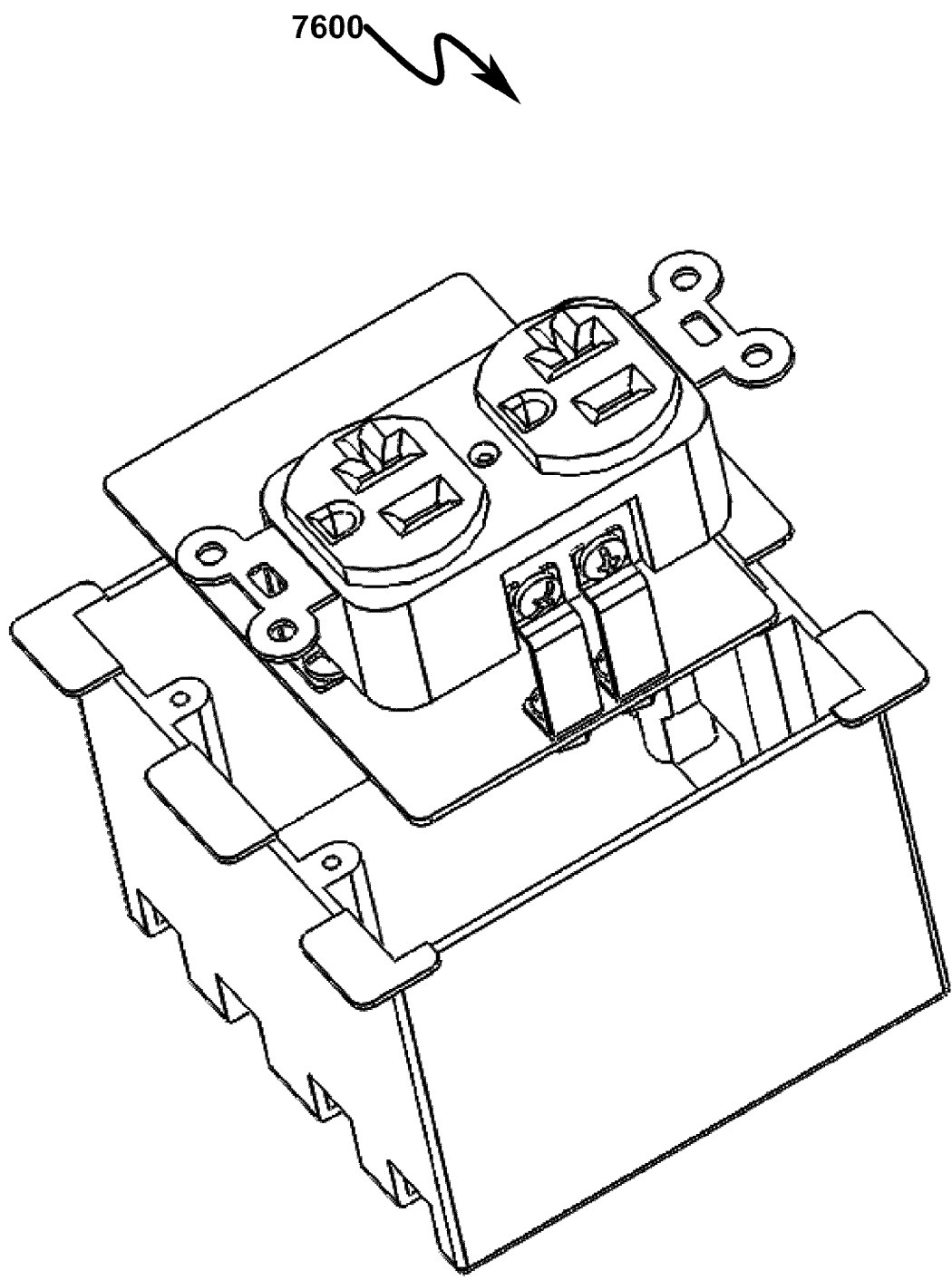
FIG. 76 illustrates a perspective view of a preferred exemplary SGPC PCB module implementation (that may be suitable for use in a quad box duplex receptacle wall electrical box application.

The following narrative describes retrofitting a remotely controlled power outlet such that users can remotely turn ON and OFF the power receptacle outlet. As generally illustrated in FIG. 74 (7400)-FIG. 76 (7600), a typical duplex electrical wall power outlet comprises two 3-prong receptacles.

Figure 74:
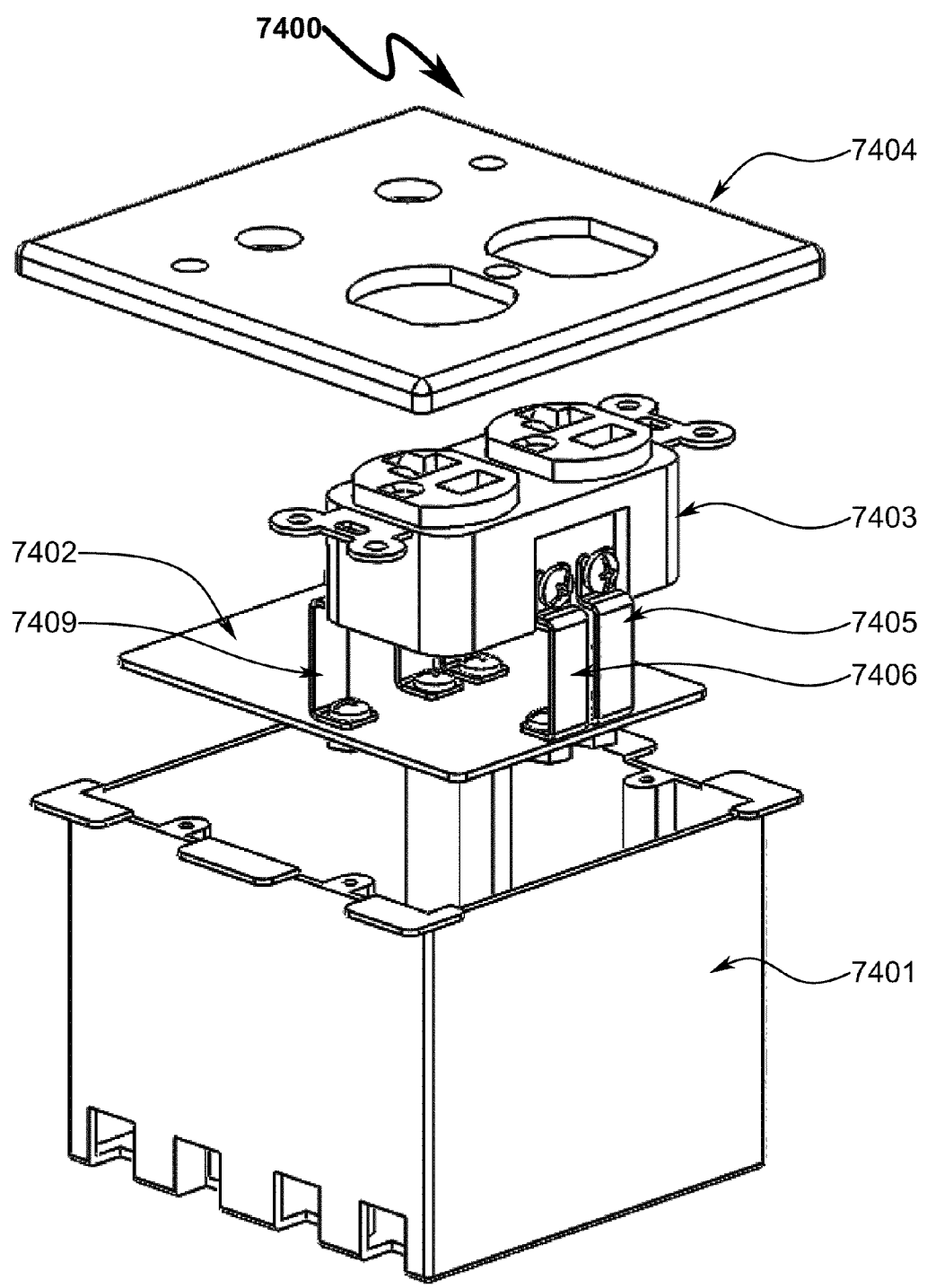
FIG. 74 illustrates a perspective view of a preferred exemplary SGPC PCB module implementation (that may be suitable for use in a quad box duplex receptacle wall electrical box application.
Figure 75:
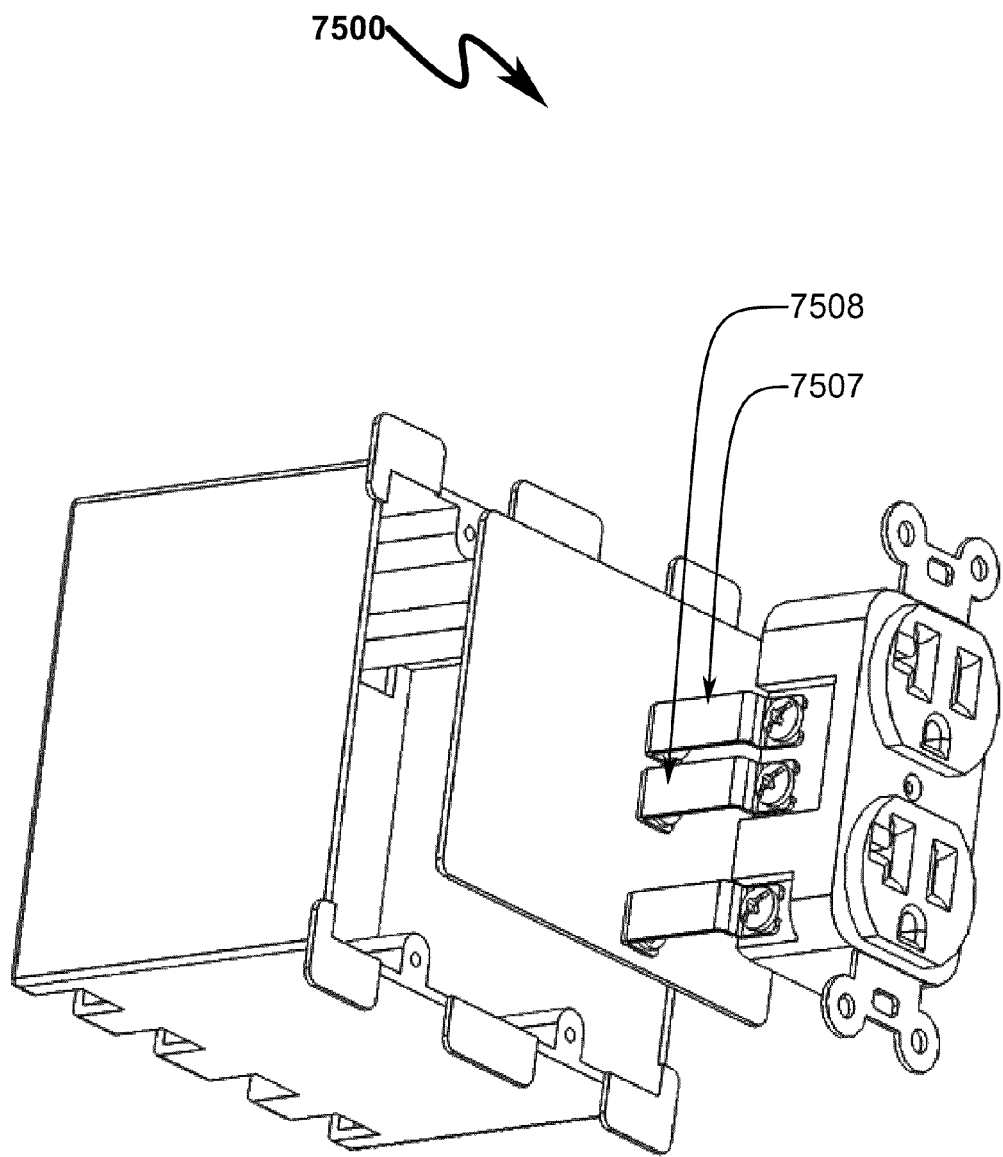
FIG. 75 illustrates a perspective view of a preferred exemplary SGPC PCB module implementation (that may be suitable for use in a quad box duplex receptacle wall electrical box application.

Referencing FIG. 74 (7400) in which a quad box (7401) is retrofitted with a SGPC module (7402) supporting a single duplex receptacle (7403) covered by a faceplate (7404), the duplex receptacle may be used to support the SGPC module (7402) via the use of mounting straps (7405, 7406, 7507, 7508, 7409). Generally in this configuration after removing the faceplate (7404), there are three wires shared by the two power receptacles: HOT, NEUTRAL, and GROUND. These connections are routed with the mounting straps to the HOT (7405, 7406), NEUTRAL (7507, 7508), and GROUND (7409) circuits respectively.

The HOT and NEUTRAL wires are electrically connected to the power line in the wall, and the ground wire is connected to a common ground point also coming out of the wall from the breaker panel. As previously discussed, the SGPC PCB may incorporate screw terminals to support these connections as well as connections to a daisy-chained power receptacle system.

As previously mentioned, the SGPC PCB (7402) is not illustrated as populated in this example, and may incorporate switches, indicators, and/or sensors for use with the faceplate (7404) based on application context. This configuration makes the retrofit of the system very convenient as there is no need to utilize twist-lock electrical connectors within the wall electrical box (7401).

Remotely Controlling Receptacles Independently (7700)

The prior art describes a Z-WAVE® based retro-fitting power outlet that allows consumer to remotely control one of the dual receptacles with a remote control (see http://www.smarthomeusa.com/ShopByManufacturer/evolve-guest-controls/Item/LOM-15W/). One problem with the prior art in this application is that a dedicated remote controller is required for this device to work and it is not easy to access the device from the ubiquitous Internet.

Figure 77:
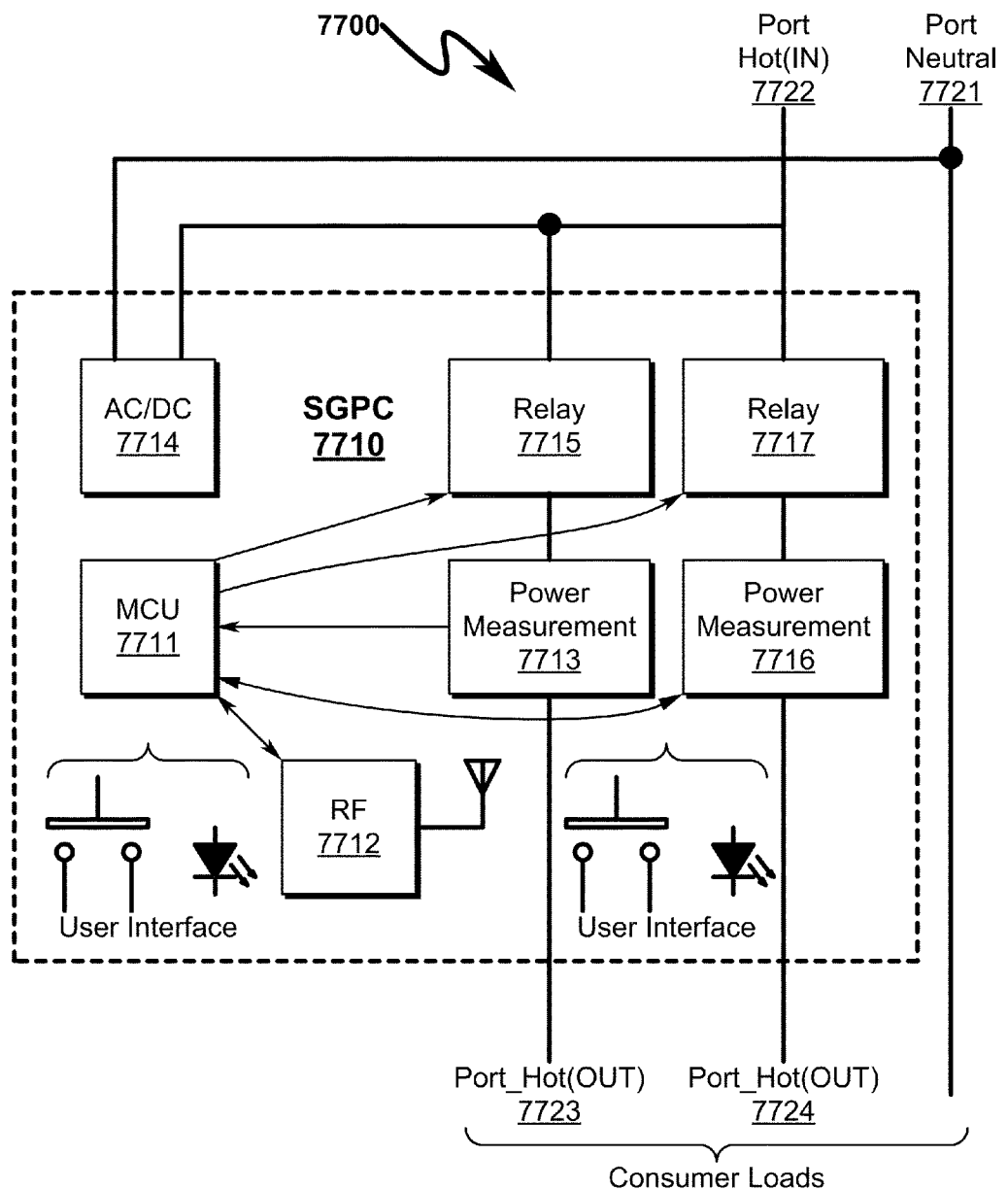
FIG. 77 illustrates an exemplary wiring diagram for a SGPC module supporting independent electrical control and installed within traditional wall electrical boxes.

The present invention in some preferred embodiments expands the mechanism of the SGPC described in Document PCSM to control the two receptacles as shown in FIG. 77 (7700). A SGPC module is inserted in the wall electrical box, and provides two receptacles that fit into the wall outlet faceplate, and connected the power wiring coming from the wall such that the power to the two receptacles can be independently turned ON and OFF by the SGPC module. Note that the mounting strap configuration illustrated in FIG. 74 (7400)-FIG. 76 (7600) supports this independent control of each receptacle.

The HOT wire coming from the wall forks into two paths. Each path goes through a power relay and a power measurement unit before connecting to the hot prong of a receptacle. The NEUTRAL wire is connected to neutral prongs of both receptacle. The GROUND wire is connected to the ground prongs of both receptacles.

The two power relays (7715, 7717) are turned ON and OFF independently by the micro-controller (7711), thus turning ON and OFF independently the electric power into the 3-prong receptacles. The power measurement units (7713, 7716) measure the electric power of the two AC paths (between HOT and NEUTRAL wires), respectively. The measurement results are converted to digital signals taken by the micro-controller (7711). The micro-controller (7711) reports the ON or OFF status of each power relay (7715, 7717) on two LEDs respectively.

The micro-controller (7711) and the wireless (RF) module (7712) are powered by the DC output (3.3V or 5V) from the AC/DC converter (7714). The micro-controller (7711) can communicate with users remotely through the wireless module (7712). For example, the wireless module can be a WiFi module or a ZIGBEE® module. Through the wireless communication, the users can do the following using a communication device such as a laptop, a tablet, or a smart phone:

Turn on and off the power relays remotely from anywhere;

Schedule the power relays to turn on and off at a future time from anywhere; and Read the power consumption of the electronic devices plugged into the receptacle.

Document PCSM discusses in detail how the above functionality is achieved.

Optional Faceplate Configurations (7800)-(8000)

Figure 78:
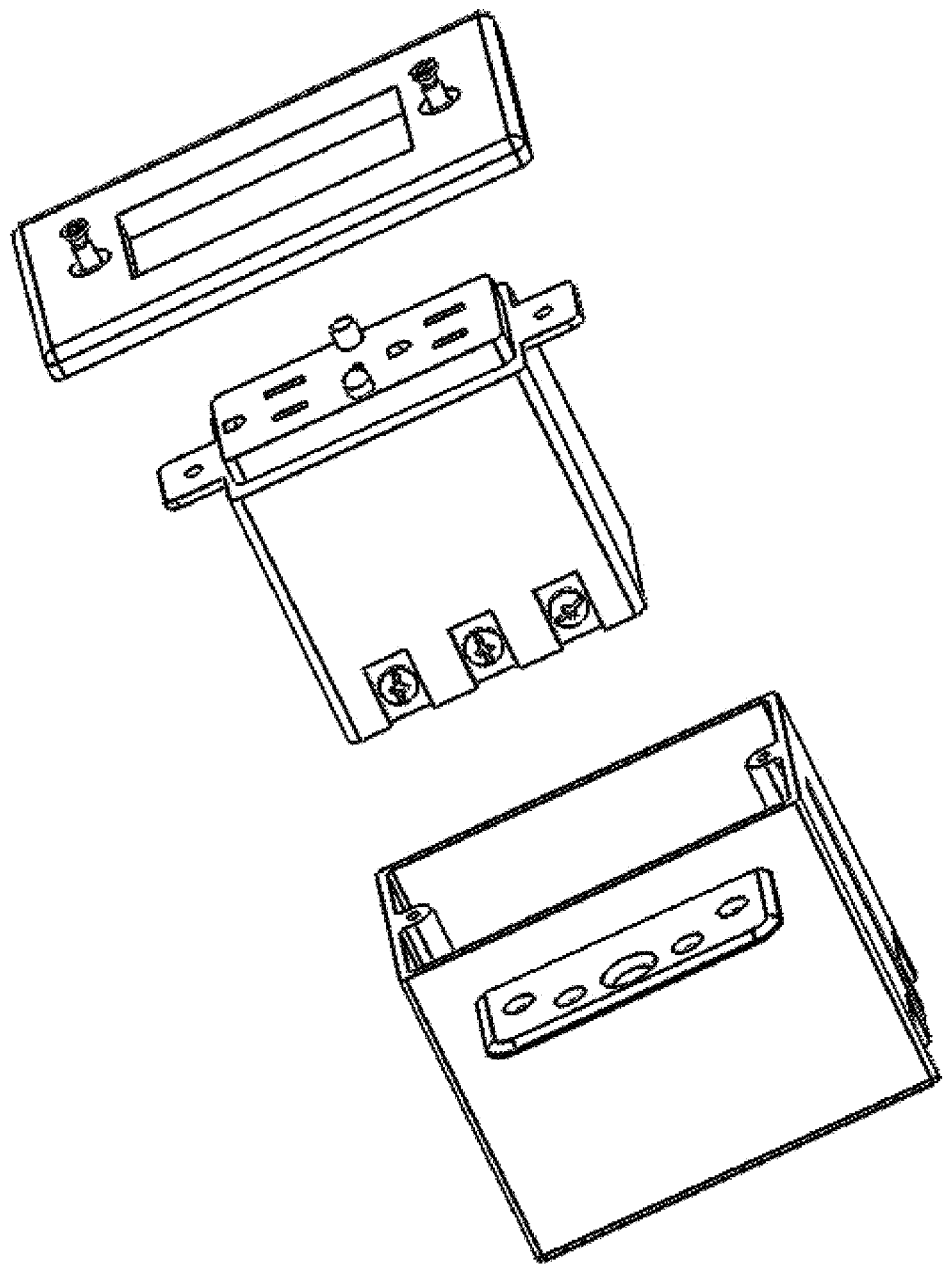
FIG. 78 illustrates a perspective assembly view of a preferred exemplary integrated SGPC power receptacle incorporating pushbutton activation and LED indicator.

In addition to faceplate configurations previously detailed some preferred invention embodiments may permit users to press push buttons to toggle the switches manually. One or more LEDs indicates the ON and OFF status of the power relays respectively. FIG. 78 (7800) illustrates the appearance of this remotely controlled retrofitting outlet module variant. This integrated SGPC module fits well into the standard wall box behind a faceplate, and easily attached to the box like an off-the-shelf duplex outlet receptacle.

Figure 79:
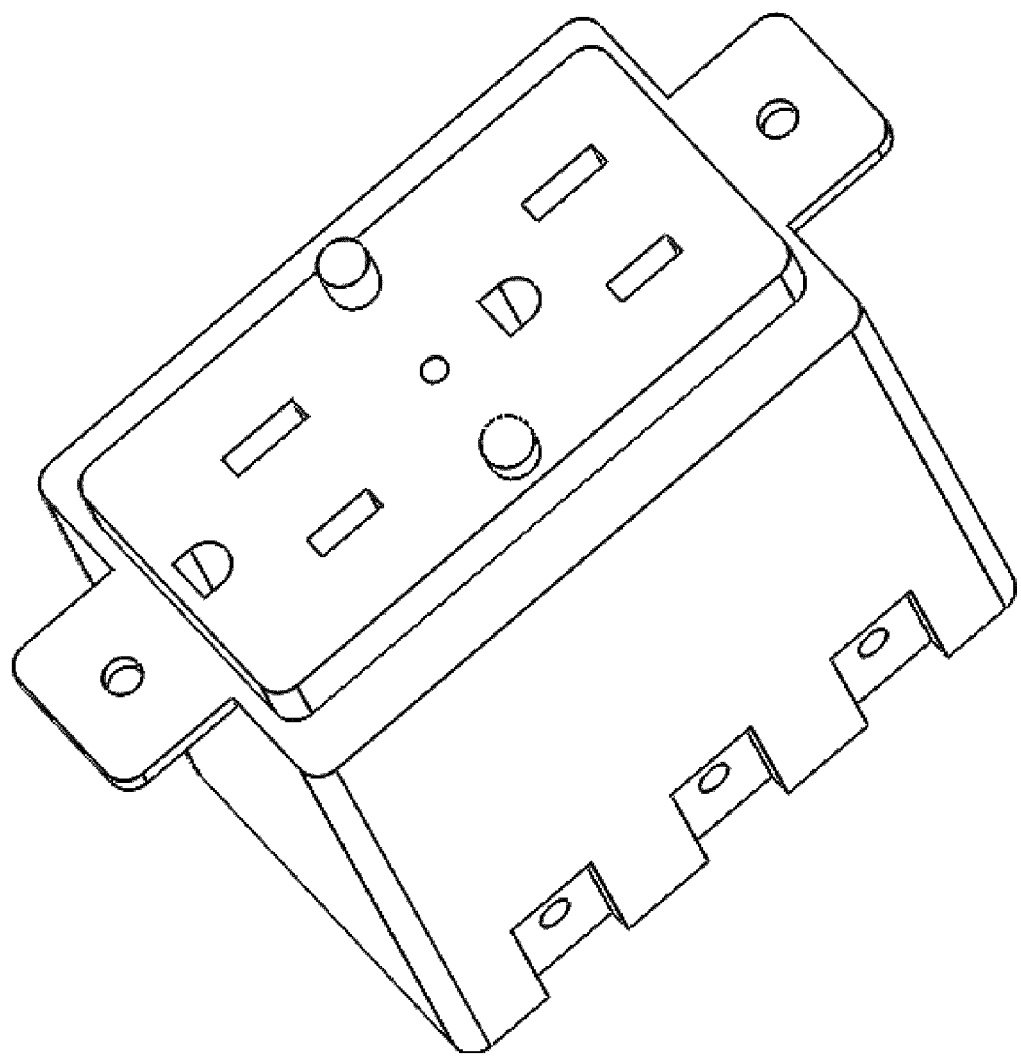
FIG. 79 illustrates a perspective view of a preferred exemplary integrated SGPC power receptacle incorporating pushbutton activation and LED indicator.
Figure 80:
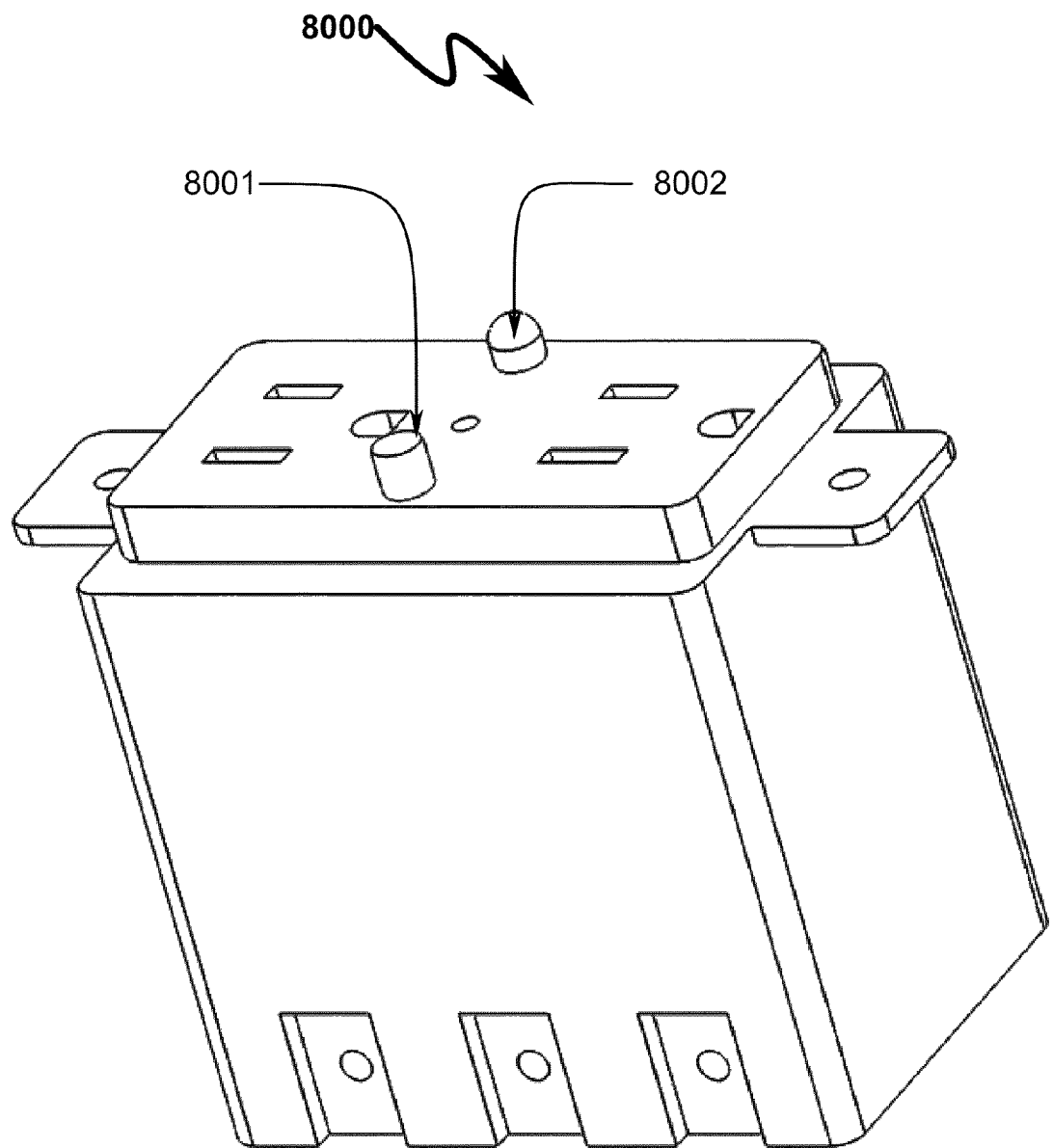
FIG. 80 illustrates a perspective view of a preferred exemplary integrated SGPC power receptacle incorporating pushbutton activation and LED indicator.

While the embodiment illustrated in FIG. 79 (7900)-FIG. 80 (8000) provides for only one switch (8001) and one LED indicator (8002), the present invention anticipates that multiple pushbuttons and/or LEDs may be incorporated on the face of the integrated SGPC power receptacle. Note again that this invention embodiment has incorporated screw terminals allowing daisy-chaining of these receptacles and easy retrofit of existing electrical wiring.

Preferred Embodiment System Summary

The present invention preferred exemplary system embodiment anticipates a wide variety of variations in the basic theme of construction, but can be generalized as a SGPC power distribution system comprising:

(a) power load receptacle;
(b) power switch;
(c) power monitor;
(d) computing device; and
(e) wireless communication interface;

wherein the SGPC is configured to be enclosed within a rectangular cuboid enclosure;

the power switch comprises a primary and secondary contactor, the primary and secondary contactor electrically connected in response to a control input;

the primary contactor of the power switch is electrically connected to a power source;

the power load receptacle is electrically connected to the secondary contactor of the power switch;

the power monitor produces a power value output in response to the electrical power flowing through the power load receptacle;

the computing device is electrically connected to the power switch control input;

the computing device is electrically connected to the power monitor power value output;

the computing device is configured to communicate with a computer network comprising the Internet via the wireless communication interface and modulates the state of the power switch control input in response to commands received from a user interface communicating with the computer network using a communication device;

the computing device is configured to communicate with the computer network via the wireless communication interface and transmit the power value output through the computer network in response to commands received from a user interface communicating with the computer network using the communication device;

the computing device is configured to register the communication device with the SGPC using an e-mail address, phone number, or other device identifier;

the computing device is configured to notify the communication device of any change in the IP address, port number, subnet vector of the SGPC by periodically sending SGPC update messages to the communication device; and the communication device is configured to retrieve the latest IP address/port for the SGPC from the SGPC update messages and retain the latest IP address/port for use in communicating with the SGPC.

This general system summary may be augmented by the various elements described herein to produce a wide variety of invention embodiments consistent with this overall design description.

Preferred Embodiment Method Summary

The present invention preferred exemplary method embodiment anticipates a wide variety of variations in the basic theme of implementation, but can be generalized as a power distribution method, the method operating in conjunction with a SGPC power distribution system comprising:
(a) power load receptacle;
(b) power switch;
(c) power monitor;
(d) computing device; and
(e) wireless communication interface;
wherein
the SGPC is configured to be enclosed within a rectangular cuboid enclosure;
the power switch comprises a primary and secondary contactor, the primary and secondary contactor electrically connected in response to a control input;
the primary contactor of the power switch is electrically connected to a power source;
the power load receptacle is electrically connected to the secondary contactor of the power switch;
the power monitor produces a power value output in response to the electrical power flowing through the power load receptacle;
the computing device is electrically connected to the power switch control input;
the computing device is electrically connected to the power monitor power value output;
the computing device is configured to communicate with a computer network comprising the Internet via the wireless communication interface and modulates the state of the power switch control input in response to commands received from a user interface communicating with the computer network using a communication device; and
the computing device is configured to communicate with a computer network via the wireless communication interface and transmit the power value output through the computer network in response to commands received from a user interface communicating with the computer network using the communication device;
wherein the method comprises the steps of:
(1) sending a periodic message from the SGPC to a proxy server containing the SGPC ID, password, router IP ADR, port, and subnet vector/path;
(2) storing the SGPC periodic message with a proxy server in an SGPC ID translation database;
(3) requesting a SGPC ID translation by the proxy server from a user interface;
(4) validating the SGPC ID and password provided by the user interface using the proxy server;
(5) determining if the SGPC ID and password are valid, and if not, proceeding to step (7);
(6) returning the router IP ADR, port, and subnet vector/path for the SGPC to the requesting user interface and proceeding to step (8);
(7) returning an error code and ignoring the SGPC translation request; and
(8) terminating the method.

One skilled in the art will recognize that these method steps may be augmented or rearranged without limiting the teachings of the present invention. This general method summary may be augmented by the various elements described herein to produce a wide variety of invention embodiments consistent with this overall design description.

Alternate Preferred Embodiment Method Summary

A present invention alternate preferred exemplary method embodiment anticipates a wide variety of variations in the basic theme of implementation, but can be generalized as a power distribution method, the method operating in conjunction with a SGPC power distribution system comprising:
(a) power load receptacle;
(b) power switch;
(c) power monitor;
(d) computing device; and
(e) wireless communication interface;
wherein
the SGPC is configured to be enclosed within a rectangular cuboid enclosure;
the power switch comprises a primary and secondary contactor, the primary and secondary contactor electrically connected in response to a control input;
the primary contactor of the power switch is electrically connected to a power source;
the power load receptacle is electrically connected to the secondary contactor of the power switch;
the power monitor produces a power value output in response to the electrical power flowing through the power load receptacle;
the computing device is electrically connected to the power switch control input;
the computing device is electrically connected to the power monitor power value output;
the computing device is configured to communicate with a computer network comprising the Internet via the wireless communication interface and modulates the state of the power switch control input in response to commands received from a user interface communicating with the computer network using a communication device; and
the computing device is configured to communicate with a computer network via the wireless communication interface and transmit the power value output through the computer network in response to commands received from a user interface communicating with the computer network using the communication device;
wherein the method comprises the steps of:
(1) registering a communication device with the SGPC using an e-mail address, phone number, or other device identifier;

(2) notifying the communication device via the SGPC of any change in the SGPC IP address, port number, subnet vector by periodically sending update messages to the communication device;

(3) retrieve the latest IP address/port for the SGPC from the received SGPC update messages and retain the latest IP address/port for use in communicating with the SGPC; and (4) terminating the method.

One skilled in the art will recognize that these method steps may be augmented or rearranged without limiting the teachings of the present invention. This general method summary may be augmented by the various elements described herein to produce a wide variety of invention embodiments consistent with this overall design description.

System/Method Variations

The present invention anticipates a wide variety of variations in the basic theme of construction. The examples presented previously do not represent the entire scope of possible usages. They are meant to cite a few of the almost limitless possibilities.

This basic system and method may be augmented with a variety of ancillary embodiments, including but not limited to:

An embodiment wherein the computer network comprises the Internet.

An embodiment wherein the system is encapsulated in plastic cuboid enclosure sized to be installed within a standard NEMA electrical enclosure.

An embodiment wherein the computing device is configured to define the on/off state of the power switch control input based on the detected state of a panel switch input.

An embodiment wherein the user interface comprises a graphical user interface (GUI) operating on a computing device selected from a group consisting of: a cellphone, smartphone, laptop computer, desktop computer, and tablet computer.

An embodiment wherein the wireless communication interface comprises multiple disparate wireless communication interfaces on separate subnets with each of the disparate wireless communication interfaces supporting different communication subnet protocols.

An embodiment wherein the wireless communication interface comprises multiple disparate wireless communication interfaces with each of the disparate wireless communication interfaces supporting different communication protocols with the system operating as a subnet sub-gateway between the disparate wireless communication interfaces.

An embodiment wherein the wireless communication interface comprises a ZIGBEE® wireless communication interface.

An embodiment wherein the computing device activates the power switch control input in response to a schedule defined by the user interface and received by the computing device via the wireless communication interface.

An embodiment wherein the computing device activates the power switch control input in response to a time-based schedule defined by the user interface and received by the computing device via the wireless communication interface.

An embodiment wherein the computing device activates the power switch control input in response to an event-based schedule defined by the user interface and received by the computing device via the wireless communication interface.

An embodiment wherein the computing device transmits to an e-mail address defined by the user interface data responsive to the current status of the power switch control input and/or the current status of the power output value.

One skilled in the art will recognize that other embodiments are possible based on combinations of elements taught within the above invention description.

Generalized Computer Usable Medium

In various alternate embodiments, the present invention may be implemented as a computer program product for use with a computerized computing system. Those skilled in the art will readily appreciate that programs defining the functions defined by the present invention can be written in any appropriate programming language and delivered to a computer in many forms, including but not limited to: (a) information permanently stored on non-writeable storage media (e.g., read-only memory devices such as ROMs or CD-ROM disks); (b) information alterably stored on writeable storage media (e.g., floppy disks and hard drives); and/or (c) information conveyed to a computer through communication media, such as a local area network, a telephone network, or a public network such as the Internet. When carrying computer readable instructions that implement the present invention methods, such computer readable media represent alternate embodiments of the present invention.

As generally illustrated herein, the present invention system embodiments can incorporate a variety of computer readable media that comprise computer usable medium having computer readable code means embodied therein. One skilled in the art will recognize that the software associated with the various processes described herein can be embodied in a wide variety of computer accessible media from which the software is loaded and activated. Pursuant to In re Beauregard, 35 USPQ2d1383 (U.S. Pat. No. 5,710,578), the present invention anticipates and includes this type of computer readable media within the scope of the invention. Pursuant to In re Nuijten, 500 F.3d 1346 (Fed. Cir. 2007) (U.S. patent application Ser. No. 09/211,928), the present invention scope is limited to computer readable media wherein the media is both tangible and non-transitory.

CONCLUSION

A power distribution system/method implementing Internet based access to hybrid home automation networks has been disclosed. The system utilizes a smart gateway power controller (SGPC) configured for single/multi-gang wallplate installation to selectively switch an AC power source to a load device under switched control and/or local/remote network commands that may be routed through a variety of network interfaces and protocols present within a home or other structure-local communications network. SGPC configurations may be nested within a home automation network to permit separation of control for load devices within a common home automation environment. Present invention methods may include routing protocols between disparate home automation networks as well as remote access protocols that permit control of disparate home automation networks via the Internet using a wide variety of remote access interfaces including mobile devices, tablet computers, laptops, desktop computers, and the like.

What is claimed is:

1. A SGPC power distribution system comprising:
   (a) power load receptacle;
   (b) power switch;
   (c) power monitor;
   (d) computing device; and
   (e) wireless communication interface;
   wherein
   said SGPC is configured to be enclosed within a rectangular cuboid enclosure;
   said power switch comprises a primary and secondary contactor, said primary and secondary contactor electrically connected in response to a control input;
   said primary contactor of said power switch is electrically connected to a power source;
   said power load receptacle is electrically connected to said secondary contactor of said power switch;
   said power monitor produces a power value output in response to the electrical power flowing through said power load receptacle;
   said computing device is electrically connected to said power switch control input;
   said computing device is electrically connected to said power monitor power value output;
   said computing device is configured to communicate with a computer network comprising the Internet via said wireless communication interface and modulates the state of said power switch control input in response to commands received from a user interface communicating with said computer network using a communication device;
   said computing device is configured to communicate with said computer network via said wireless communication interface and transmit said power value output through said computer network in response to commands received from a user interface communicating with said computer network using said communication device;
   said computing device is configured to register said communication device with said SGPC using an e-mail address, phone number, or other device identifier;
   said computing device is configured to notify said communication device of any change in the IP address, port number, subnet vector of said SGPC by periodically sending SGPC update messages to said communication device; and
   said communication device is configured to retrieve the latest IP address/port for said SGPC from said SGPC update messages and retain the latest IP address/port for use in communicating with said SGPC.

2. The power distribution system of claim 1 wherein said computing device is configured to define the on/off state of said control input based on the detected state of a panel switch input.

3. The power distribution system of claim 1 wherein said user interface comprises a graphical user interface (GUI) operating on a computing device selected from a group consisting of: a cellphone, smartphone, laptop computer, desktop computer, and tablet computer.

4. The power distribution system of claim 1 wherein said wireless communication interface comprises multiple disparate wireless communication interfaces on separate subnets with each of said disparate wireless communication interfaces supporting different communication subnet protocols.

5. The power distribution system of claim 1 wherein said wireless communication interface comprises multiple disparate wireless communication interfaces with each of said disparate wireless communication interfaces supporting different communication protocols with said system operating as a subnet sub-gateway between said disparate wireless communication interfaces.

6. The power distribution system of claim 1 wherein said wireless communication interface comprises a ZIGBEE® wireless communication interface.

7. The power distribution system of claim 1 wherein said computing device activates said power switch control input in response to a schedule defined by said user interface and received by said computing device via said wireless communication interface.

8. The power distribution system of claim 1 wherein said computing device activates said power switch control input in response to a time-based schedule defined by said user interface and received by said computing device via said wireless communication interface.

9. The power distribution system of claim 1 wherein said computing device activates said power switch control input in response to an event-based schedule defined by said user interface and received by said computing device via said wireless communication interface.

10. The power distribution system of claim 1 wherein said computing device transmits to an e-mail address defined by said user interface data responsive to the current status of said power switch control input and/or the current status of said power output value.

11. A power distribution method, said method operating in conjunction with a SGPC power distribution system, said system comprising:
   (a) power load receptacle;
   (b) power switch;
   (c) power monitor;
   (d) computing device; and
   (e) wireless communication interface;
   wherein
   said SGPC is configured to be enclosed within a rectangular cuboid enclosure;
   said power switch comprises a primary and secondary contactor, said primary and secondary contactor electrically connected in response to a control input;
   said primary contactor of said power switch is electrically connected to a power source;
   said power load receptacle is electrically connected to said secondary contactor of said power switch;
   said power monitor produces a power value output in response to the electrical power flowing through said power load receptacle;
   said computing device is electrically connected to said power switch control input;
   said computing device is electrically connected to said power monitor power value output;
   said computing device is configured to communicate with a computer network comprising the Internet via said wireless communication interface and modulates the state of said power switch control input in response to commands received from a user interface communicating with said computer network using a communication device; and
   said computing device is configured to communicate with a computer network via said wireless communication interface and transmit said power value output through said computer network in response to commands received from a user interface communicating with said computer network using said communication device;

wherein said method comprises the steps of:
(1) sending a periodic message from said SGPC to a proxy server containing said SGPC ID, password, router IP ADR, port, and subnet vector/path;
(2) storing said SGPC periodic message with a proxy server in an SGPC ID translation database;
(3) requesting a SGPC ID translation by said proxy server from a user interface;
(4) validating the SGPC ID and password provided by said user interface using said proxy server;
(5) determining if said SGPC ID and password are valid, and if not, proceeding to step (7);
(6) returning the router IP ADR, port, and subnet vector/path for said SGPC to said requesting user interface and proceeding to step (8);
(7) returning an error code and ignoring said SGPC translation request; and
(8) terminating said method.

12. The power distribution method of claim 11 wherein said computing device is configured to define the on/off state of said control input based on the detected state of a panel switch input.

13. The power distribution method of claim 11 wherein said user interface comprises a graphical user interface (GUI) operating on a computing device selected from a group consisting of: a cellphone, smartphone, laptop computer, desktop computer, and tablet computer.

14. The power distribution method of claim 11 wherein said wireless communication interface comprises multiple disparate wireless communication interfaces on separate subnets with each of said disparate wireless communication interfaces supporting different communication subnet protocols.

15. The power distribution method of claim 11 wherein said wireless communication interface comprises multiple disparate wireless communication interfaces with each of said disparate wireless communication interfaces supporting different communication protocols with said system operating as a subnet sub-gateway between said disparate wireless communication interfaces.

16. The power distribution method of claim 11 wherein said wireless communication interface comprises a ZIGBEE® wireless communication interface.

17. The power distribution method of claim 11 wherein said computing device activates said power switch control input in response to a schedule defined by said user interface and received by said computing device via said wireless communication interface.

18. The power distribution method of claim 11 wherein said computing device activates said power switch control input in response to a time-based schedule defined by said user interface and received by said computing device via said wireless communication interface.

19. The power distribution method of claim 11 wherein said computing device activates said power switch control input in response to an event-based schedule defined by said user interface and received by said computing device via said wireless communication interface.

20. The power distribution method of claim 11 wherein said computing device transmits to an e-mail address defined by said user interface data responsive to the current status of said power switch control input and/or the current status of said power output value.

21. A power distribution method, said method operating in conjunction with a SGPC power distribution system, said system comprising:
(a) power load receptacle;
(b) power switch;
(c) power monitor;
(d) computing device; and
(e) wireless communication interface;
wherein
said SGPC is configured to be enclosed within a rectangular cuboid enclosure;
said power switch comprises a primary and secondary contactor, said primary and secondary contactor electrically connected in response to a control input;
said primary contactor of said power switch is electrically connected to a power source;
said power load receptacle is electrically connected to said secondary contactor of said power switch;
said power monitor produces a power value output in response to the electrical power flowing through said power load receptacle;
said computing device is electrically connected to said power switch control input;
said computing device is electrically connected to said power monitor power value output;
said computing device is configured to communicate with a computer network comprising the Internet via said wireless communication interface and modulates the state of said power switch control input in response to commands received from a user interface communicating with said computer network using a communication device; and
said computing device is configured to communicate with a computer network via said wireless communication interface and transmit said power value output through said computer network in response to commands received from a user interface communicating with said computer network using said communication device;
wherein said method comprises the steps of:
(1) registering a communication device with said SGPC using an e-mail address, phone number, or other device identifier;
(2) notifying said communication device via said SGPC of any change in the SGPC IP address, port number, subnet vector by periodically sending update messages to said communication device;
(3) retrieve the latest IP address/port for said SGPC from said received SGPC update messages and retain said latest IP address/port for use in communicating with said SGPC; and
(4) terminating said method.

22. The power distribution method of claim 21 wherein said computing device is configured to define the on/off state of said control input based on the detected state of a panel switch input.

23. The power distribution method of claim 21 wherein said user interface comprises a graphical user interface (GUI) operating on a computing device selected from a group consisting of: a cellphone, smartphone, laptop computer, desktop computer, and tablet computer.

24. The power distribution method of claim 21 wherein said wireless communication interface comprises multiple disparate wireless communication interfaces on separate subnets with each of said disparate wireless communication interfaces supporting different communication subnet protocols.

25. The power distribution method of claim 21 wherein said wireless communication interface comprises multiple disparate wireless communication interfaces with each of said disparate wireless communication interfaces supporting different communication protocols with said system operating as a subnet sub-gateway between said disparate wireless communication interfaces.

26. The power distribution method of claim 21 wherein said wireless communication interface comprises a ZIGBEE® wireless communication interface.

27. The power distribution method of claim 21 wherein said computing device activates said power switch control input in response to a schedule defined by said user interface and received by said computing device via said wireless communication interface.

28. The power distribution method of claim 21 wherein said computing device activates said power switch control input in response to a time-based schedule defined by said user interface and received by said computing device via said wireless communication interface.

29. The power distribution method of claim 21 wherein said computing device activates said power switch control input in response to an event-based schedule defined by said user interface and received by said computing device via said wireless communication interface.

30. The power distribution method of claim 21 wherein said computing device transmits to an e-mail address defined by said user interface data responsive to the current status of said power switch control input and/or the current status of said power output value.

* * * * *